(12) United States Patent
Kurokawa et al.

(10) Patent No.: US 11,345,387 B2
(45) Date of Patent: May 31, 2022

(54) ELECTRICALLY ADJUSTABLE STEERING

(71) Applicant: NSK LTD., Tokyo (JP)

(72) Inventors: Yoshifumi Kurokawa, Ann Arbor, MI (US); Jessica Elaine Lipa, Saline, MI (US); Victor Corona Martinez, Ann Arbor, MI (US); Juan Antonio Hernandez Otero, Ypsilanti, MI (US)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/952,837

(22) Filed: Nov. 19, 2020

(65) Prior Publication Data

US 2021/0229733 A1 Jul. 29, 2021

Related U.S. Application Data

(60) Provisional application No. 62/938,647, filed on Nov. 21, 2019.

(51) Int. Cl.
| | |
|---|---|
| *B62D 1/18* | (2006.01) |
| *B62D 1/181* | (2006.01) |
| *B62D 1/183* | (2006.01) |
| *B62D 1/184* | (2006.01) |
| *B62D 1/185* | (2006.01) |
| *B62D 1/187* | (2006.01) |
| *B62D 6/00* | (2006.01) |
| *F16B 7/14* | (2006.01) |
| *F16B 7/18* | (2006.01) |
| *F16B 7/20* | (2006.01) |

(52) U.S. Cl.
CPC ............... *B62D 1/181* (2013.01); *B62D 1/18* (2013.01); *B62D 1/183* (2013.01); *B62D 1/184* (2013.01); *B62D 1/185* (2013.01); *B62D 1/187* (2013.01); *B62D 6/008* (2013.01); *F16B 7/14* (2013.01); *F16B 7/187* (2013.01); *F16B 7/20* (2013.01); *B62D 6/00* (2013.01); *F16B 7/1445* (2013.01)

(58) Field of Classification Search
CPC ........ B62D 1/181; B62D 1/183; B62D 1/184; B62D 1/185; B62D 1/187; B62D 6/008; F16B 7/14; F16B 7/187; F16B 7/20
See application file for complete search history.

(56) References Cited

U.S. PATENT DOCUMENTS

| | | | |
|---|---|---|---|
| 2017/0120944 A1* | 5/2017 | Kato | B62D 1/181 |
| 2018/0251147 A1 | 9/2018 | Heitz et al. | |
| 2020/0079423 A1* | 3/2020 | Suzuki | B62D 1/181 |
| 2021/0129891 A1* | 5/2021 | Ryne | B62D 1/181 |
| 2021/0129896 A1* | 5/2021 | Ryne | B62D 1/185 |

FOREIGN PATENT DOCUMENTS

| | | | | |
|---|---|---|---|---|
| JP | 2010-83392 A | | 4/2010 | |
| WO | WO-2017038280 A1 | * | 3/2017 | ............ B62D 1/185 |
| WO | WO-2017140526 A1 | * | 8/2017 | ............ B62D 1/185 |
| WO | WO-2020060303 A1 | * | 3/2020 | ............ B62D 1/181 |

* cited by examiner

*Primary Examiner* — Jonathan Ng
*Assistant Examiner* — Daniel M. Keck
(74) *Attorney, Agent, or Firm* — Sughrue Mion, PLLC

(57) ABSTRACT

In an electrically adjustable steering of the present embodiment, a first telescopic actuator is disposed between a top bracket or a mount bracket on a vehicle body side and a steering jacket. The steering jacket includes a plurality of jacket members that overlap each other so as to be able to expand and contract in an axial direction. A motor of the first telescopic actuator is fixed to the top bracket or the mount bracket on the vehicle body side.

12 Claims, 67 Drawing Sheets

ELECTRICALLY ADJUSTABLE STEERING

CROSS-REFERENCE TO RELATED APPLICATIONS

The present Applications is based on U.S. Provisional Patent Application No. 62/938,647 filed on Nov. 21, 2019, the contents of which are incorporated by reference herein.

TECHNICAL FIELD

The present invention relates to an electrically adjustable steering.

BACKGROUND ART

In the related art, there is known an electrically adjustable steering including a steering wheel, a steering shaft, a steering jacket, an intermediate shaft connecting the steering shaft and a steering gear unit via a pair of universal joints, a steering gear unit, a pair of tie rods, a telescopic mechanism, and a tilt mechanism. For example, in an electrically adjustable steering of JP-A-2010-83392, a steering shaft includes an outer shaft and an inner shaft that expand and contract freely in an axial direction, and a steering jacket includes an outer jacket and an inner jacket that expands and contracts freely in the axial direction. An electric motor of the telescopic mechanism that expands and contracts the steering shaft and the steering jacket is fixed to the outer jacket, and one end of the rod driven by the electric motor is fixed to the inner jacket.

In the electrically adjustable steering disclosed in JP-A-2010-83392, since the electric motor of the telescopic mechanism, which is a heavy object, is fixed to a side of the outer jacket, the outer jacket has a low natural frequency and is easy to resonate, and in the case of resonance, discomfort may be given to a driver due to vibration sound or the like. Further, since the steering shaft and the steering jacket include a pair of shafts and jackets, there is a problem that a telescopic adjustable length is short.

The present invention has been made in view of the problems described above, and an object thereof is to provide an electrically adjustable steering where there is less chance of giving the driver discomfort due to resonance of the steering apparatus and the telescopic adjustable length can be increased.

SUMMARY OF INVENTION

The object of the present invention is achieved by the following configuration.

[1] An electrically adjustable steering comprising:
a top bracket mounted on a mount bracket on a vehicle body side;
a steering shaft to which a steering wheel is connected;
a steering jacket configured to be held by the top bracket and rotatably supports the steering shaft on an inner side; and
a first telescopic actuator configured to be disposed between the top bracket or a mount bracket on the vehicle body side and the steering jacket, and adjusts lengths of the steering shaft and the steering jacket by using a motor, wherein
the steering jacket includes first to third jacket members in order from the steering wheel side, and the first and second jacket members and the second and third jacket members overlap each other separately so that the steering jacket can expand and contract in an axial direction, and
the motor of the first telescopic actuator is fixed to the top bracket or the mount bracket on the vehicle body side.

[2] An electrically adjustable steering comprising:
a top bracket mounted on a mount bracket on a vehicle body side;
a steering shaft to which a steering wheel is connected;
a steering jacket configured to be held by the top bracket and rotatably supports the steering shaft on an inner side;
a road surface reaction force generation device configured to transmit a road surface reaction force generated between a road surface and a wheel to the steering wheel; and
a first telescopic actuator configured to be disposed between the road surface reaction force generation device and the steering jacket, and adjusts lengths of the steering shaft and the steering jacket by using a motor, wherein
the steering jacket includes at least first to third jacket members in order from the steering wheel side, and the first and second jacket members and the second and third jacket members overlap each other separately so that the steering jacket can expand and contract in an axial direction, and
a motor of the first telescopic actuator is fixed to the road surface reaction force generation device.

According to the electrically adjustable steering of the present invention, there is less chance of giving the driver discomfort due to resonance of the steering apparatus, and the telescopic adjustable length can be increased.

DESCRIPTION OF EMBODIMENTS

Hereinafter, embodiments of an electrically adjustable steering according to the present invention will be described in detail with reference to the drawings.

In the present description, "front" and "rear" respectively mean front and rear of the electrically adjustable steering in a state in which the electrically adjustable steering is mounted on a vehicle body, and a "steering wheel side" and a "side opposite to the steering wheel" respectively represent rear of a vehicle and front of a vehicle in a state in which the electrically adjustable steering is mounted on the vehicle body.

An "axial direction" means a direction along an axis of a steering shaft.

Further, a "telescopic motion" means a motion in an axial direction of the steering wheel, and refers to, for example, a motion caused by adjustment, stowage, and un-stowage of the steering wheel and caused by a tilting motion.

The "tilting motion" refers to a motion of the steering wheel in a direction perpendicular or substantially perpendicular to the axis of the steering shaft.

First Embodiment

Figure 1:
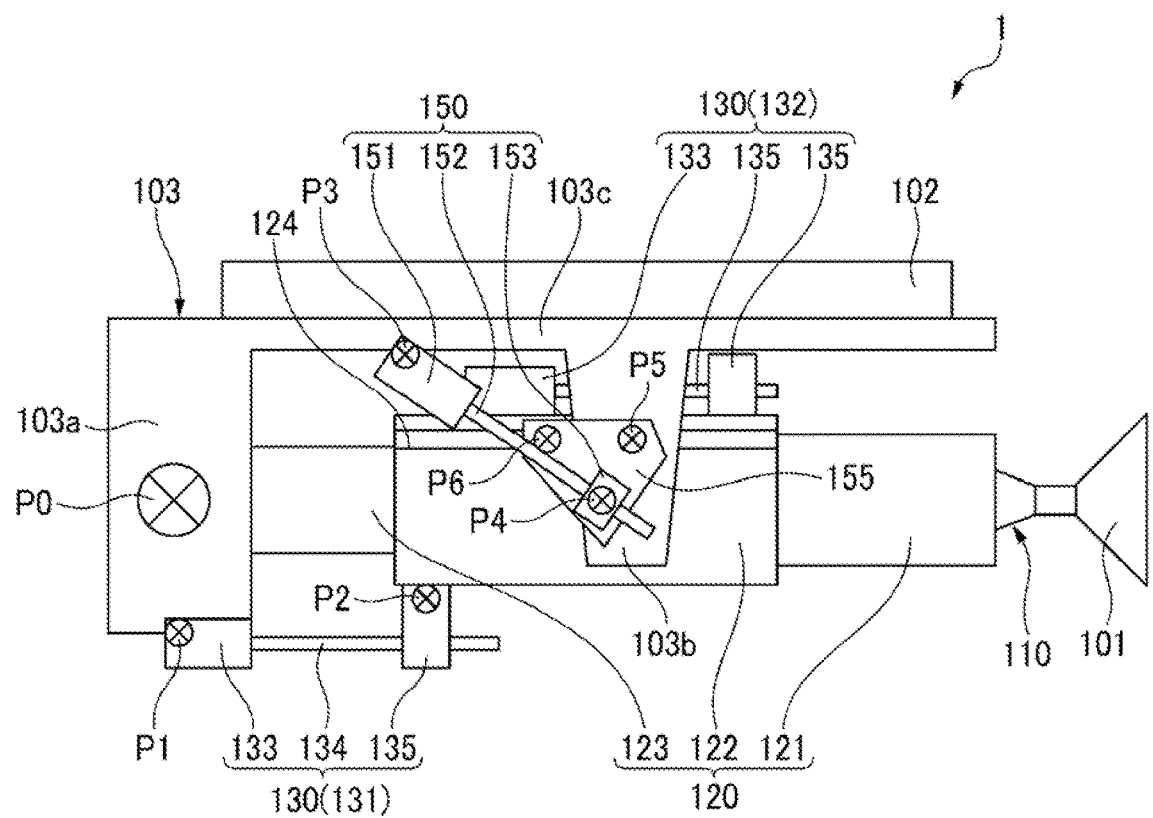
FIG. 1 is a side view schematically showing a schematic configuration of an electrically adjustable steering according to a first embodiment of the present invention.
Figure 2A:
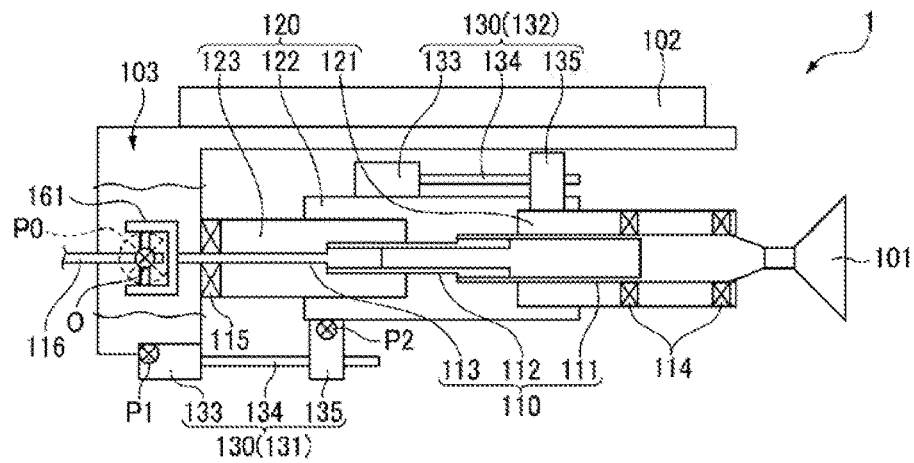
FIGS. 2A to 2C are cross-sectional views schematically showing the electrically adjustable steering of FIG. 1.
Figure 2B:
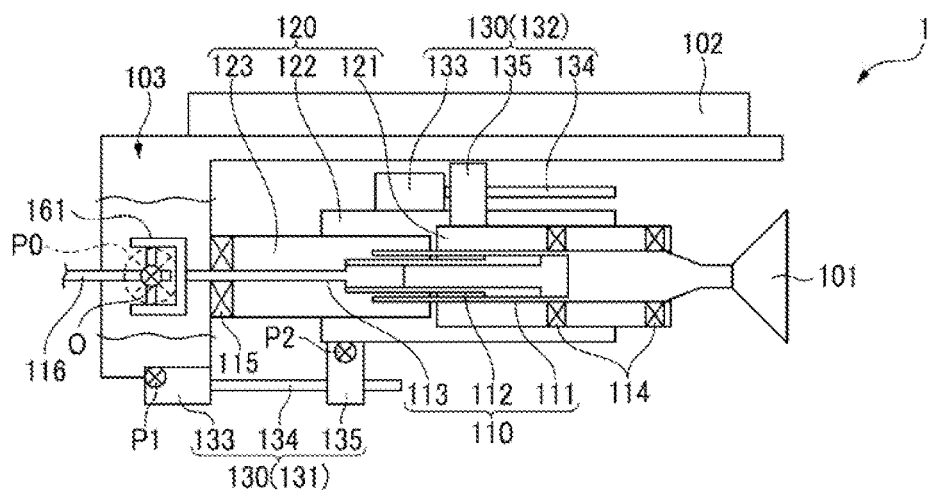
Figure 2C:
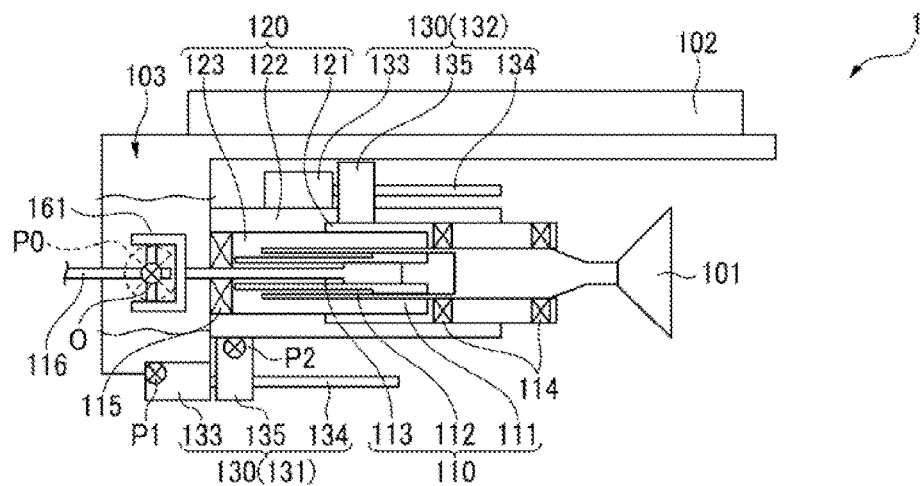
Figure 3A:
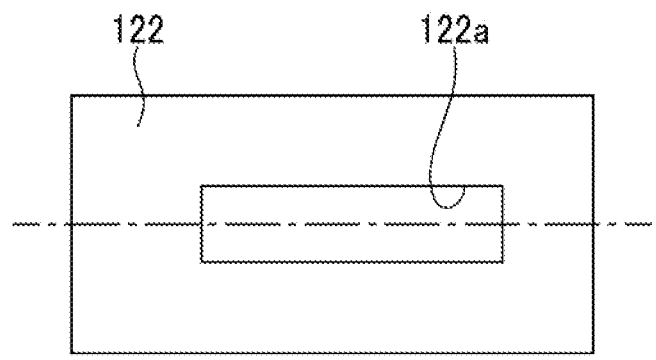
FIG. 3A is a top view schematically showing a second jacket member.
Figure 3B:
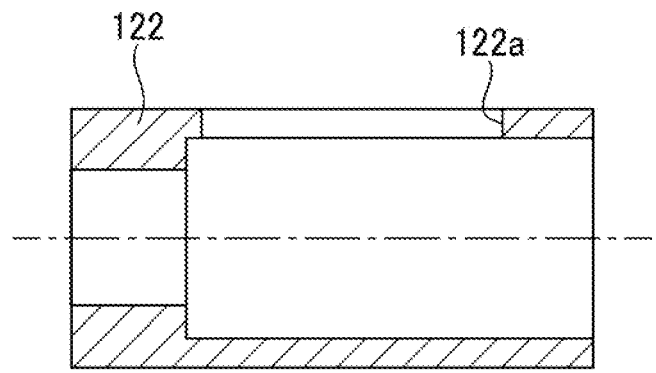
FIG. 3B is a cross-sectional view thereof.

FIG. 1 is a schematic view of an electrically adjustable steering of a first embodiment, and FIGS. 2A to 2C are cross-sectional views of the electrically adjustable steering of FIG. 1. FIG. 3A is a top view schematically showing a second jacket member, and FIG. 3B is a cross-sectional view thereof.

As shown in FIG. 1 to FIG. 3, the electrically adjustable steering 1 includes a mount bracket 102 on a vehicle body side fixed to the vehicle body, a top bracket 103 that is mounted on the mount bracket 102 and holds a steering jacket 120 to be described later, a steering shaft 110 that connects to a steering wheel 101 and rotates by the steering wheel 101, a steering jacket 120 that rotatably supports the steering shaft 110 on an inner side, two screw shaft rotary actuators 130 (first telescopic actuator 131 and second telescopic actuator 132) that adjust an anteroposterior position of the steering wheel 101, namely lengths of the steering shaft 110 and the steering jacket 120, and a tilt actuator 150 that adjusts a vertical position of the steering wheel 101, namely inclinations of the steering shaft 110 and the steering jacket 120.

With reference to FIGS. 2A to 2C, the steering shaft 110 includes a first shaft member 111, a second shaft member 112, and a third shaft member 113 in order from the steering wheel 101 side. The first and second shaft members 111 and 112 and the second and third shaft members 112 and 113 overlap each other separately so as to be able to rotate and transmit torque to each other by serration fitting or the like and be able to expand and contract in the axial direction. Specifically, the third shaft member 113 is telescopically fitted into the second shaft member 112, and the second shaft member 112 is telescopically fitted into the first shaft member 111.

When the steering shaft 110 expands and contracts, the first shaft member 111 and the second shaft member 112 preferably have a structure that cannot be mechanically separated. Similarly, the second shaft member 112 and the third shaft member 113 preferably have a structure that cannot be mechanically separated. Specifically, it is realized by, for example, connection between the shaft member and a stopper provided between the shaft members or a stopper provided on another component (for example, a jacket member) whose axial position is determined.

It is preferable that sliding resistance between the first shaft member 111 and the second shaft member 112 and sliding resistance between the second shaft member 112 and the third shaft member 113 are different so that the second shaft member 112 and the third shaft member 113 do not expand and contract when the first shaft member 111 and the second shaft member 112 expand and contract, and the first shaft member 111 and the second shaft member 112 do not expand and contract when the second shaft member 112 and the third shaft member 113 expand and contract. In the present embodiment, the sliding resistance between the first shaft member 111 and the second shaft member 112 is set smaller than the sliding resistance between the second shaft member 112 and the third shaft member 113. Accordingly, first, the shaft members 111 and 112 having the smaller sliding resistance expand and contract, and next the shaft members 112 and 113 having the larger sliding resistance expand and contract.

The steering jacket 120 includes a first jacket member 121, a second jacket member 122, and a third jacket member 123 in order from the steering wheel 101 side around the steering shaft 110. The first and second jacket members 121 and 122 and the second and third jacket members 122 and 123 overlap each other separately so that the steering jacket 120 can expand and contract in the axial direction.

An outer diameter of the first jacket member 121 is smaller than an inner diameter of the second jacket member 122, and an outer diameter of the third jacket member 123 is smaller than an inner diameter of the second jacket member 122 and smaller than an inner diameter of the first jacket member 121. Therefore, the first jacket member 121 is telescopically accommodated in the second jacket member 122, and the third jacket member 123 is telescopically accommodated in the first jacket member 121 and the second jacket member 122.

When the steering jacket 120 expands and contracts, the first jacket member 121 and the second jacket member 122 preferably have a structure that cannot be mechanically separated. Similarly, the second jacket member 122 and the third jacket member 123 preferably have a structure that cannot be mechanically separated. Specifically, it is realized by a jacket shape such as outward or inward projection or the like that forms a stopper between the jacket members, connection between the jacket member and a stopper provided on another component (for example, an actuator or an actuator nut) having a prescribed stroke, or the like.

Further, in order to ensure sufficient flexural rigidity of the steering jacket 120, the first jacket member 121 and the second jacket member 122, and the second jacket member 122 and the third jacket member 123 preferably ensure, for example, an axial overlapping portion of at least 70 mm or more regardless of expansion and contraction of the steering jacket 120.

The sliding resistance between the first jacket member 121 and the second jacket member 122 may be the same as or different from the sliding resistance between the second jacket member 122 and the third jacket member 123.

A part which is a vehicle body front side of the third jacket member 123 is rotatably connected to a front support portion 103a of the top bracket 103 by a pivot P0. With reference to FIGS. 2A to 2C, the first jacket member 121 rotatably supports the first shaft member 111 by a pair of built-in bearings 114 and 114. The third jacket member 123 rotatably supports the third shaft member 113 by a built-in bearing 115. That is, the steering jacket 120 rotatably supports the steering shaft 110 by the built-in bearings 114, 114, and 115.

A universal joint 161 is disposed at a front end portion of the third shaft member 113 so that the steering shaft 110 can be smoothly bent at the time of tilting. Therefore, the third shaft member 113 is connected to a pinion shaft of a steering gear unit via a pair of universal joints 161 (only one is shown) and an intermediate shaft 116. Accordingly, the pinion shaft rotates via the steering shaft 110 by rotating the steering wheel 101. By converting rotation of the pinion shaft into a linear motion of a rack shaft by the steering gear unit, a pair of tie rods are pushed and pulled, and a rudder angle corresponding to an operation amount of the steering wheel 101 is given to a pair of steered road wheels.

A rotation center O of the universal joint 161 is preferably set at the same position as or a close position to the pivot P0, which is a center point at which the steering jacket 120 rotates at the time of tilting. As the universal joint 161, a universal joint, a flexible coupling, a rubber shaft joint, or the like may be used.

The first telescopic actuator 131 is disposed between the top bracket 103 and the second jacket member 122, and the second telescopic actuator 132 is disposed between the second jacket member 122 and the first jacket member 121. Each of the first telescopic actuator 131 and the second telescopic actuator 132 is the screw shaft rotary actuator 130, and includes a motor 133 that rotationally drives a screw shaft 134, and a nut 135 that is a driven portion screwed to the screw shaft 134.

The motor 133 of the first telescopic actuator 131 is rotatably connected to the top bracket 103 via a pivot P1, and the nut 135 is rotatably connected to an outer peripheral side of the second jacket member 122 via a pivot P2. The motor 133 of the second telescopic actuator 132 is fixed to the outer peripheral side of the second jacket member 122, and the nut 135 is fixed to an outer peripheral side of the first jacket member 121. As shown in FIG. 3, the second jacket member 122 includes a slit 122a for projecting the nut 135 fixed to the first jacket member 121 radially outward from the second jacket member 122.

By driving the motor 133 of the second telescopic actuator 132 to rotate the screw shaft 134, as shown in FIG. 2B, the nut 135, namely the first jacket member 121 moves in the axial direction and is drawn into and accommodated in the second jacket member 122. At this time, the second shaft member 112 is accommodated in the first shaft member 111 as well as the steering shaft 110.

Further, by driving the motor 133 of the first telescopic actuator 131 to rotate the screw shaft 134, as shown in FIG. 2C, the nut 135, namely the second jacket member 122 moves in the axial direction together with the first jacket member 121, and the third jacket member 123 is accommodated in the first jacket member 121. At this time, the third shaft member 113 is accommodated in the second shaft member 112 as well as the steering shaft 110.

Regardless of whether the first jacket member 121 or the second jacket member 122 is separately moved in a direction close to or away from the motor 133, either the first telescopic actuator 131 or the second telescopic actuator 132 may be driven in advance, or the first telescopic actuator 131 and the second telescopic actuator 132 may be driven at the same time. In a case where a length to be telescopically adjusted is short, only either one of the actuators 131 and 132 may be operated to adjust the length.

As one example, a telescopic motion toward a driver first expands a space between the first jacket member 121 and the second jacket member 122, and then expands a space between the second jacket member 122 and the third jacket member 123. A telescopic motion away from the driver first contracts the space between the second jacket member 122 and the third jacket member 123, and then contracts the space between the first jacket member 121 and the second jacket member 122.

As another example, a telescopic motion toward the driver first expands the space between the second jacket member 122 and the third jacket member 123, and then expands the space between the first jacket member 121 and the second jacket member 122. A telescopic motion away from the driver first contracts the space between the first jacket member 121 and the second jacket member 122, and then contracts the space between the second jacket member 122 and the third jacket member 123.

Thus, when the steering jacket 120 includes three jacket members (the first jacket member 121, the second jacket member 122 and the third jacket member 123) that overlap each other and the steering shaft 110 and the steering jacket 120 are expanded and contracted by the first telescopic actuator 131 and the second telescopic actuator 132, a telescopic adjustable length of the electrically adjustable steering 1 can be longer than a length of the steering jacket 120 when shortened.

As shown in FIG. 1, the tilt actuator 150 includes a tilt motor 151 that rotationally drives a screw shaft 152 and a nut 153 that is a driven portion screwed to the screw shaft 152. The tilt motor 151 is rotatably supported by a base portion 103c of the top bracket 103 by a pivot P3. The nut 153 is rotatably connected to one end of a substantially triangular link member 155 by a pivot P4. The link member 155 is rotatably supported by a rear support portion 103b of the top bracket 103 by a pivot P5 provided at another end of the link member 155. Further, a pivot P6 provided at another end of the link member 155 is slidably fitted in a groove 124 provided in the axial direction on an outer peripheral surface of the second jacket member 122.

Then, by driving the tilt motor 151 to rotate the screw shaft 152, the nut 153 screwed to the screw shaft 152 is moved. Accordingly, the link member 155 rotates about the pivot P5. The rotation of the link member 155 is transmitted to the second jacket member 122 via the pivot P6 and a groove 124 which are slidably fitted to each other. Accordingly, the steering jacket 120, the steering shaft 110, and the steering wheel 101 rotates about the pivot P0 (the rotation center O of the universal joint 161), and the vertical position of the steering wheel 101 is adjusted (tilted).

According to the electrically adjustable steering 1 of the present embodiment, since the motor 133 of the first telescopic actuator 131, which is a heavy object, is fixed to the top bracket 103 having high rigidity, a natural frequency of the steering jacket 120 increases, and discomfort given to an occupant due to resonance or the like can be reduced as compared with the case where the motor 133 is fixed on the steering jacket 120. Further, since the steering shaft 110 and the steering jacket 120 each include three members that can expand and contract, an adjustable length (telescopic) of the electrically adjustable steering 1 can be increased.

Figure 4:
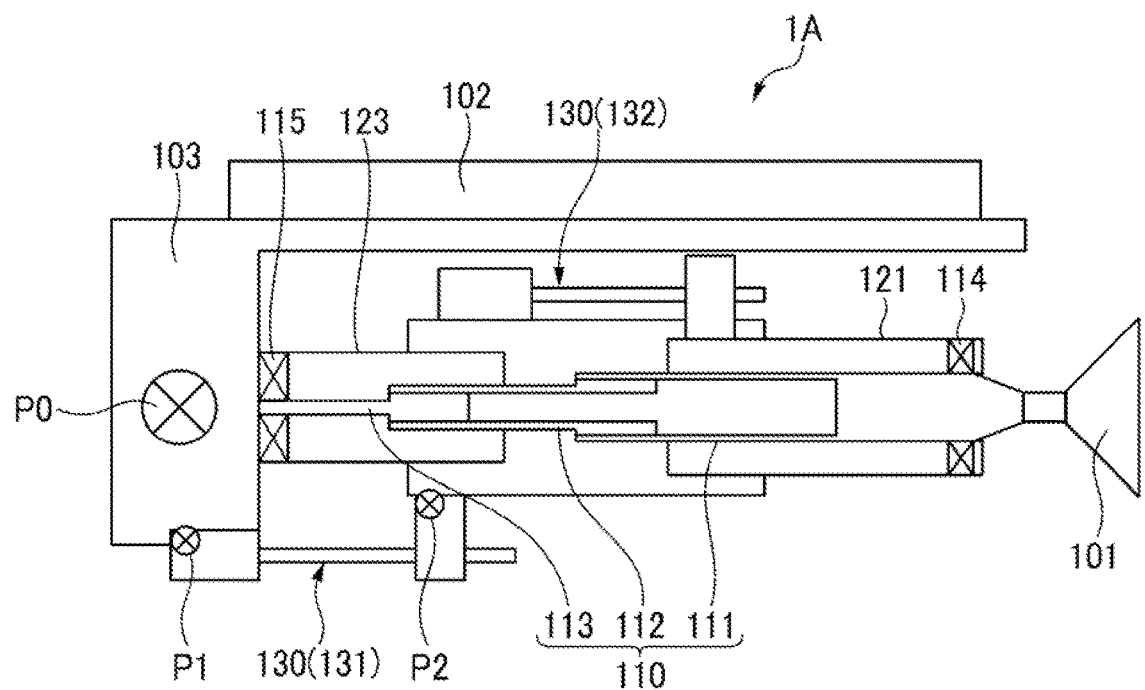
FIG. 4 is a cross-sectional view schematically showing an electrically adjustable steering of a first reference example.

FIG. 4 is an electrically adjustable steering 1A of a first reference example for comparison with the electrically adjustable steering 1 of the first embodiment, and the first shaft member 111 is supported by one bearing 114 disposed in the first jacket member 121. Therefore, in the electrically adjustable steering 1A of the first reference example, rigidity of the steering shaft 110 when a force that bends the steering shaft 110 is applied from the steering wheel 101 decreases. On the other hand, in the electrically adjustable steering 1 of the first embodiment, since the first shaft member 111 is rotatably supported by the pair of bearings 114 and 114 disposed in the first jacket member 121, rigidity against the force that bends the steering shaft 110 can be increased.

Figure 5:
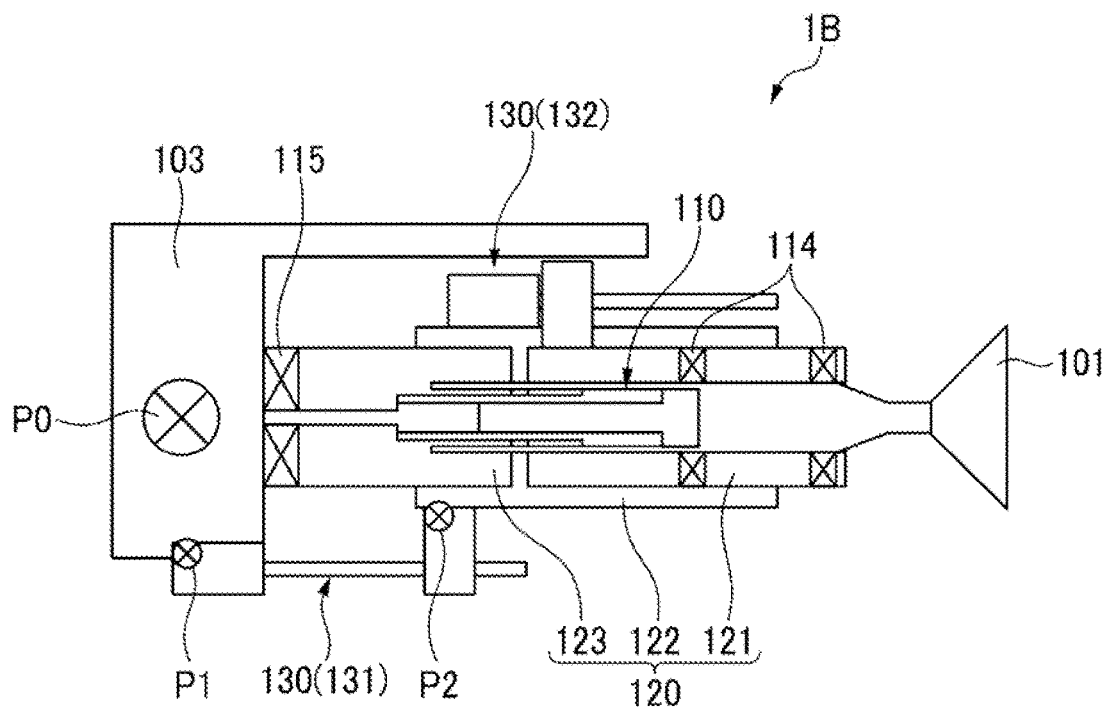
FIG. 5 is a cross-sectional view schematically showing an electrically adjustable steering of a second reference example.

FIG. 5 is an electrically adjustable steering 1B of a second reference example for comparison with the electrically adjustable steering 1 of the first embodiment. In the electric steering system 1B, the first jacket member 121 and the third jacket member 123 have the same diameter and may be accommodated in the second jacket member 122 separately. Therefore, the first jacket member 121 and the third jacket member 123 cannot be fitted, and a length of the steering jacket 120 when the steering jacket 120 shortens cannot be shorter than that of the electrically adjustable steering 1. On the other hand, in the electrically adjustable steering 1 of the first embodiment, since the third jacket member 123 is accommodated in the first jacket member 121, the length of the steering jacket 120 when the steering jacket 120 shortens is shorter.

Materials of the first jacket member 121, the second jacket member 122, and the third jacket member 123 may include one, two, or three unique raw materials. However, in the first jacket member 121, the second jacket member 122, and the third jacket member 123 in direct sliding contact with each other, the materials preferably include a combination of different raw materials. For example, the first jacket member 121 and the third jacket member 123 may be made of steel, and the second jacket member 122 may be made of aluminum.

Second Embodiment

Figure 6A:
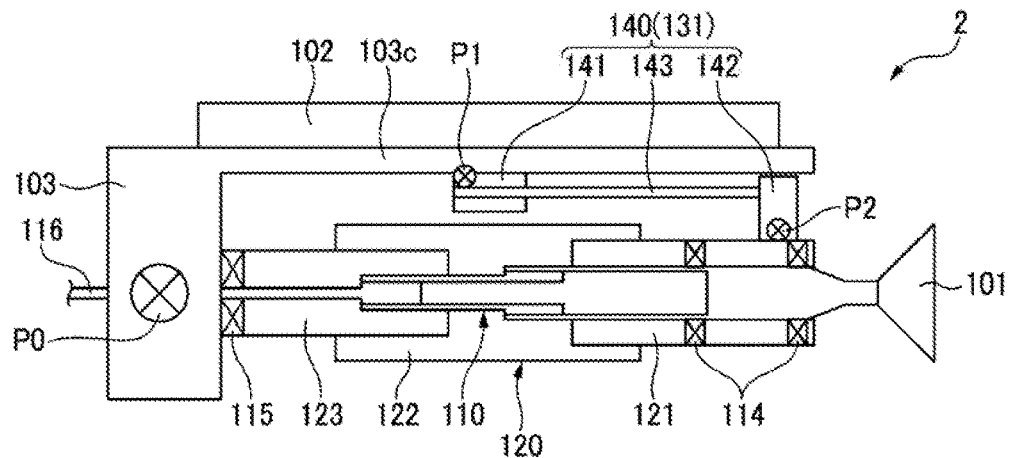
FIGS. 6A to 6C are cross-sectional views schematically showing an electrically adjustable steering of a second embodiment.

Next, an electrically adjustable steering of a second embodiment will be described with reference to FIGS. 6A to 6C. In each embodiment to be described below, differences from the electrically adjustable steering of the above embodiment are centrally described, and the same reference signs or corresponding reference signs are given to parts having the same configuration as those of the electrically adjustable steering of the above-described embodiment to simplify or omit description thereof.

The electrically adjustable steering 2 of the second embodiment includes one first telescopic actuator 131, and the first telescopic actuator 131 is composed of a nut rotary actuator 140.

Specifically, the first telescopic actuator 131 is disposed between the top bracket 103 and the first jacket member 121. The nut rotary actuator 140 constituting the first telescopic actuator 131 includes a motor 141 that rotates a built-in nut (not shown) and a screw shaft fixed block 142 that fixedly supports one end of a screw shaft 143. The motor 141 is rotatably connected to a length direction middle portion of the base portion 103c of the top bracket 103 via the pivot P1, and the screw shaft fixed block 142 is connected to an end portion of the first jacket member 121 on the steering wheel 101 side via the pivot P2. The screw shaft 143 is screwed with a nut (not shown) that is rotationally driven by the motor 141.

Figure 6B:
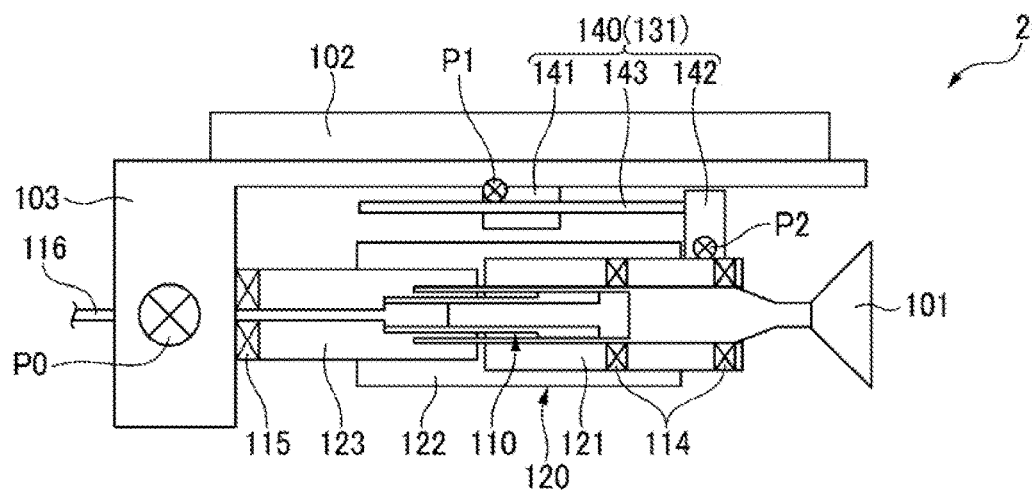
Figure 6C:
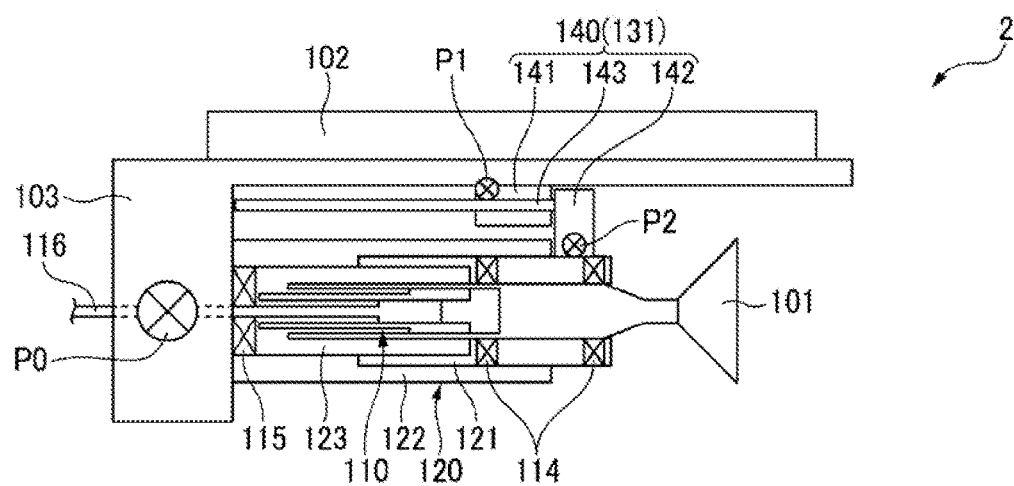

Then, by rotationally driving the nut (not shown) by the motor 141, as shown in FIG. 6B, the screw shaft 143 connected to the first jacket member 121 by being screwed to the nut, namely the first jacket member 121 is moved leftward in the drawing and is accommodated in the second jacket member 122. Further, by rotationally driving the nut by the motor 141, as shown in FIG. 6C, the screw shaft 143, namely the first jacket member 121 is further moved leftward in the drawing together with the second jacket member 122 to accommodate the third jacket member 123 in the first jacket member 121. The steering shaft 110 is also expanded and contracted in the axial direction together with the steering jacket 120.

In the electrically adjustable steering 2 of the present embodiment, unlike the first embodiment, the first jacket member 121 and the second jacket member 122 are driven by one actuator 131. Therefore, it is preferable to prescribe a moving order constant by setting the resistance difference between the sliding resistance between the first jacket member 121 and the second jacket member 122 and the sliding resistance between the second jacket member 122 and the third jacket member 123.

That is, if the sliding resistance between the first jacket member 121 and the second jacket member 122 is set smaller than the sliding resistance between the second jacket member 122 and the third jacket member 123, the first jacket member 121 having small sliding resistance moves first, and then the second jacket member 122 can be moved. The reverse is also possible.

For example, the movement of the second jacket member 122 may be performed using a frictional force with the first jacket member 121. A stopper between the second jacket member 122 and the third jacket member 123 may be used for performing a telescopic motion of the first jacket member 121.

Alternatively, movement of the second jacket member 122 may be performed using a stopper of the first jacket member 121.

According to the electrically adjustable steering 2 of the present embodiment, the first jacket member 121 and the second jacket member 122 can be moved by the first telescopic actuator 131, and the telescopic mechanism can be simplified and reduced in weight. Further, by fixing the motor 141 which is a heavy object to the top bracket 103 having high rigidity, the natural frequency of the steering jacket 120 can be increased, and resonance can more likely be prevented.

Third Embodiment

Figure 7A:
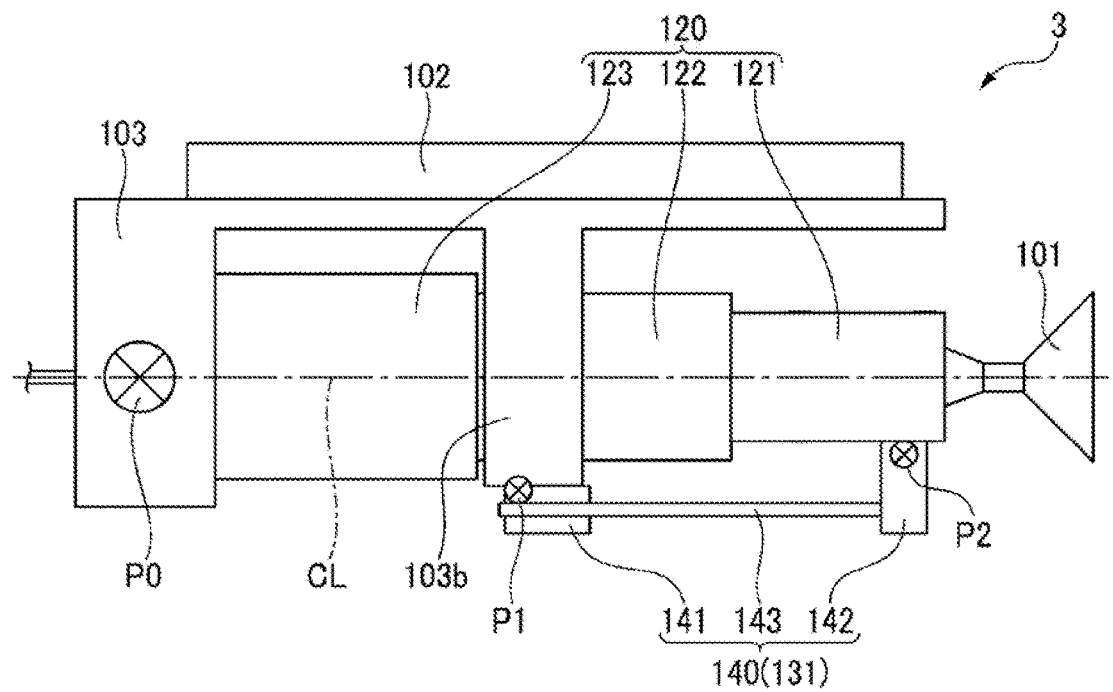
FIGS. 7A and 7B are side views schematically showing an electrically adjustable steering of a third embodiment.
Figure 7B:
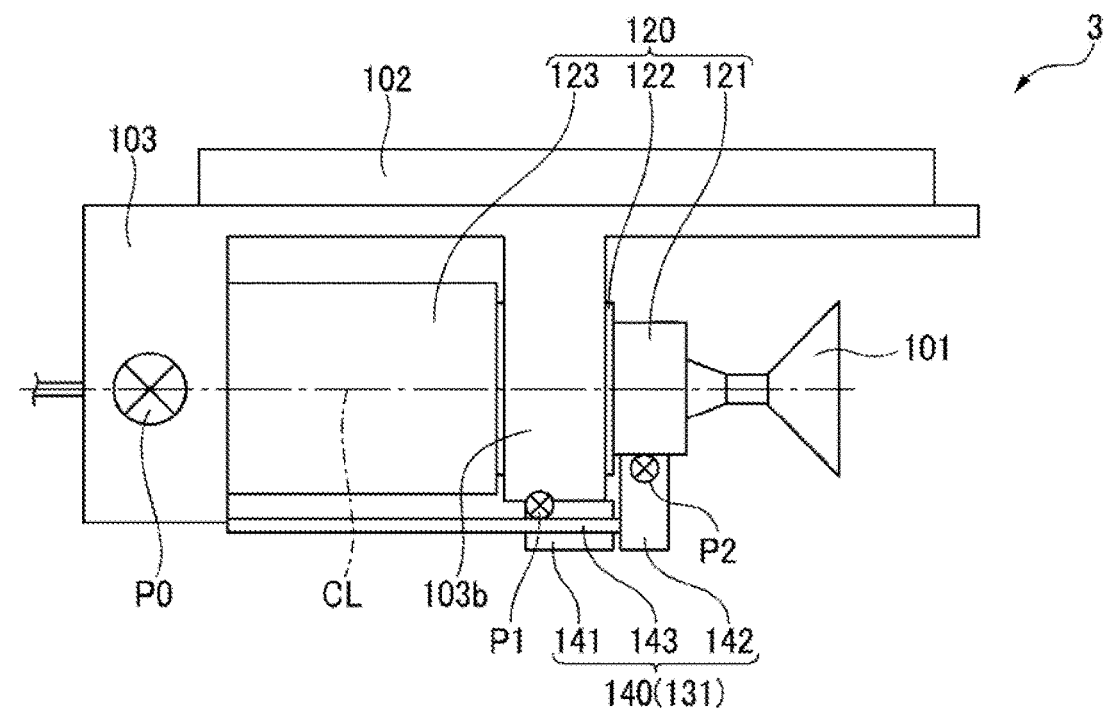

As shown in FIGS. 7A and 7B, similarly to the second embodiment, the electrically adjustable steering 3 of the third embodiment includes the first telescopic actuator 131 including the nut rotary actuator 140, but the first telescopic actuator 131 is disposed on a lower side (a side opposite to the mount bracket 102) in the drawing of a center line CL of the steering jacket 120. Specifically, the motor 141 of the first telescopic actuator 131 is connected to a lower end portion of a rear support portion 103b of the top bracket 103 via the pivot P1. Further, the screw shaft fixed block 142 that holds one end of the screw shaft 143 is connected to a lower side of the first jacket member 121 via the pivot P2.

By disposing the first telescopic actuator 131 below the center line CL of the steering jacket 120 in this manner, the number of components above the center line CL of the steering jacket 120 can be reduced as compared with the electrically adjustable steering 2 of the second embodiment.

In addition, the diameters increase in an order of the first jacket member 121, the second jacket member 122, and the third jacket member 123, and as shown in FIG. 7B, when the steering jacket 120 is shortened, the first jacket member 121 is fitted into the second jacket member 122, and the second jacket member 122 is fitted into the third jacket member 123.

In a configuration in which the diameters increase in the order of the first jacket member 121, the second jacket member 122, and the third jacket member 123, materials of each of the jacket members 121, 122, and 123 may include one, two, or three unique raw materials. However, in the first jacket member 121, the second jacket member 122, and the third jacket member 123 in direct sliding contact with each other, the materials preferably include a combination of different raw materials. For example, the first jacket member 121 and the third jacket member 123 may be made of steel, and the second jacket member 122 may be made of aluminum. Further, the first jacket member 121 can be made of steel, the second jacket member 122 can be made of aluminum, and the third jacket member 123 can be made of magnesium.

Fourth Embodiment

Figure 8A:
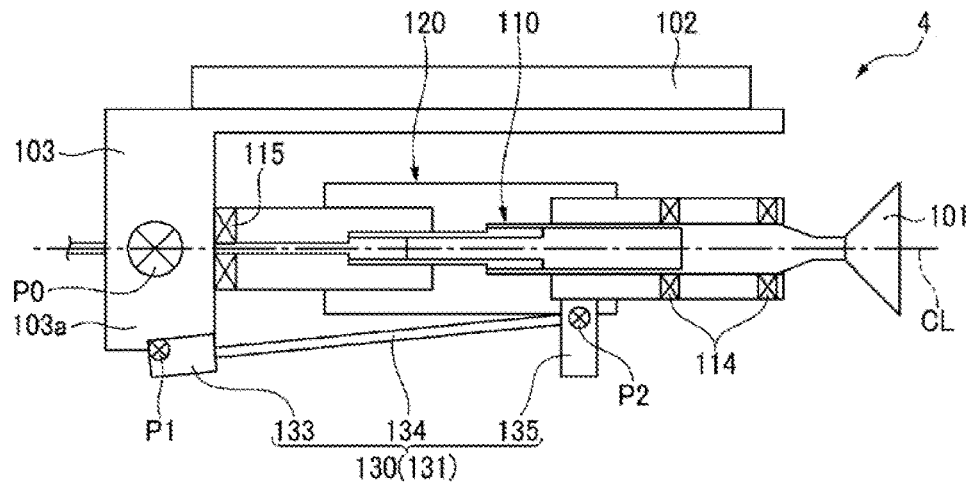
FIGS. 8A to 8C are cross-sectional views schematically showing an electrically adjustable steering of a fourth embodiment.
Figure 8B:
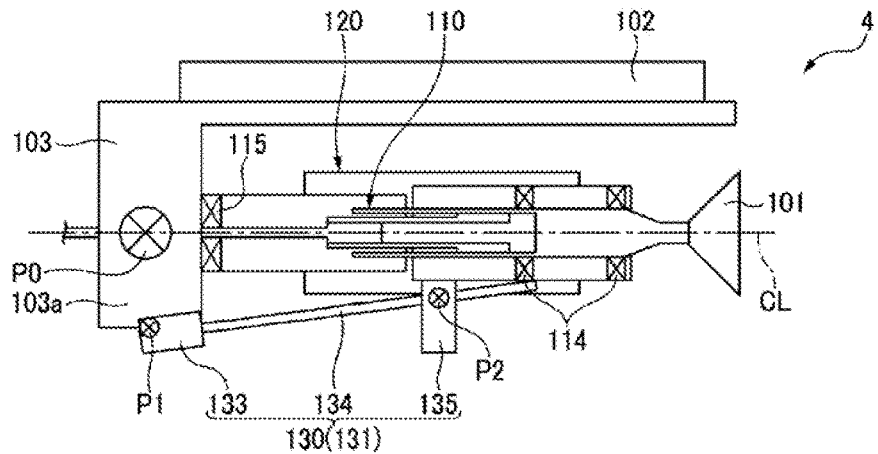
Figure 8C:
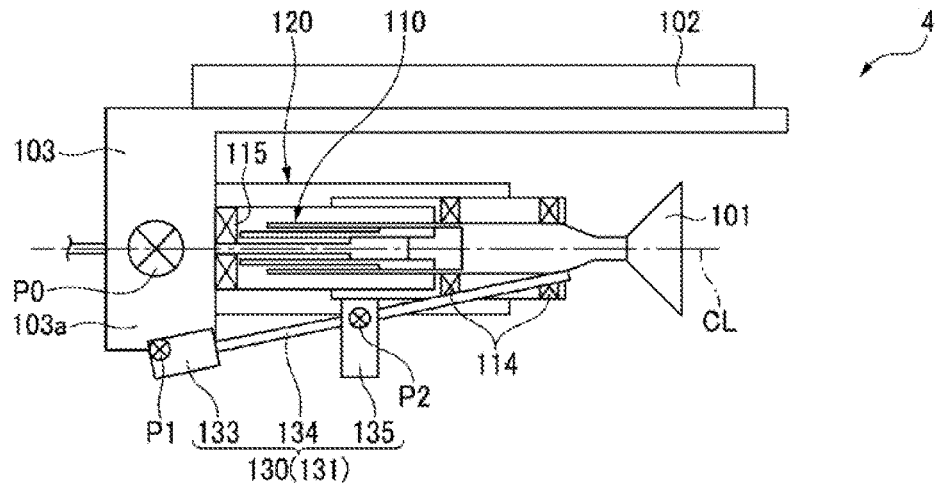

As shown in FIGS. 8A to 8C, the electrically adjustable steering 4 of the fourth embodiment includes only one first telescopic actuator 131 composed of the screw shaft rotary actuator 130, and is disposed between the top bracket 103 and the first jacket member 121. The motor 133 is rotatably connected to the front support portion 103a of the top bracket 103 via the pivot P1, and rotationally drives the screw shaft 134. The nut 135 is connected to an end portion of the first jacket member 121 on a side opposite to the steering wheel via the pivot P2. The screw shaft 134 is inclined so as to approach the center line CL of the steering jacket 120 from the motor 133 toward the nut 135.

Figure 9:
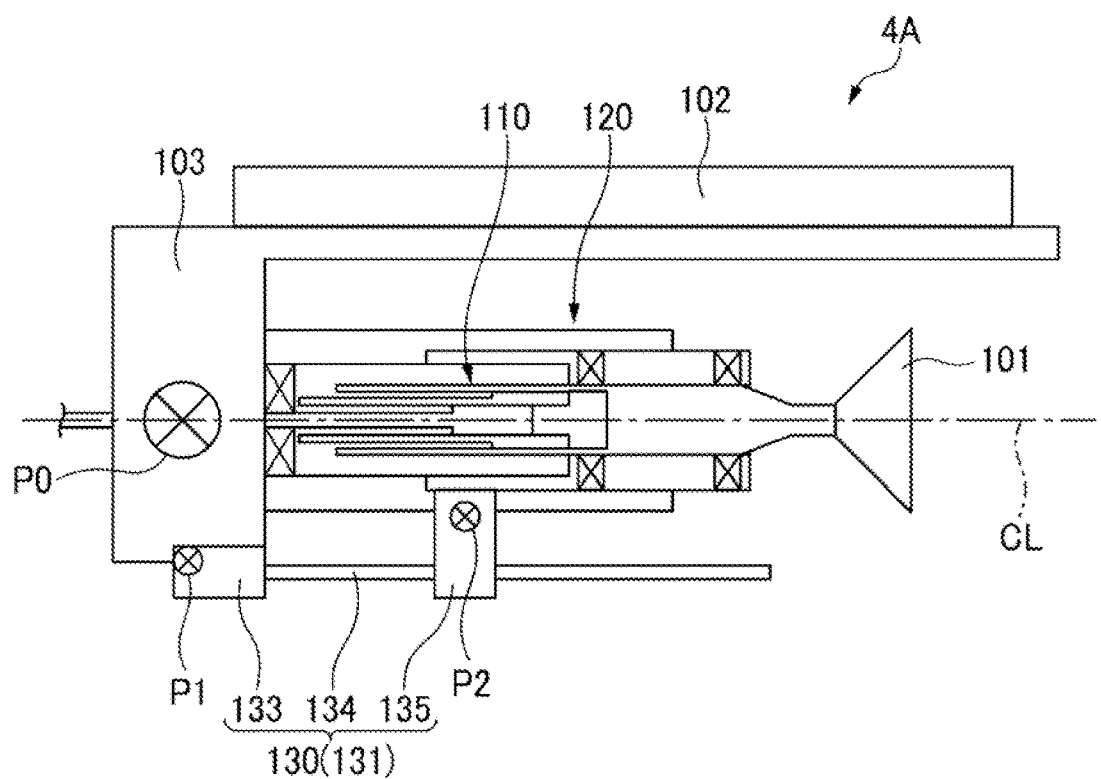
FIG. 9 is a cross-sectional view schematically showing an electrically adjustable steering of a third reference example.

A reason why the screw shaft 134 is inclined to the center line CL of the steering jacket 120 is described in comparison with an electrically adjustable steering 4A of a third reference example shown in FIG. 9. If the screw shaft 134 is disposed substantially parallel to the center line CL of the steering jacket 120 as the electrically adjustable steering 4A of the third reference example shown in FIG. 9, when the steering jacket 120 shortens, a tip of the screw shaft 134 may approach the steering wheel 101 to hinder steering operation. On the other hand, by inclining the tip of the screw shaft 134 so as to approach the center line CL of the steering jacket 120, as shown in FIG. 8B and FIG. 8C, even in a case where the steering jacket 120 shortens, the tip end of the screw shaft 134 does not hinder the steering operation.

Fifth Embodiment

Figure 10A:
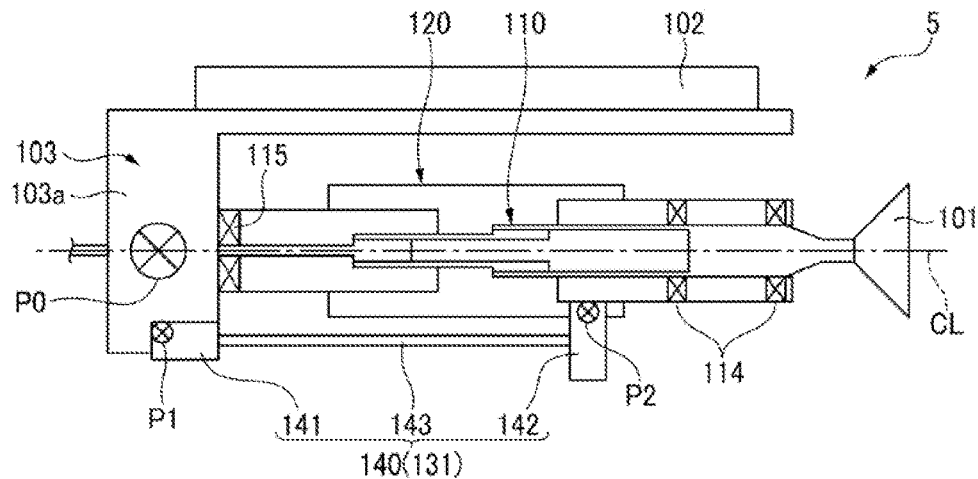
FIGS. 10A to 10C are cross-sectional views schematically showing an electrically adjustable steering of a fifth embodiment.
Figure 10B:
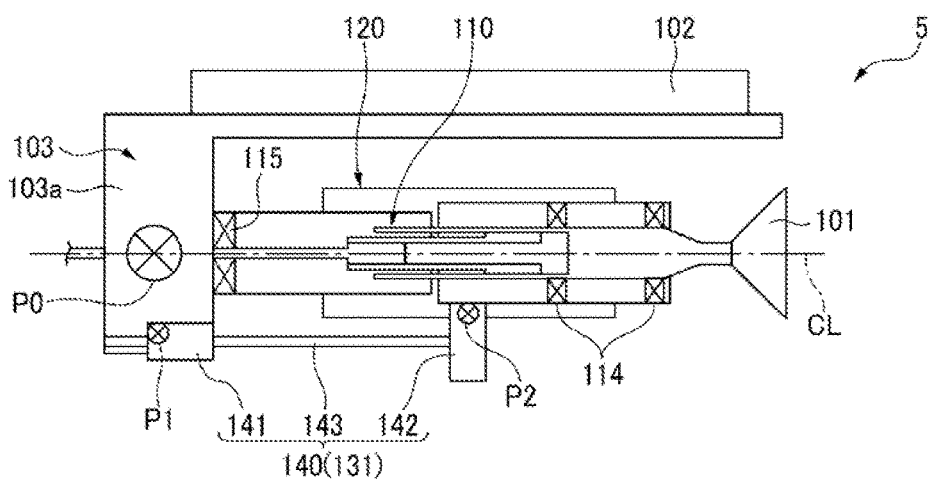
Figure 10C:
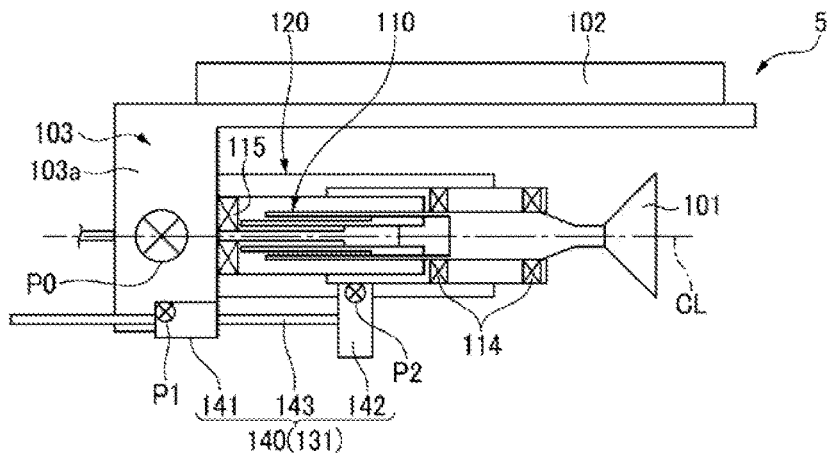

As shown in FIGS. 10A to 10C, the electrically adjustable steering 5 of the fifth embodiment includes the first telescopic actuator 131 composed of the nut rotary actuator 140, and the screw shaft 143 is disposed between the top bracket 103 and the first jacket member 121 by being substantially parallel to the center line CL of the steering jacket 120 in a horizontal state. The motor 141 is rotatably connected to the front support portion 103a of the top bracket 103 via the pivot P1, and the screw shaft fixed block 142 is connected to an end portion of the first jacket member 121 on the side opposite to the steering wheel via the pivot P2. The screw shaft 143 is screwed with a nut (not shown) that is rotationally driven by the motor 141.

According to the electrically adjustable steering 5 of the present embodiment, when the first telescopic actuator 131 operates to shorten the steering jacket 120, as shown in FIG. 10B and FIG. 10C, the tip of the screw shaft 143 projects forward of the vehicle body from the top bracket 103, so that the screw shaft 143 does not hinder the steering operation of the steering wheel 101. Further, since the motor 141 which is a heavy object is fixed to the top bracket 103 having high rigidity, the natural frequency of the steering jacket 120 can be increased, and resonance can more likely be prevented.

Sixth Embodiment

Figure 11A:
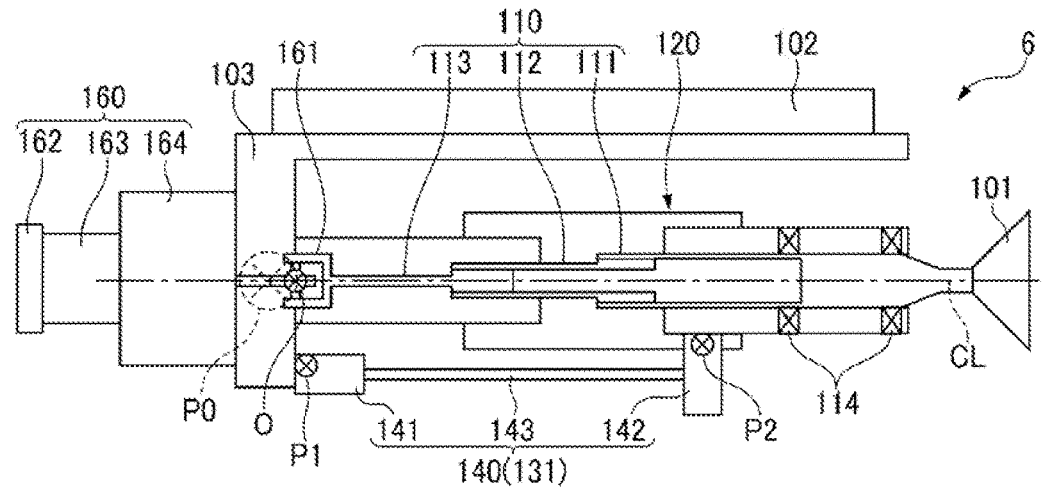
FIGS. 11A to 11C are cross-sectional views schematically showing an electrically adjustable steering of a sixth embodiment.
Figure 11B:
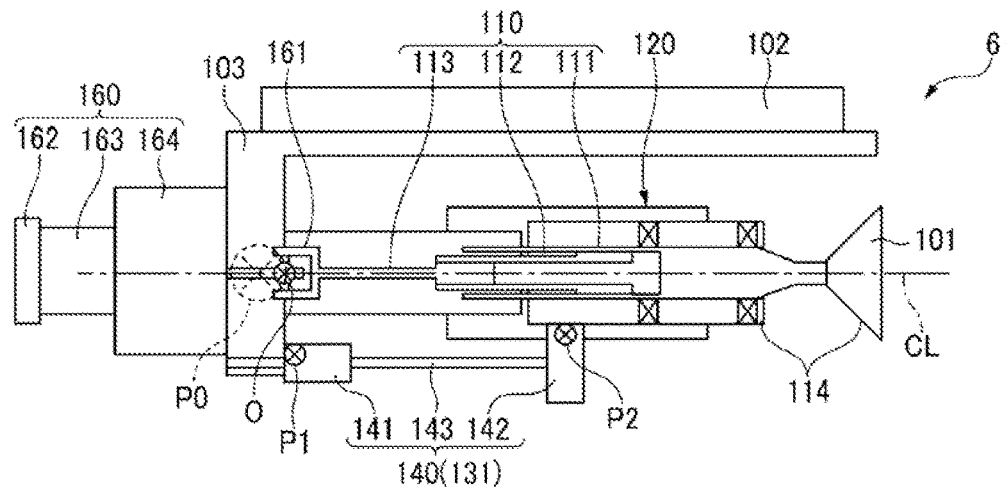
Figure 11C:
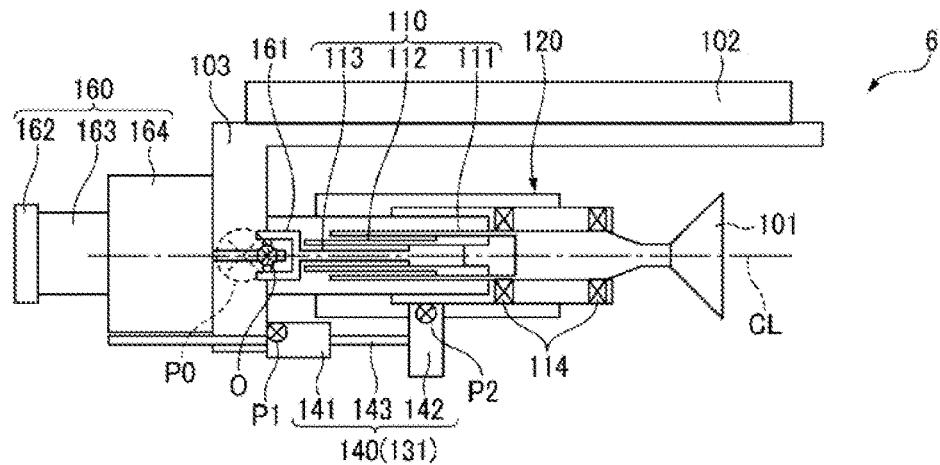

As shown in FIGS. 11A to 11C, the electrically adjustable steering 6 of the sixth embodiment is a so-called steer-by-wire form steering apparatus, and a road surface reaction force generation device 160 is fixed to the top bracket 103. The road surface reaction force generation device 160 includes an ECU 162, a drive motor 163, and a cover 164 for a worm gear or various sensors built in the cover separately. In the electrically adjustable steering 6 of the present embodiment, the steering wheel 101 and a pair of steered road wheels (not shown) are mechanically detached, various sensors detect a rotation amount, a rotation force, or the like of the steering wheel 101, the ECU 162 controls the drive motor 163 which is mechanically connected to the steering wheel and the worm gear according to the sensor information, and by converting to a linear motion via the pinion shaft and the steering gear unit, a pair of tie rods are pushed and pulled, and steering angles (tire angles) of a pair of steered road wheels are adjusted. An appropriate reaction force in an opposite direction to a steering direction of the steering wheel 101 is applied to the steering shaft 110.

The motor 141 of the first telescopic actuator 131 composed of the nut rotary actuator 140 is rotatably connected to the top bracket 103 via the pivot P1, and the screw shaft fixed block 142 is connected to an end portion of the first jacket member 121 on the side opposite to the steering wheel 101 via the pivot P2. The universal joint 161 is disposed between the third shaft member 113 and the road surface reaction force generation device 160 so that the steering shaft 110 can be smoothly bent at the time of tilting. The rotation center O of the universal joint 161 is preferably set at the same position as or a close position to the pivot P0, which is a center point at which the steering jacket 120 rotates at the time of tilting.

Other constituents are substantially the same as those of the fifth embodiment.

Seventh Embodiment

Figure 12A:
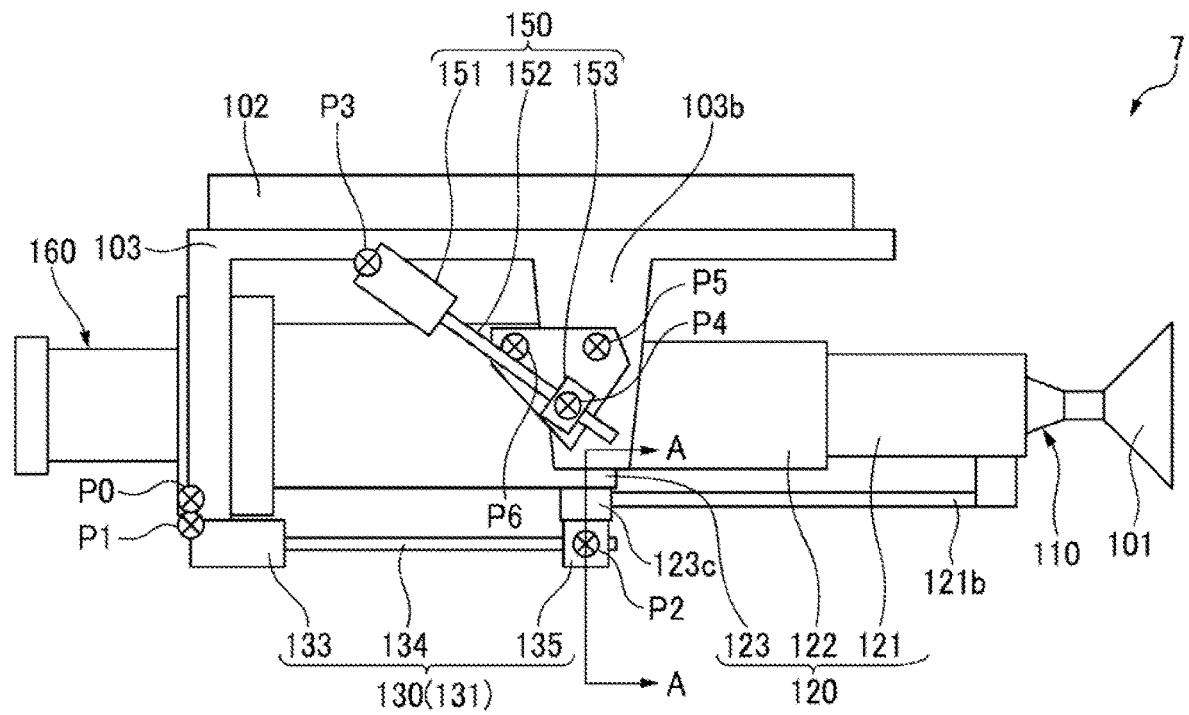
FIG. 12A is a side view schematically showing the electrically adjustable steering of a seventh embodiment.
Figure 12B:
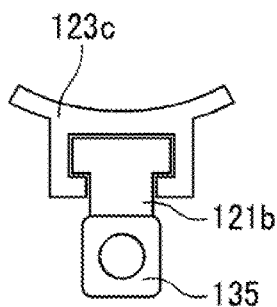
FIG. 12B is a cross-sectional view taken along line A-A of FIG. 12A.
Figure 12C:
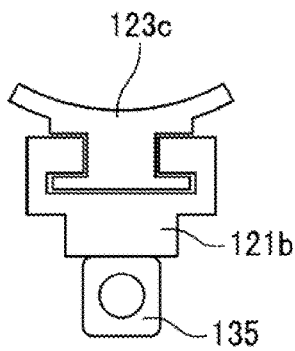
FIG. 12C is a modification of an extension bracket support portion corresponding to the cross-sectional view taken along line A-A of FIG. 12A.

As shown in FIGS. 12A to 12C, in the electrically adjustable steering 7 of the seventh embodiment, the steering jacket 120 including the road surface reaction force generation device 160 at a front end portion of the third jacket member 123 is rotatably connected to the top bracket 103 via the pivot P0.

In the steering jacket 120, the diameters are formed larger in an order of the first jacket member 121, the second jacket member 122, and the third jacket member 123.

A first extension bracket 121b projects in a radial direction from the end portion on the steering wheel side, then extends forward (left direction in the drawing) of the vehicle body, and is provided on the outer peripheral side of the first jacket member 121. The first telescopic actuator 131 is composed of the screw shaft rotary actuator 130, and the motor 133 is rotatably connected to the top bracket 103 via the pivot P1, and the nut 135 is connected to an end portion of a first extension bracket 121b on the vehicle body front side via the pivot P2. The pivot P1 of the motor 133 is disposed in the vicinity of the pivot P0 of tilt.

As shown in FIG. 12A or FIG. 12B, the end portion of the first extension bracket 121b on the vehicle body front side is slidably fitted to an extension bracket support portion 123c provided on the outer periphery of the third jacket member 123. With such a configuration, it is possible to use the screw shaft rotary actuator 130 which is cheap and has a small mechanism around a gear. Further, the motor 133 can be fixed to the top bracket 103 having high rigidity, and resonance can more likely be prevented by increasing the natural frequency of the steering jacket 120.

Further, by combination of the first extension bracket 121b and the first telescopic actuator 131, it is not necessary to form a slit in each of the jacket members 121, 122, and 123, and the rigidity of the steering jacket 120 can be increased.

Further, as shown in FIG. 12C, the extension bracket support portion 123c may be fitted to be surrounded by the first extension bracket 121b to slidably support the first extension bracket 121b.

Figure 13:
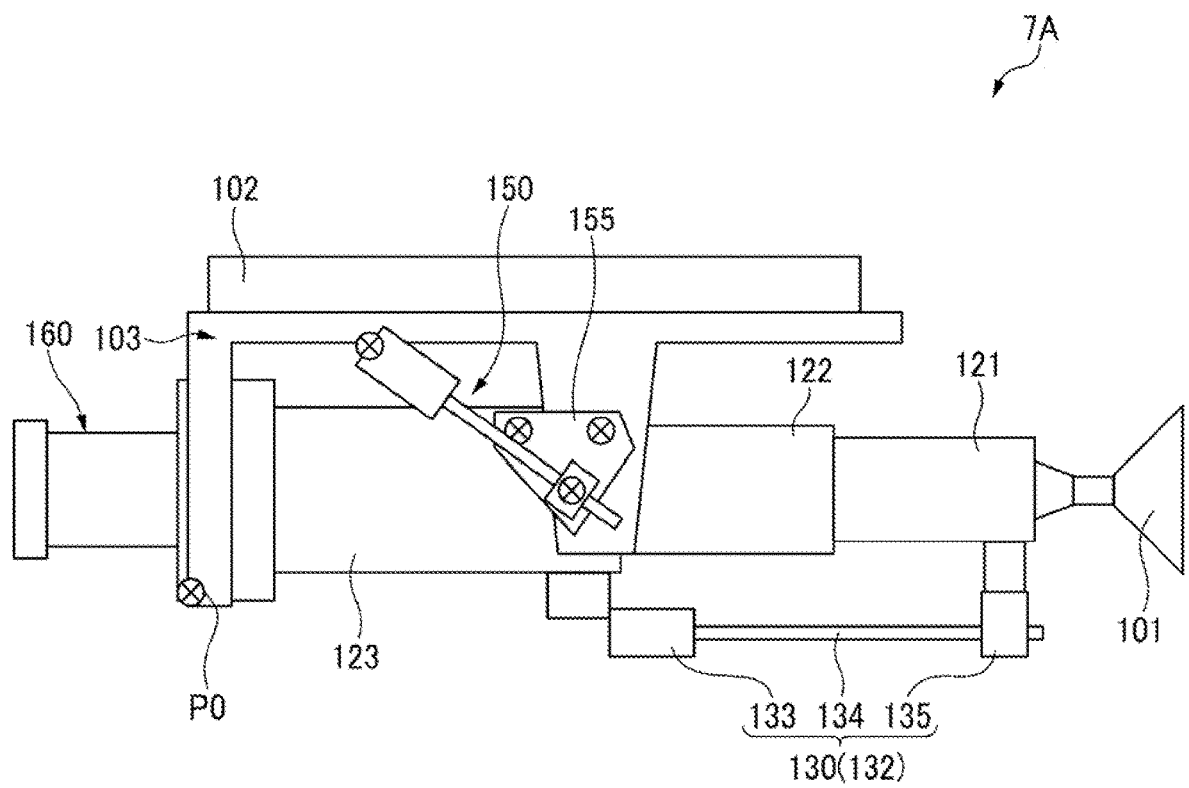
FIG. 13 is a side view schematically showing an electrically adjustable steering of a fourth reference example.

FIG. 13 is an electrically adjustable steering 7A of a fourth reference example for comparison with the electrically adjustable steering 7. In the electrically adjustable steering 7A of the fourth reference example, the first and second jacket members 121 and 122 are moved by the screw shaft rotary actuator 130 (second telescopic actuator 132) disposed between the third jacket member 123 and the first jacket member 121 without providing an extension bracket. In this case, since the motor 133 is supported by the third jacket 123, there is a problem that the motor 133 is disposed near a center of the steering jacket 120 and the natural frequency of the steering jacket 120 decreases. When the steering jacket 120 is shortened, there is also a problem that the tip of the screw shaft 134 projects toward the steering wheel 101.

Eighth Embodiment

Figure 14:
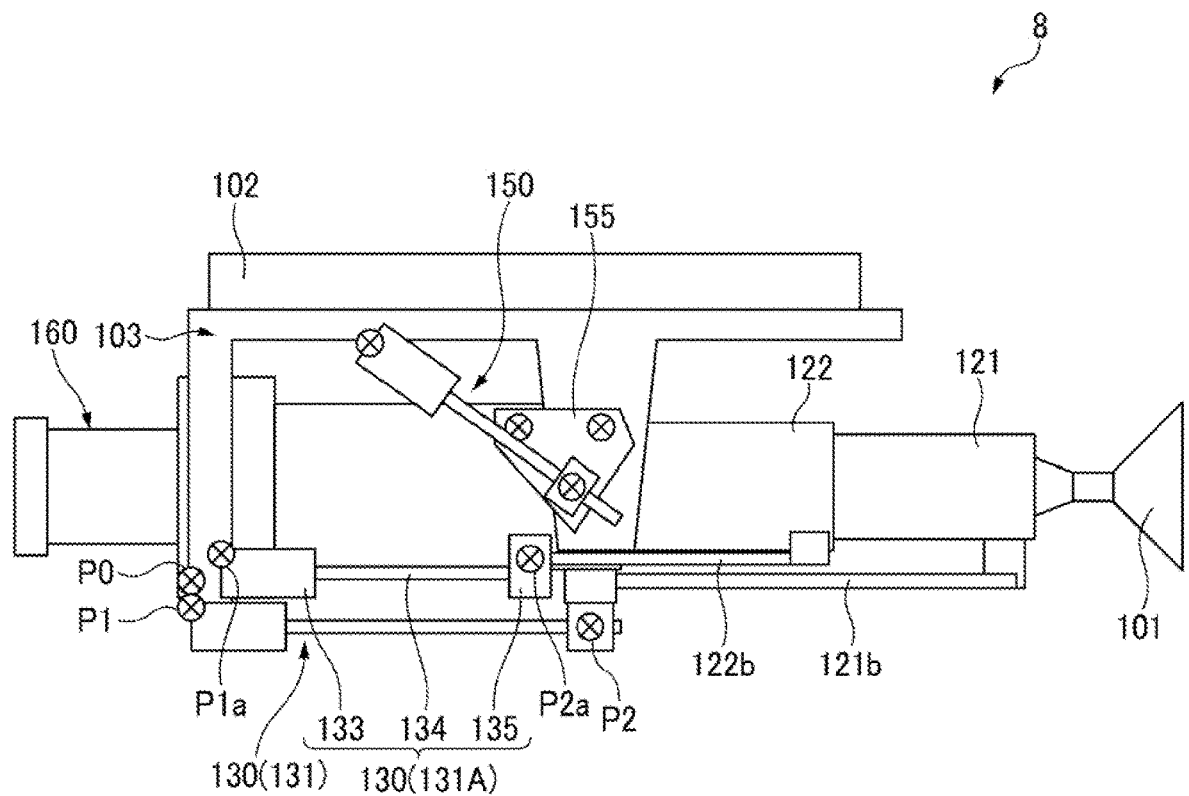
FIG. 14 is a side view schematically showing an electrically adjustable steering of an eighth embodiment.

As shown in FIG. 14, in an electrically adjustable steering 8 of the eighth embodiment, a second extension bracket 122b is provided on the second jacket member 122 with respect to the electrically adjustable steering 7 shown in FIGS. 12A to 12C. The first telescopic actuator 131 is disposed between the top bracket 103 and the first extension bracket 121b, and an additional first telescopic actuator 131A is disposed between the top bracket 103 and the tip of the second extension bracket 122b. Specifically, the motor 133 of the additional first telescopic actuator 131A is rotatably connected to the top bracket 103 via a pivot P1a, and the nut 135 of the additional first telescopic actuator 131A is connected to an end portion of the second extension bracket 122b on the vehicle body front side via a pivot P2a. Thus, by controlling each motor 133 of the first telescopic actuator 131 and the additional first telescopic actuator 131A, the movement order of the first jacket member 121 and the second jacket member 122 can be controlled independently.

Ninth Embodiment

Figure 15:
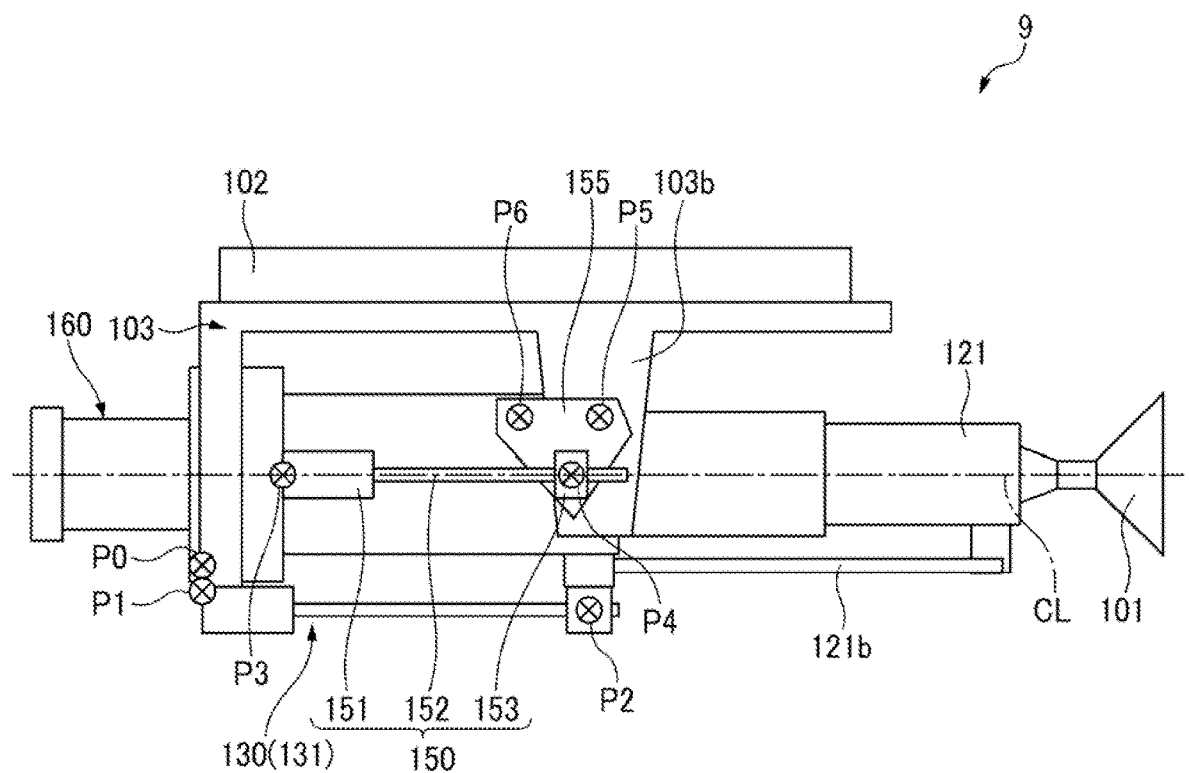
FIG. 15 is a side view schematically showing an electrically adjustable steering of a ninth embodiment.

As shown in FIG. 15, in the electrically adjustable steering 9 of the ninth embodiment, the tilt motor 151 of the tilt actuator 150 is rotatably connected to the road surface reaction force generation device 160 via the pivot P3 on the center line CL of the steering jacket 120. The nut 153 is rotatably connected to one end of a substantially triangular link member 155 via the pivot P4. The link member 155 is rotatably supported by the rear support portion 103b of the top bracket 103 by the pivot P5 provided at another end of the link member 155. Further, the pivot P6 provided at another end of the link member 155 is slidably connected to an outer peripheral surface of the third jacket member 123.

According to this structure, the pivot P6 does not slide during telescoping, and durability is excellent. In addition, the motor 133 of the first telescopic actuator 131 is supported by the top bracket 103 having high rigidity, and the tilt motor 151 of the tilt actuator 150 is supported by the road surface reaction force generation device 160 having high rigidity, so that the natural frequency of the steering jacket 120 can be increased.

Tenth Embodiment

Figure 16A:
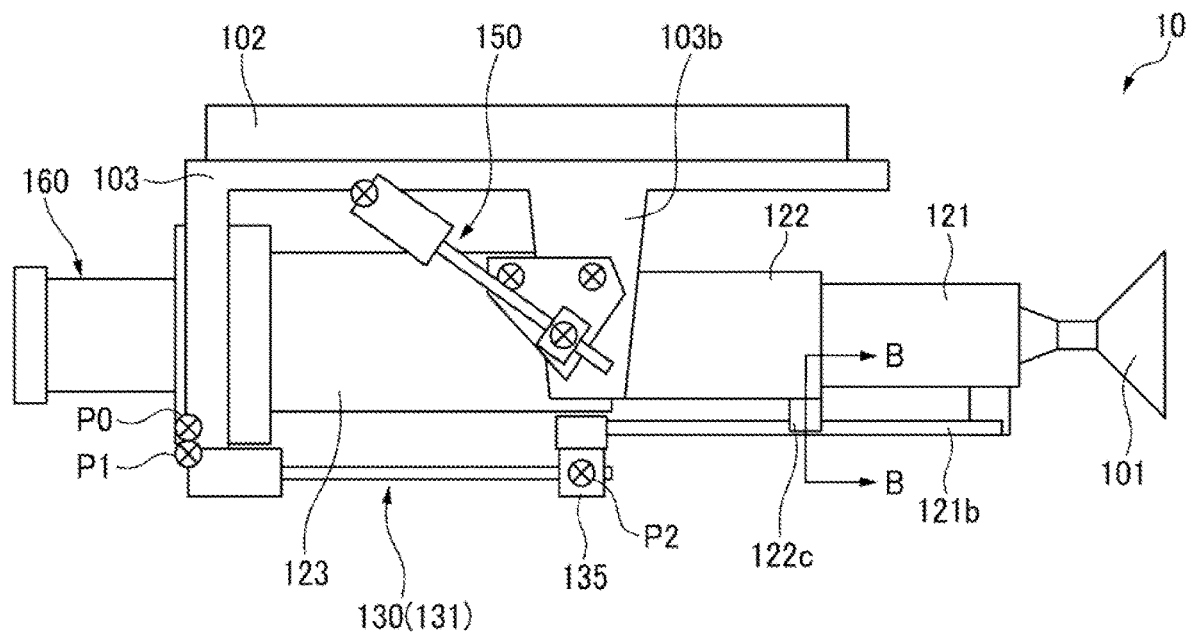
FIG. 16A is a side view schematically showing an electrically adjustable steering of a tenth embodiment.
Figure 16B:
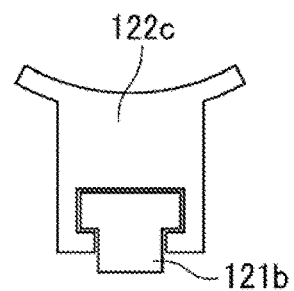
FIG. 16B is a cross-sectional view taken along line B-B of FIG. 16A.

As shown in FIGS. 16A and 16B, the electrically adjustable steering 10 of the tenth embodiment includes the first extension bracket 121b that projects in the radial direction to the outer peripheral side of the first jacket member 121 and then extends forward (left direction in the drawing) of the vehicle body. An axially intermediate portion of the first extension bracket 121b is slidably fitted to and supported by a second extension bracket support portion 122c provided on the outer periphery of the second jacket member 122. Further, the nut 135 of the first telescopic actuator 131 is connected to the end portion of the first extension bracket 121b on the vehicle body front side via the pivot P2.

Also in this case, by using the first extension bracket 121b, expansion and contraction of the steering shaft 110 and the steering jacket 120 in the axial direction can be achieved by a driving force of the first telescopic actuator 131.

Eleventh Embodiment

Figure 17A:
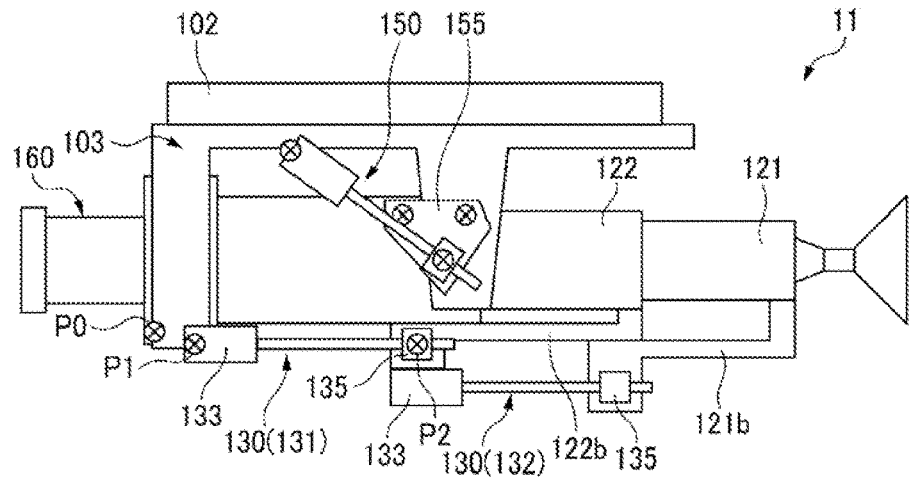
FIGS. 17A to 17C are side views schematically showing an electrically adjustable steering of an eleventh embodiment.
Figure 17B:
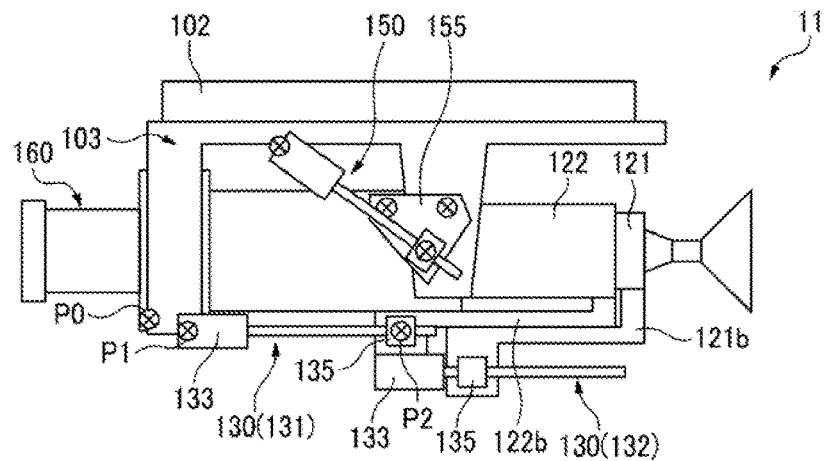
Figure 17C:
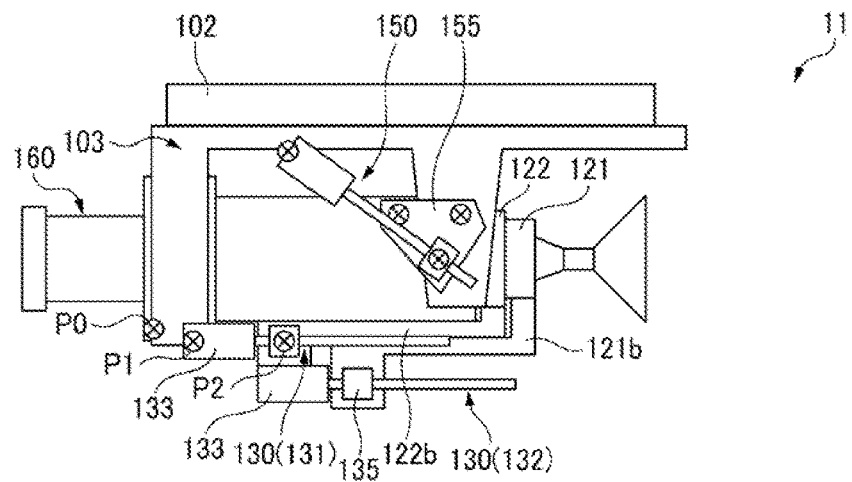

As shown in FIGS. 17A to 17C, in the electrically adjustable steering 11 of the eleventh embodiment, the first extension bracket 121b is extended forward of the vehicle from the end portion of the first jacket member 121 on the steering wheel 101 side, and the second extension bracket 122b is extended forward of the vehicle from the end portion of the second jacket member 122 on the steering wheel 101 side. The first telescopic actuator 131 is disposed between the top bracket 103 and the second extension bracket 122b via the pivots P1 and P2. The second telescopic actuator 132 is disposed between the end portion of the second extension bracket 122b on the vehicle body front side and the first extension bracket 121b. Both of the first telescopic actuator 131 and the second telescopic actuator 132 of the present embodiment are composed of the screw shaft rotary actuator 130.

Thus, by individually driving the first telescopic actuator 131 and the second telescopic actuator 132, the movement order of the first jacket 121 and the second jacket 122 can be controlled. In addition, by simultaneously driving the first telescopic actuator 131 and the second telescopic actuator 132, fast expansion and contraction of the steering shaft 110 and the steering jacket 120 can be realized.

Twelfth Embodiment

Figure 18A:
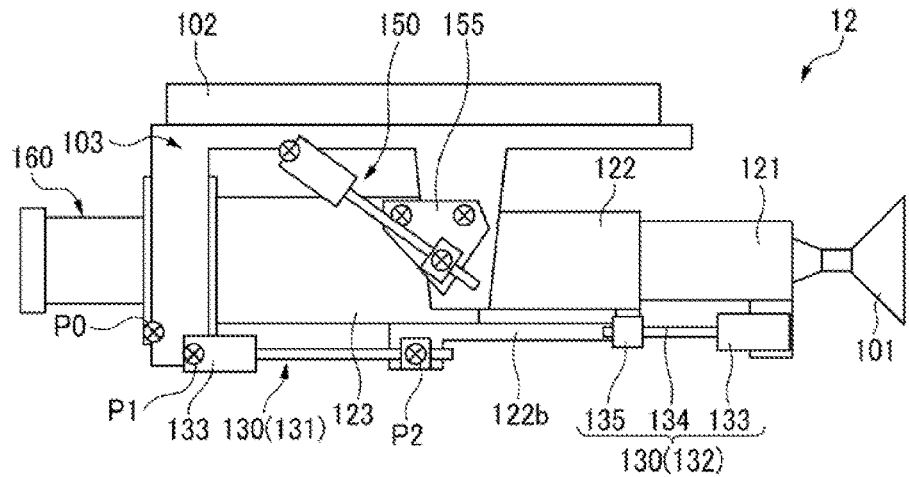
FIGS. 18A to 18C are side views schematically showing an electrically adjustable steering of a twelfth embodiment.
Figure 18B:
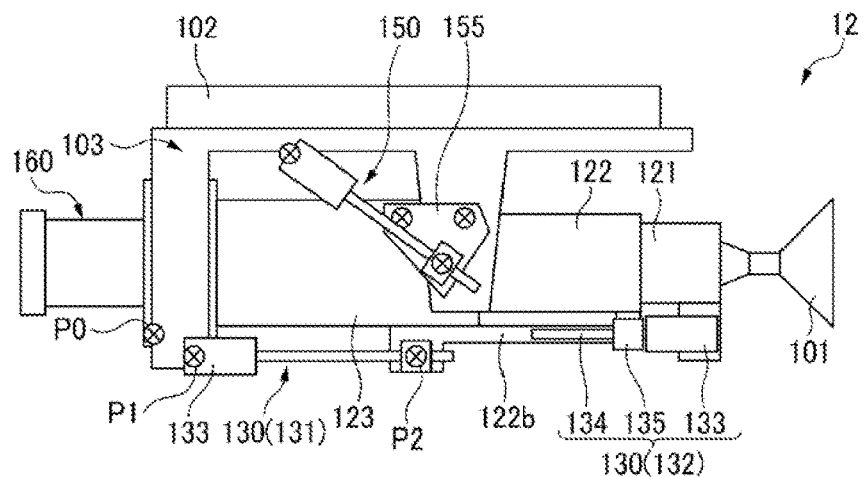
Figure 18C:
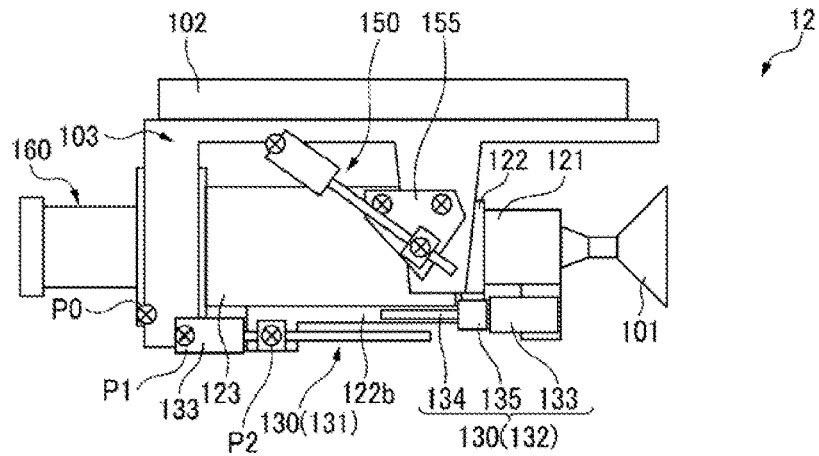

As shown in FIGS. 18A to 18C, in the electrically adjustable steering 12 of the twelfth embodiment, the second jacket member 122 includes the second extension bracket 122b extended forward of the vehicle from the end portion on the steering wheel 101 side. The first telescopic actuator 131 composed of the screw shaft rotary actuator 130 via the pivots P1 and P2 is disposed between the top bracket 103 and the second extension bracket 122b. The second actuator 132 composed of the screw shaft rotary actuator 130 is disposed between the first jacket member 121 and the second jacket member 122. The motor 133 of the second telescopic actuator 132 is fixed to the first jacket member 121, and the nut 135 is fixed to the extension bracket 122b of the second jacket member 122.

Also in this case, by individually driving the first telescopic actuator 131 and the second telescopic actuator 132, the movement order of the first jacket 121 and the second jacket 122 can be controlled. In addition, by simultaneously driving the first telescopic actuator 131 and the second telescopic actuator 132, fast expansion and contraction of the steering shaft 110 and the steering jacket 120 can be realized.

Thirteenth Embodiment

Figure 19A:
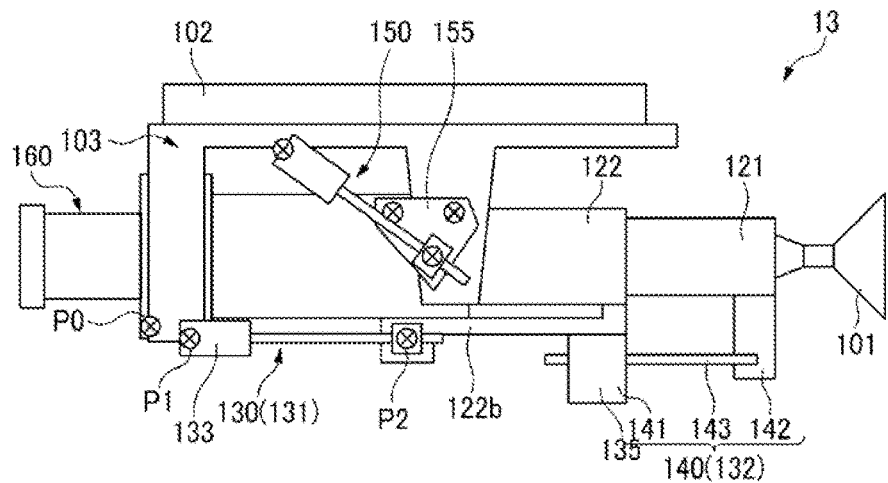
FIGS. 19A to 19C are side views schematically showing an electrically adjustable steering of a thirteenth embodiment.
Figure 19B:
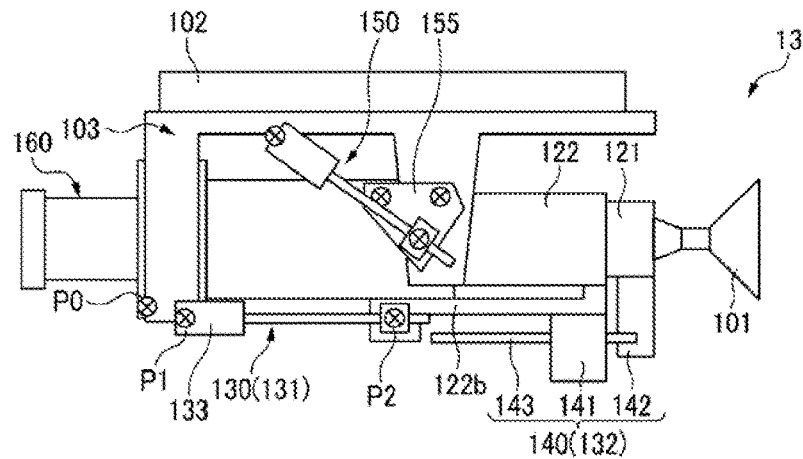
Figure 19C:
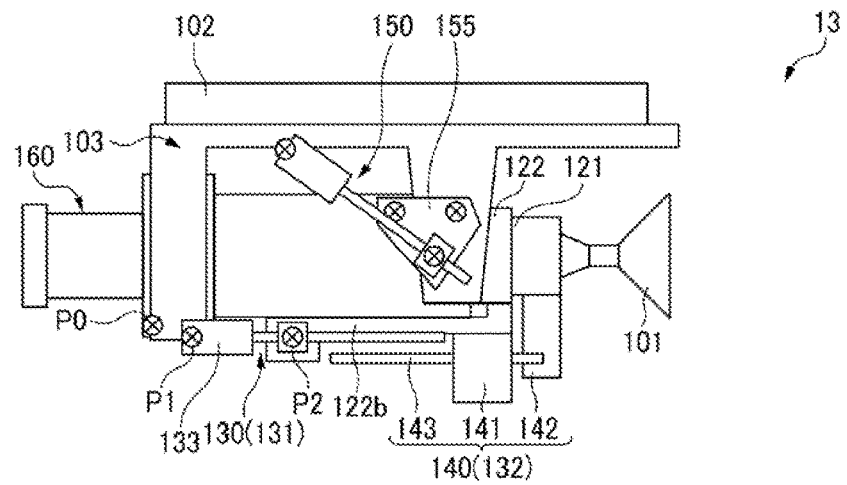

As shown in FIGS. 19A to 19C, in the electrically adjustable steering 13 of the thirteenth embodiment, the second telescopic actuator 132 between the first jacket member 121 and the second jacket member 122 is composed of the nut rotary actuator 140 with respect to the electrically adjustable steering 12 shown in FIGS. 18A to 18C. In this case, the motor 141 is fixed to the second extension bracket 122b of the second jacket member 122, and the screw shaft fixed block 142 is fixed to the first jacket member 121.

Fourteenth Embodiment

Figure 20A:
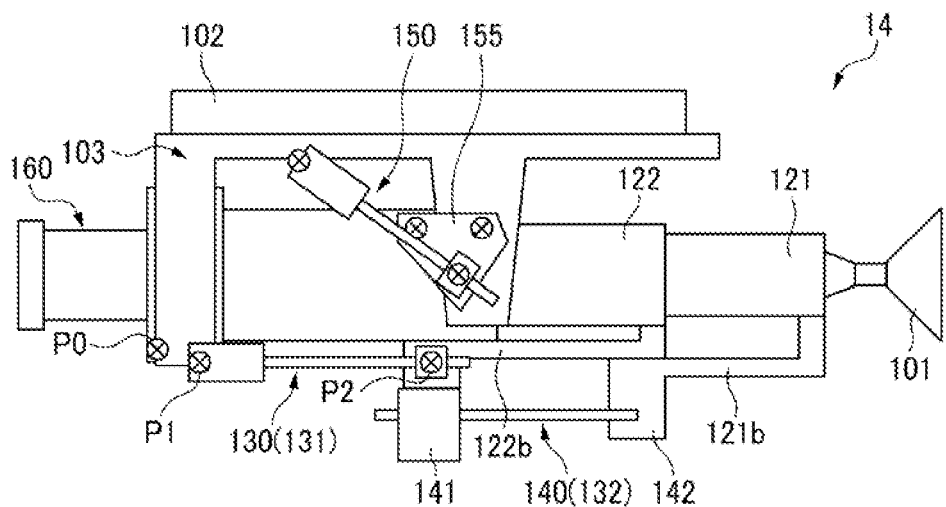
FIGS. 20A to 20C are side views schematically showing an electrically adjustable steering of a fourteenth embodiment.
Figure 20B:
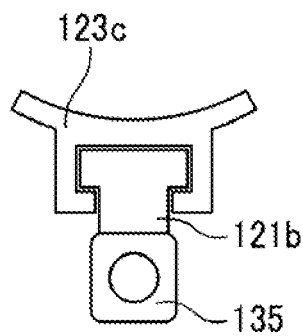
Figure 20C:
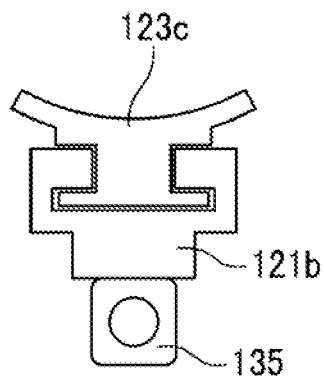

As shown in FIGS. 20A to 20C, in the electrically adjustable steering 14 of the fourteenth embodiment, the second telescopic actuator 132 between the second extension bracket 122b and the first extension bracket 121b is composed of the nut rotary actuator 140 with respect to the electrically adjustable steering 11 shown in FIGS. 17A to 17C. In this case, the motor 141 is fixed to the end portion of the second extension bracket 122b on the vehicle front side, and the screw shaft fixed block 142 is fixed to the end portion of the first extension bracket 121b on the vehicle front side.

Fifteenth Embodiment

Figure 21A:
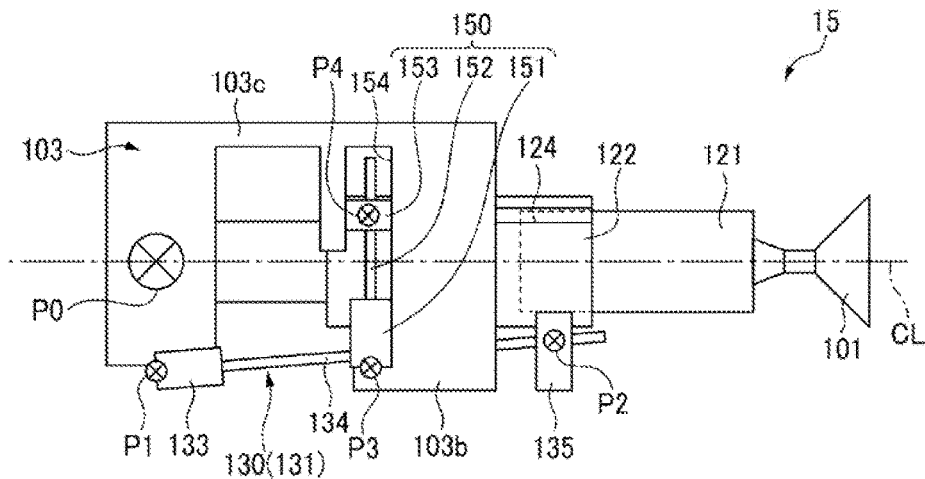
FIG. 21A is a side view schematically showing an electrically adjustable steering of a fifteenth embodiment.
Figure 21B:
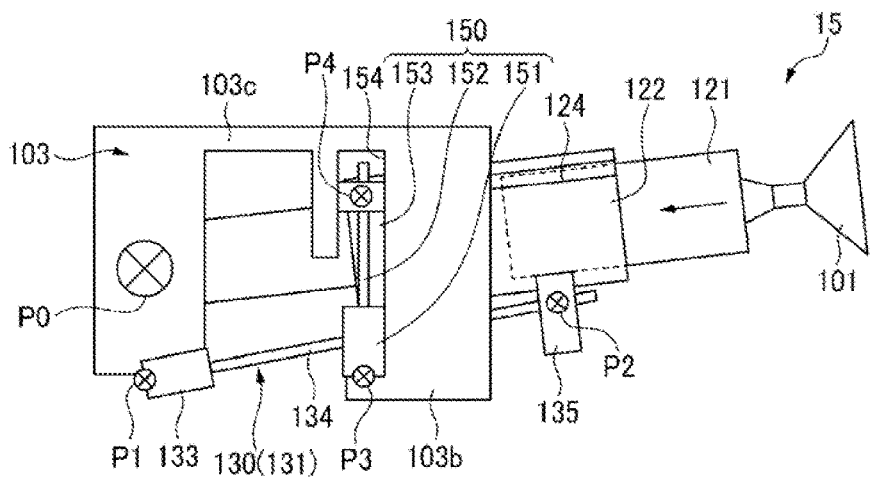
FIG. 21B is a side view showing a state in which a steering jacket length changes by a tilting motion.

As shown in FIG. 21, in the electrically adjustable steering 15 of the fifteenth embodiment, the screw shaft 134 of the first telescopic actuator 131 is inclined so as to approach the center line CL of the steering jacket 120 from the motor 133 toward the nut 135. As in the fourth embodiment, the nut 135 is fixed to the first jacket member 121.

The tilt actuator 150 is disposed between the top bracket 103 and the second jacket member 122. The top bracket 103 is provided such that a guide groove 154 for guiding the nut 153 of the tilt actuator 150 is orthogonal to the center line CL of the steering jacket 120 in front of the vehicle of the rear support portion 103b. The nut 153 is also slidably fitted in the groove 124 formed in the axial direction on the outer peripheral surface of the second jacket member 122. The tilt motor 151 of the tilt actuator 150 is rotatably supported by the rear support portion 103b of the top bracket 103 by the pivot P3, and the screw shaft 152 is screwed to the nut 153.

Figure 21C:
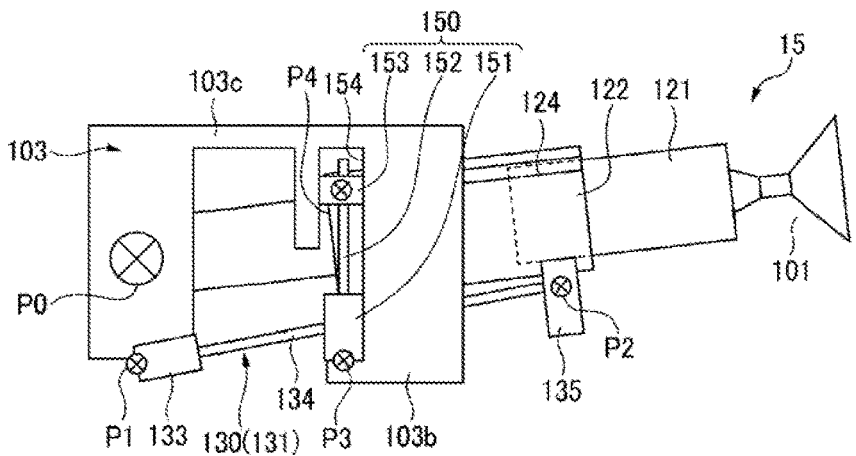
FIG. 21C is a side view showing a state in which the steering jacket length is corrected.

In the electrically adjustable steering 15, since a rotation center position (pivot P0) of the steering jacket 120 at the time of tilt and a rotation center position (pivot P1) of the first telescopic actuator 131 are offset, when the tilting motion is performed, the length of the steering jacket 120 changes (shortens in FIG. 21B) at the same time. In order to prevent a change in the length of the steering jacket 120, in the electrically adjustable steering 15, the motor 133 of the first telescopic actuator 131 may be optionally controlled in conjunction with the tilting motion to correct the change in the length of the steering jacket 120 at the time of tilt, and as shown in FIG. 21C, the length of the steering jacket 120 is maintained constant.

Sixteenth Embodiment

Figure 22A:
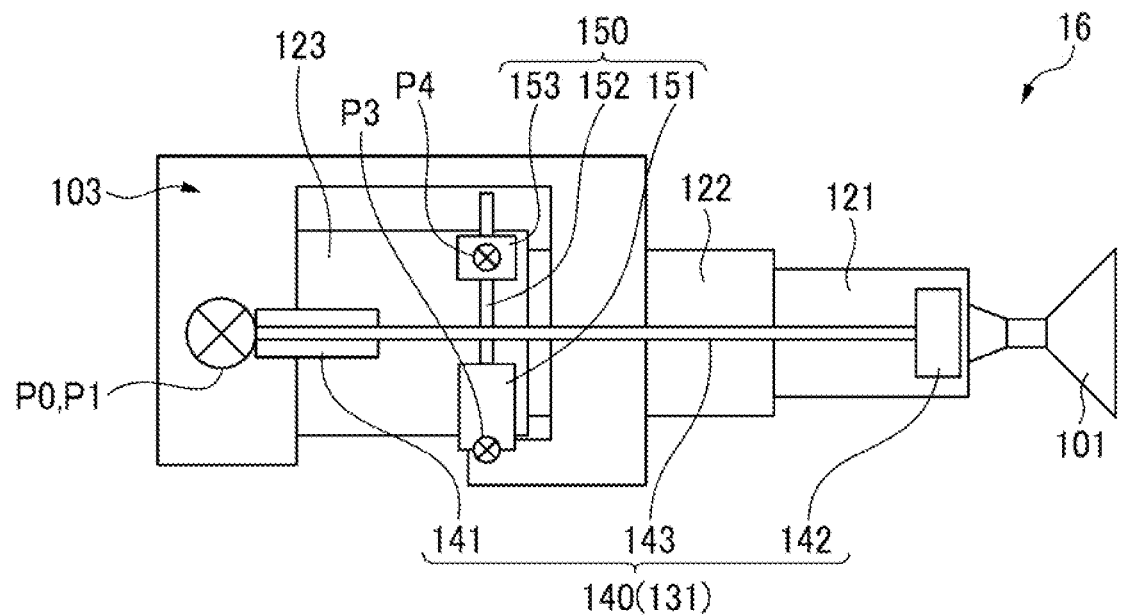
FIG. 22A is a side view showing a state before a tilting motion of an electrically adjustable steering of a sixteenth embodiment.
Figure 22B:
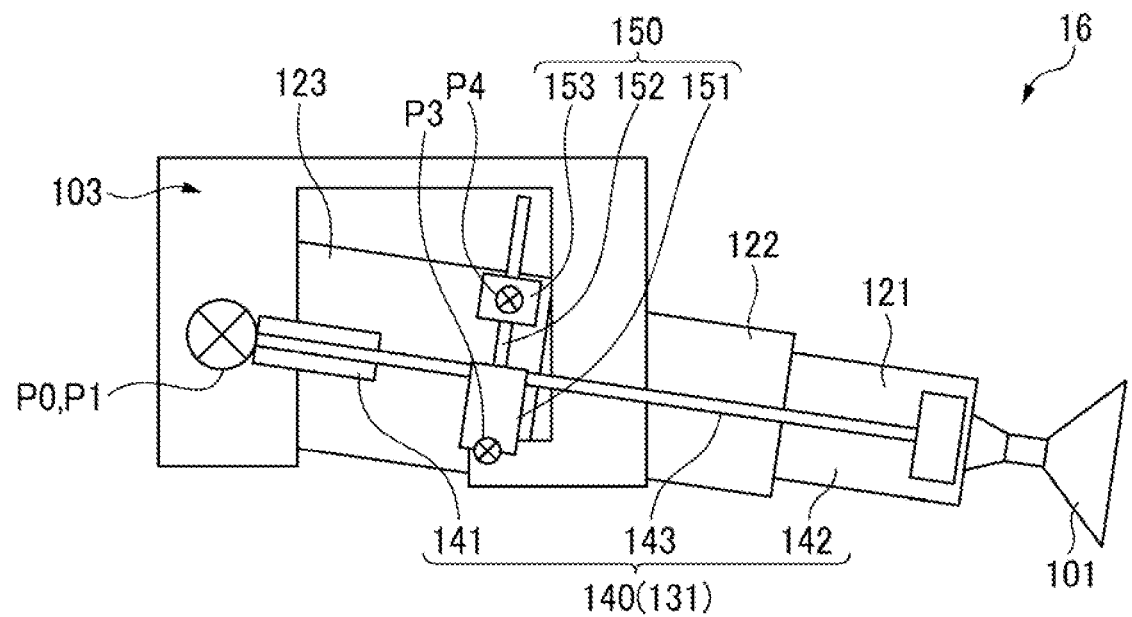
FIG. 22B is a side view showing a state after the tilting motion.

As shown in FIG. 22, in the electrically adjustable steering 16 of the sixteenth embodiment, the rotational center position (pivot P0) of the steering jacket 120 at the time of tilt and the rotational center position (pivot P1) of the motor 141 of the first telescopic actuator 131 composed of the nut rotary actuator 140 are set at the same position. Therefore, no change in the length of the steering jacket 120 occurs at the time of tilt.

In the present embodiment, the diameters become larger in an order of the first jacket member 121, the second jacket member 122, and the third jacket member 123. The tilt actuator 150 is disposed between the top bracket 103 and the third jacket member 123 such that an axis direction thereof is substantially orthogonal to the center line CL of the steering jacket 120. The tilt motor 151 is rotatably connected to the rear support portion 103b of the top bracket 103 via the pivot P3, and the nut 153 is rotatably connected to the third jacket member 123 via the pivot P4.

Seventeenth Embodiment

Figure 23A:
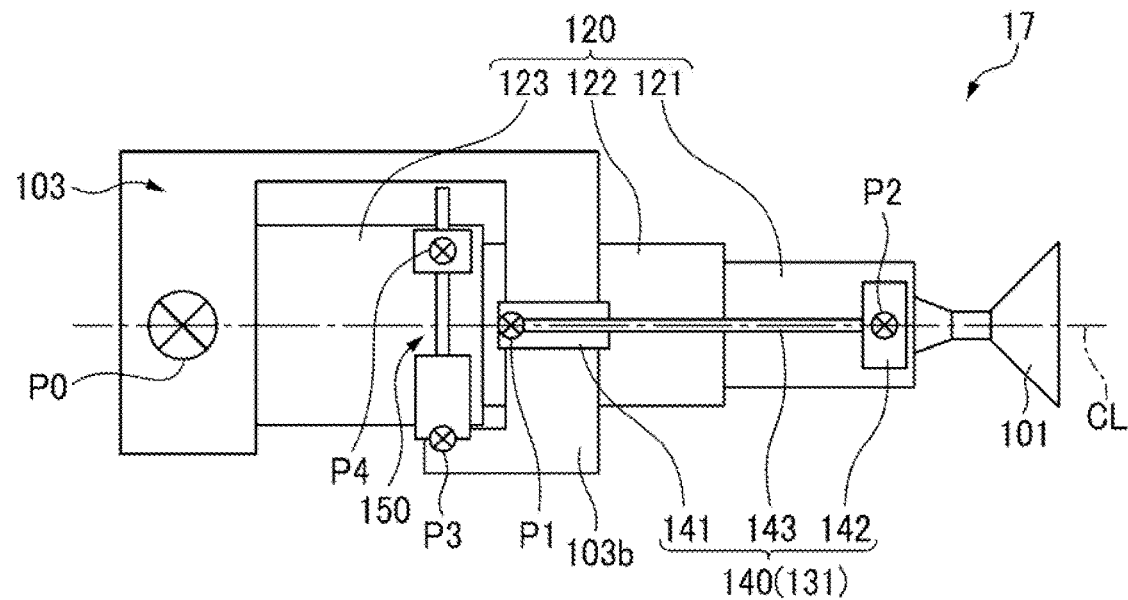
FIGS. 23A and 23B are side views schematically showing an electrically adjustable steering of a seventeenth embodiment.
Figure 23B:
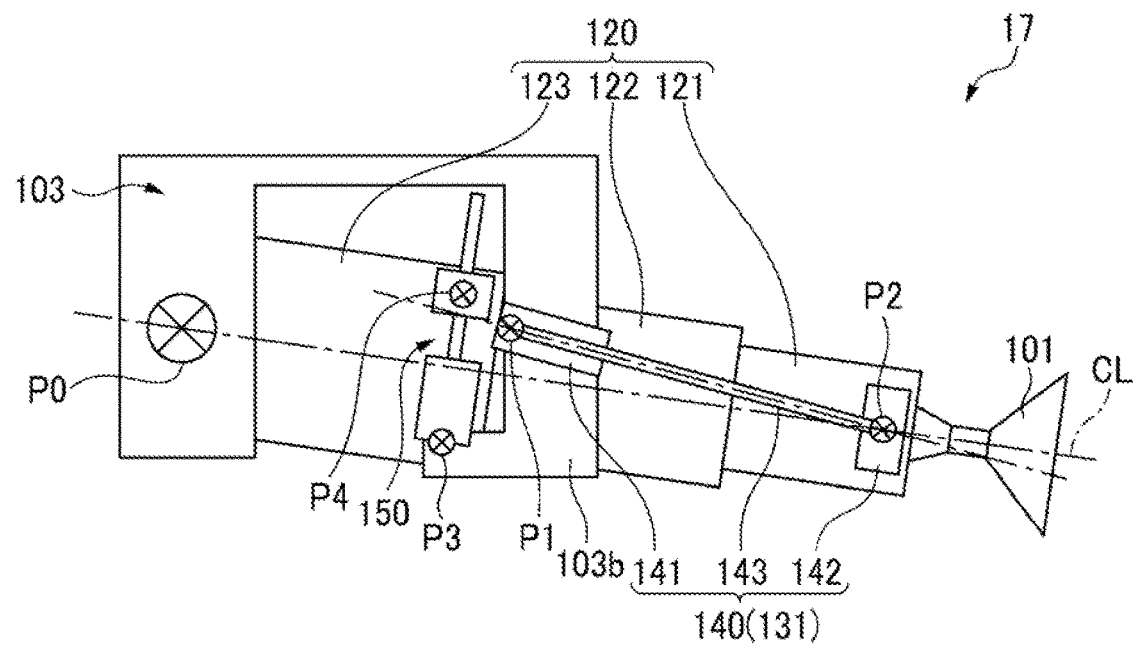

As shown in FIGS. 23A and 23B, in the electrically adjustable steering 17 of the seventeenth embodiment, the motor 141 of the first telescopic actuator 131 is attached to the rear support portion 103b of the top bracket 103. When the steering jacket 120 is positioned at the center (horizontal state) of a tilt range, a rotation center (pivot P0) of the steering jacket 120 and a rotation center (pivot P1) of the motor 141 of the first telescopic actuator 131 composed of the nut rotary actuator 140 are disposed so as to be positioned on the center line CL of the steering jacket 120. Thus, as shown in FIG. 23B, it is possible to reduce the change in the length of the steering jacket 120 when tilted.

Eighteenth Embodiment

Figure 24:
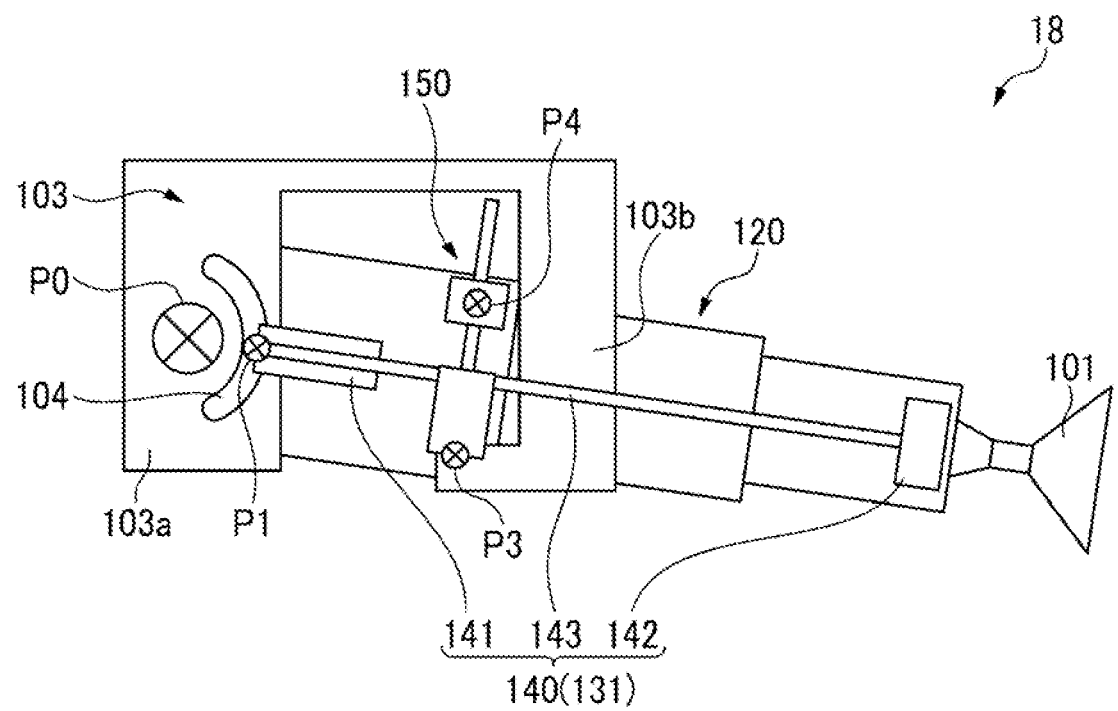
FIG. 24 is a side view schematically showing an electrically adjustable steering of an eighteenth embodiment.

As shown in FIG. 24, in the electrically adjustable steering 18 of the eighteenth embodiment, the first telescopic actuator 131 composed of the nut rotary actuator 140 is disposed between the front support portion 103a of the top bracket 103 and the first jacket member 121. The top bracket 103 is provided with an arc-shaped groove 104 centered on the rotation center (pivot P0) of the steering jacket 120. The pivot P1 of the motor 141 of the first telescopic actuator 131 is slidably fitted into the arc-shaped groove 104. Accordingly, when the steering jacket 120 rotates (tilts) about the pivot P0, the pivot P1 is guided to the arc-shaped groove 104 and moves in an arc shape, so that the length of the steering jacket 120 does not change even at the time of tilt.

Nineteenth Embodiment

Figure 25:
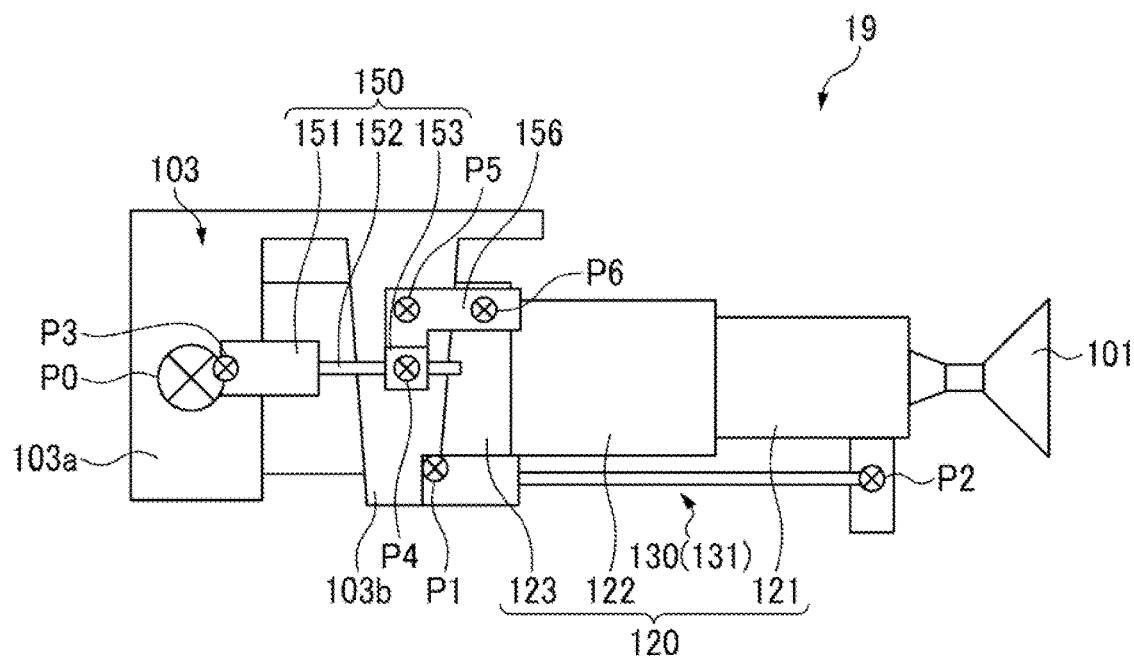
FIG. 25 is a side view schematically showing an electrically adjustable steering of a nineteenth embodiment.

As shown in FIG. 25, in the electrically adjustable steering 19 of the nineteenth embodiment, the tilt motor 151 of the tilt actuator 150 is rotatably connected to the front support portion 103a of the top bracket 103 via the pivot P3 near vicinity of the rotation center position (pivot P0) of the steering jacket 120, and the nut 153 is rotatably connected to one end of an L-shaped link member 156 by the pivot P4. A central portion of the L-shaped link member 156 is rotatably connected to the rear support portion 103*b* of the top bracket 103 by the pivot P5, and the other end of the L-shaped link member 156 is rotatably connected to the third jacket member 123 by the pivot P6, which can also slide on the third jacket member in the axial direction.

Accordingly, by rotating the L-shaped link member 156 by the tilt motor 151, the steering jacket 120 is swung via the third jacket member 123. The first telescopic actuator 131 composed of the nut rotary actuator 130 is disposed between the rear support portion 103*b* of the top bracket 103 and the first jacket member 121.

Twentieth Embodiment

Figure 26:
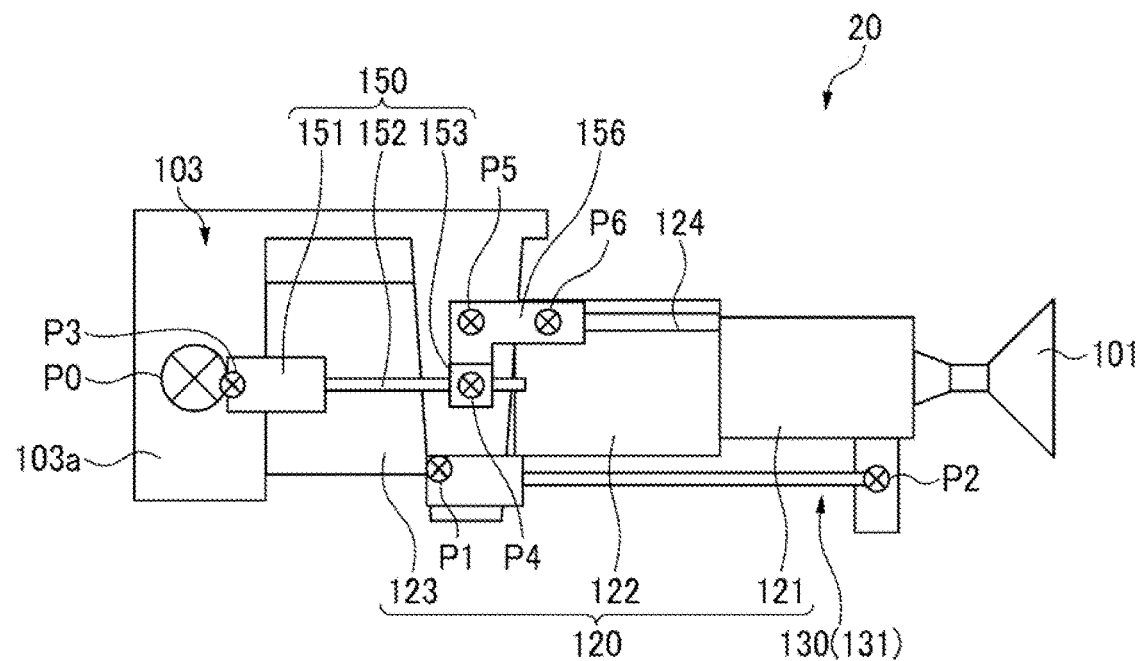
FIG. 26 is a side view schematically showing an electrically adjustable steering of a twentieth embodiment.

As shown in FIG. 26, in the electrically adjustable steering 20 of the twentieth embodiment, the pivot P6 of the L-shaped link member 156 is slidably fitted in a groove 124 provided in the axial direction on the second jacket member 122 with respect to the electrically adjustable steering 19 shown in FIG. 25. Accordingly, by rotating the L-shaped link member 156 by the tilt motor 151, the steering jacket 120 is swung via the second jacket member 122.

Twenty-First Embodiment

Figure 27:
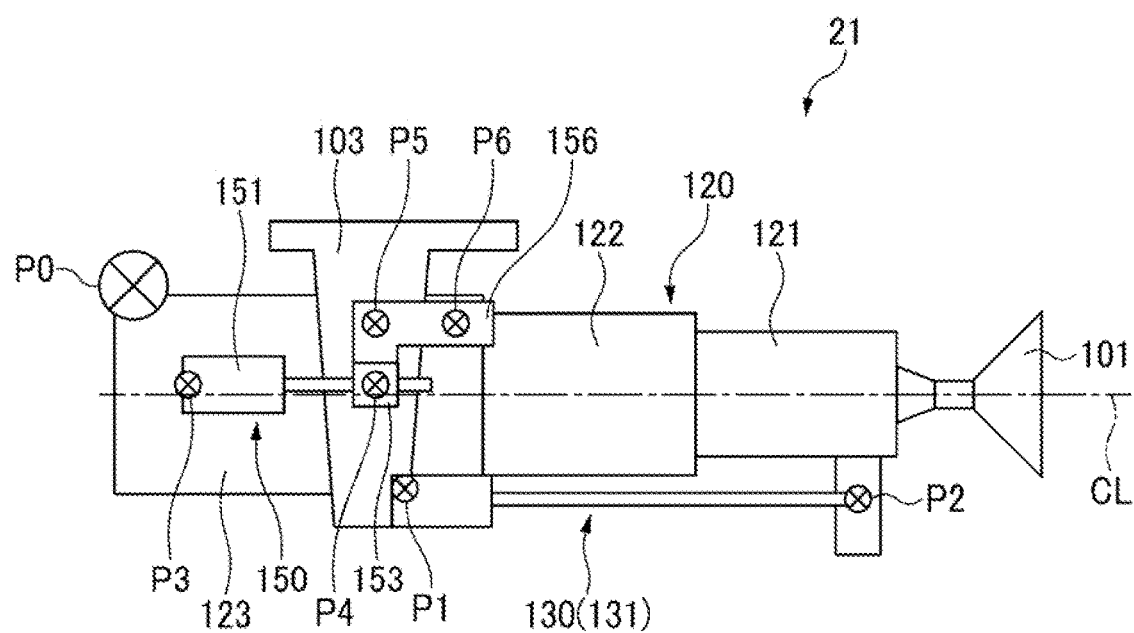
FIG. 27 is a side view schematically showing an electrically adjustable steering of a twenty-first embodiment.

As shown in FIG. 27, in the electrically adjustable steering 21 of the twenty-first embodiment, the pivot P0 which is a rotation center of the steering jacket 120 is offset upward of the center line CL of the steering jacket 120. Further, the tilt motor 151 is rotatably connected to the third jacket member 123 via the pivot P3 on the center line CL of the steering jacket 120, and the nut 153 is rotatably connected to one end of the L-shaped link member 156 via the pivot P4. The central portion of the L-shaped link member 156 is rotatably supported by the top bracket 103 by the pivot P5, and the other end of the L-shaped link member 156 is rotatably connected to the third jacket member 123 by the pivot P6, which can also slide on the third jacket member in the axial direction. That is, the tilt actuator 150 is disposed between the L-shaped link member 156 and the third jacket member 123.

Twenty-Second Embodiment

Figure 28:
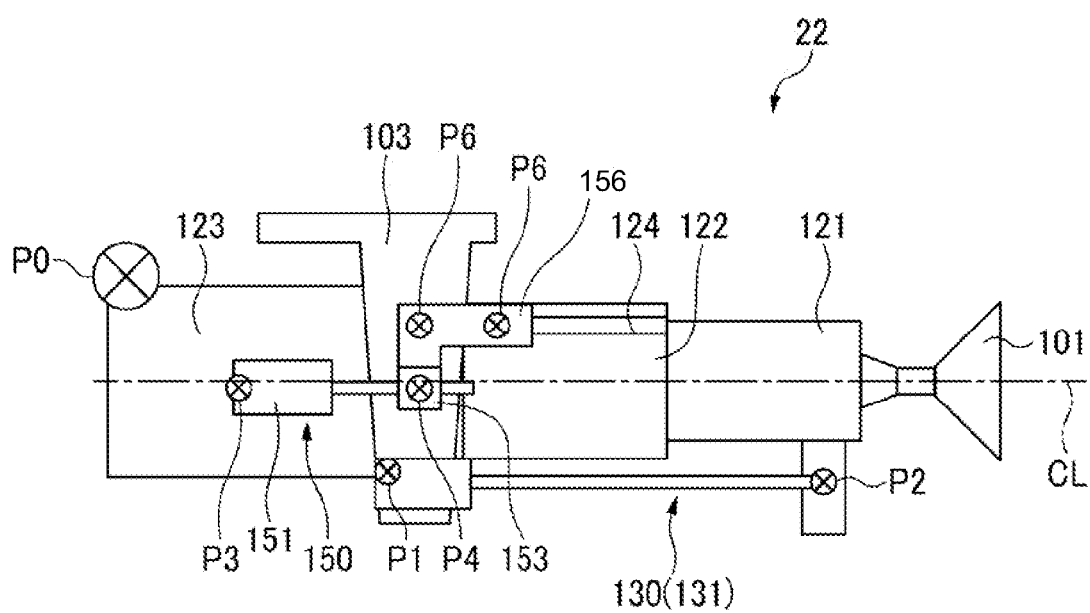
FIG. 28 is a side view schematically showing an electrically adjustable steering of a twenty-second embodiment.

As shown in FIG. 28, in the electrically adjustable steering 22 of the twenty-second embodiment, the pivot P6 of the L-shaped link member 156 is slidably fitted in a groove 124 provided in the axial direction on the second jacket member 122 with respect to the electrically adjustable steering 21 shown in FIG. 27. That is, the tilt actuator 150 is disposed between the top bracket 103 and the second jacket member 122, and by rotating the L-shaped link member 156 by the tilt motor 151, the steering jacket 120 is swung via the second jacket member 122.

Twenty-Third Embodiment

Figure 29A:
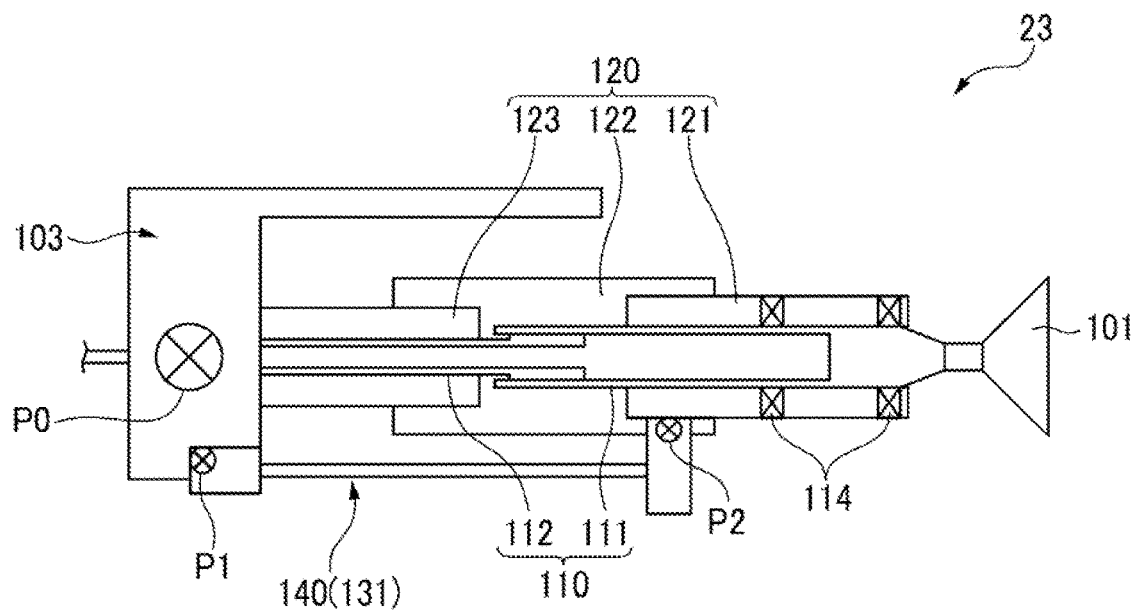
FIGS. 29A and 29B are cross-sectional views schematically showing an electrically adjustable steering of a twenty-third embodiment.
Figure 29B:
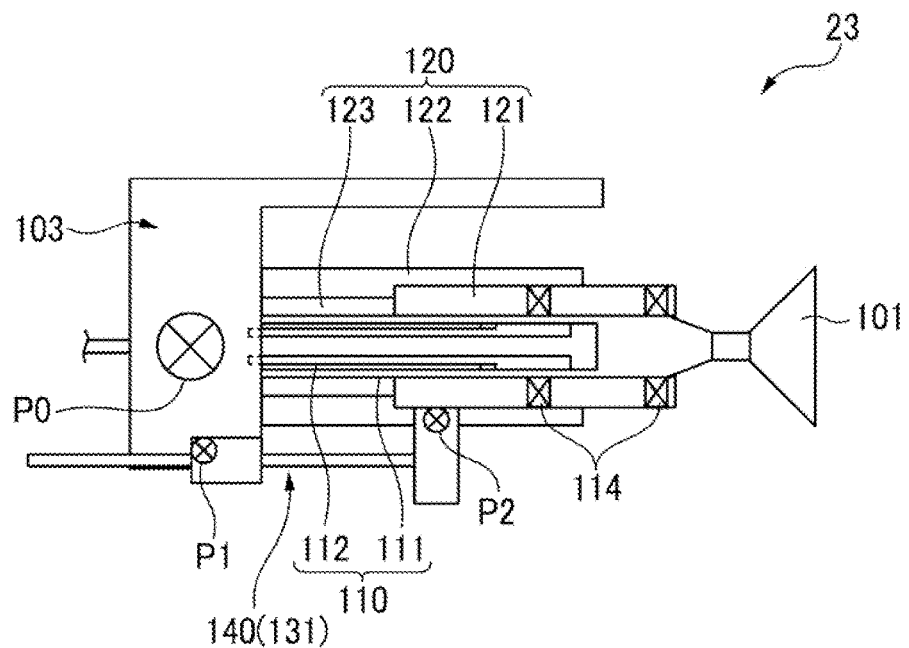

As shown in FIGS. 29A and 29B, in the electrically adjustable steering 23 of the twenty-third embodiment, the steering shaft 110 is composed of two shaft members of the first shaft member 111 and the second shaft member 112 in this order from the steering wheel 101 side. Since the steering shaft 110 includes two shaft members, the lengths of the first shaft member 111 and the second shaft member 112 are increased. However, since the first shaft member 111 is rotatably supported by the pair of bearings 114 and 114 disposed in the first jacket member 121 and the rigidity is large, the rigidity of the steering shaft 110 can be ensured even if a fitting length between the first shaft member 111 and the second shaft member 112 is short. In a case where the steering shaft 110 is composed of two shaft members 111 and 112, it is preferable that the first shaft member 111 moves when the second shaft member 112 is stationary in shaft movement during telescoping.

Figure 30:
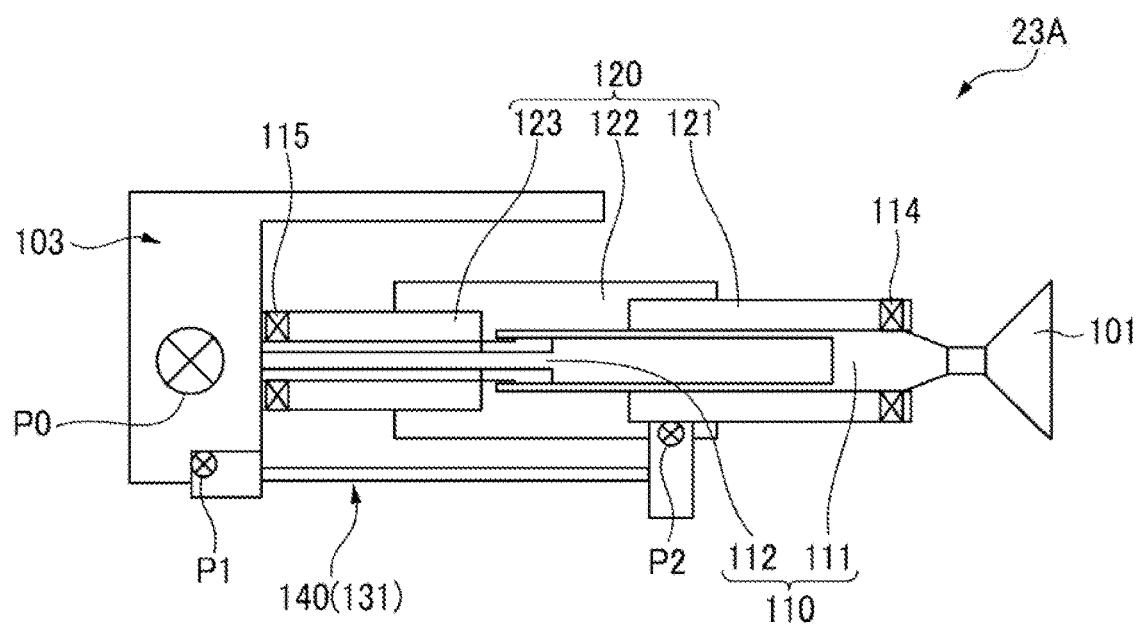
FIG. 30 is a cross-sectional view schematically showing an electrically adjustable steering of a fifth reference example.

FIG. 30 is an electrically adjustable steering 23A of a fifth reference example for comparison with the electrically adjustable steering 23. In the electrically adjustable steering 23A of the fifth reference example, the first shaft member 111 is supported by one bearing 114 in the first jacket member 121. Therefore, bending rigidity of the steering shaft 110 is low. On the other hand, since the first shaft member 111 is supported by the pair of bearings 114 and 114, the electrically adjustable steering 23 of the twenty-third embodiment can have high rigidity.

Twenty-Fourth Embodiment

Figure 31A:
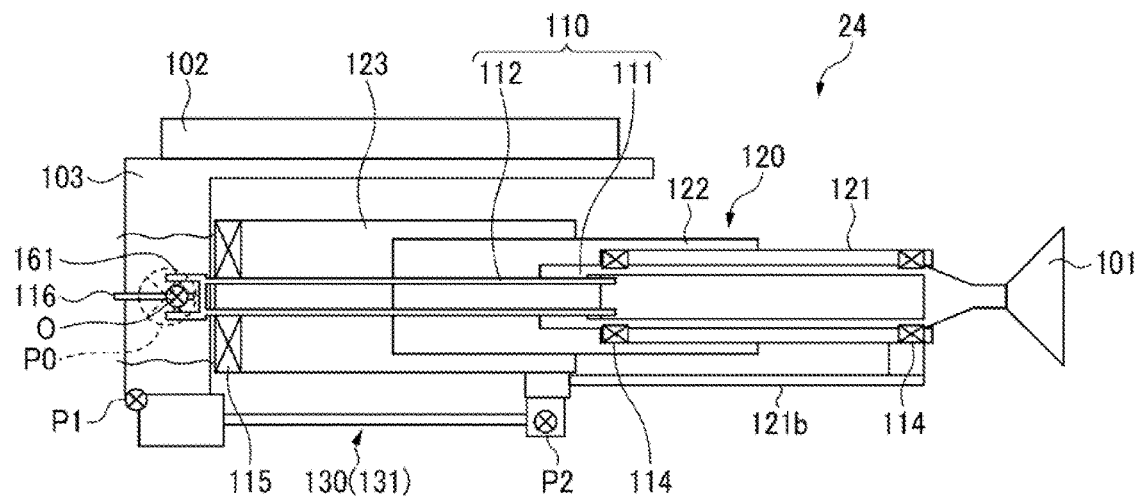
FIGS. 31A and 31B are cross-sectional views schematically showing an electrically adjustable steering of a twenty-fourth embodiment.
Figure 31B:
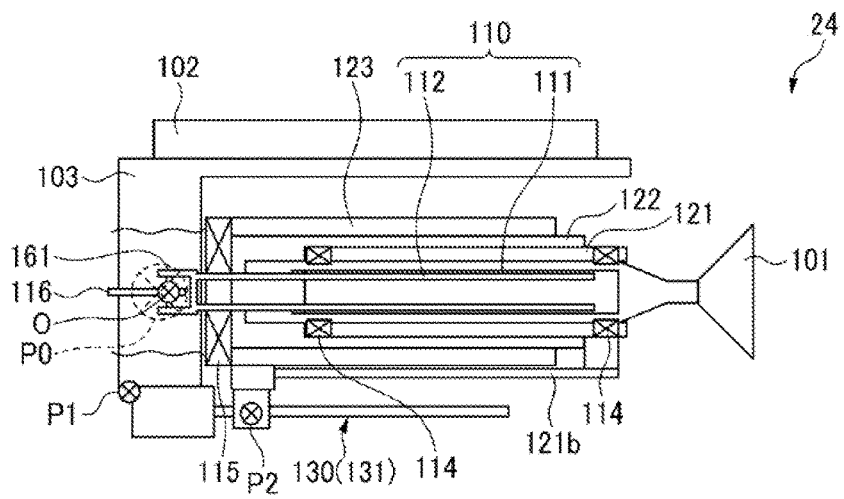

As shown in FIGS. 31A and 31B, in the electrically adjustable steering 24 of the twenty-fourth embodiment, the diameters become larger in an order of the first jacket member 121, the second jacket member 122, and the third jacket member 123. Further, the steering shaft 110 includes two shaft members of the first shaft member 111 and the second shaft member 112 in order from the steering wheel 101 side. The first shaft member 111 is rotatably supported by the pair of bearings 114 and 114 disposed at a large distance from the end portion of the first jacket member 121 on the steering wheel 101 side and the end portion on the side opposite to the steering wheel. The second shaft member 112 is supported by the bearing 115 disposed in the third jacket member 123, and the universal joint 161 enables smooth bending of the steering shaft 110 at the time of tilt is disposed. In this way, since the first shaft member 111 is supported by the pair of bearings 114 and 114 having a large distance from each other in the axial direction and a long span, the rigidity of the first shaft member 111 can be increased. Therefore, the fitting length between the first shaft member 111 and the second shaft member 112 can be shortened. Further, the inner peripheral surface of the first shaft member 111, which is a sliding surface of the first shaft member 111 and the second shaft member 112, may be fitted with a sleeve or coated with plastic in order to allow smooth sliding.

Twenty-Fifth Embodiment

Figure 32A:
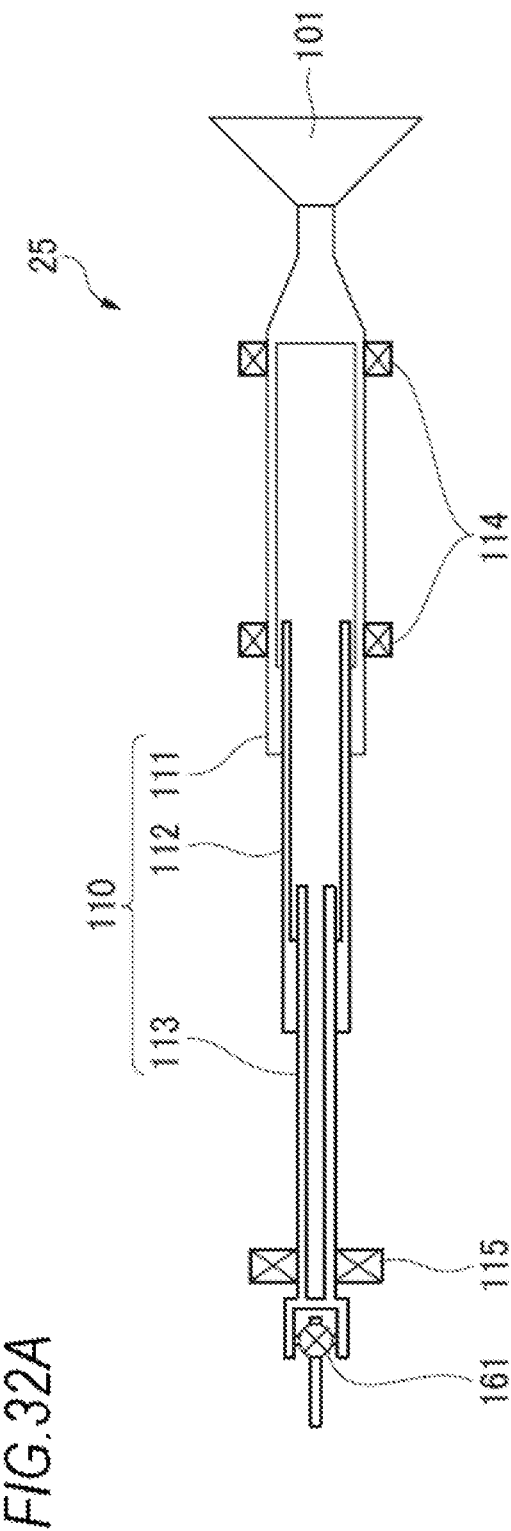
FIGS. 32A and 32B are cross-sectional views schematically showing a steering shaft of an electrically adjustable steering of a twenty-fifth embodiment.
Figure 32B:
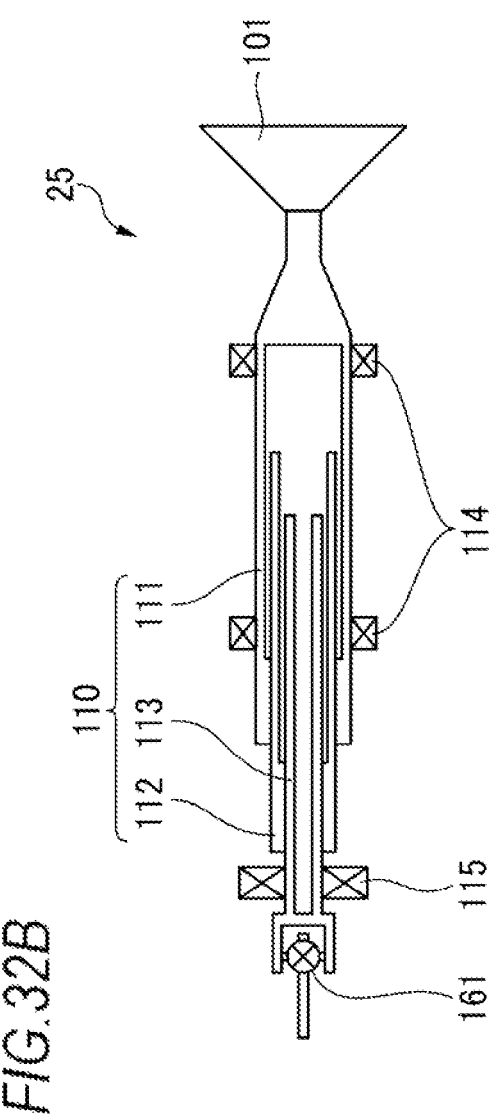

FIGS. 32A and 32B are schematic views showing a support structure of the steering shaft 110 including three shaft members of the first shaft member 111, the second shaft member 112, and the third shaft member 113 in the electrically adjustable steering 25 of the twenty-fifth embodiment. The first shaft member 111 is supported by the pair of bearings 114 and 114 having a large distance from each other in the axial direction, and the third shaft member 113 is supported by one bearing 115. Therefore, since the same bearing support structure as that of the twenty-fourth embodiment is provided, the rigidity of the steering shaft 110 can be increased also in the steering shaft 110 including three shaft members.

Twenty-Sixth to Twenty-Eighth Embodiments

Figure 33A:
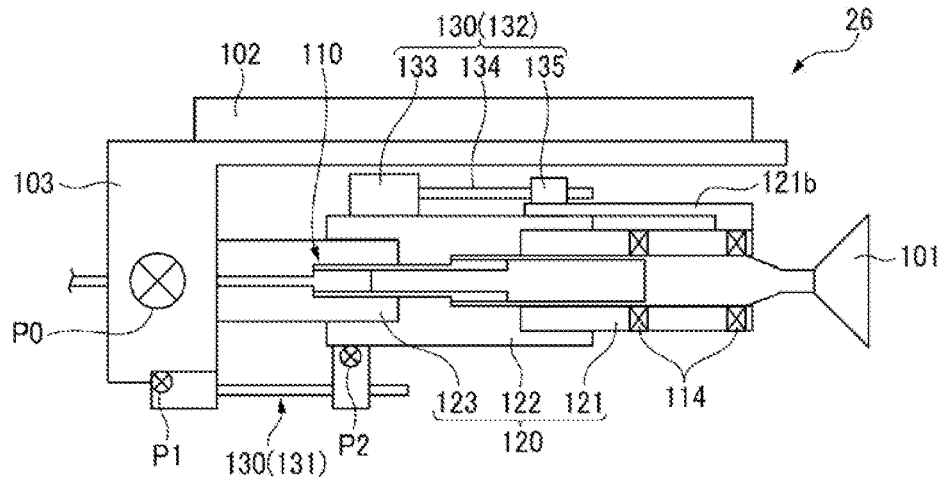
FIGS. 33A to 33C are cross-sectional views schematically showing an electrically adjustable steering of a twenty-sixth embodiment.
Figure 33B:
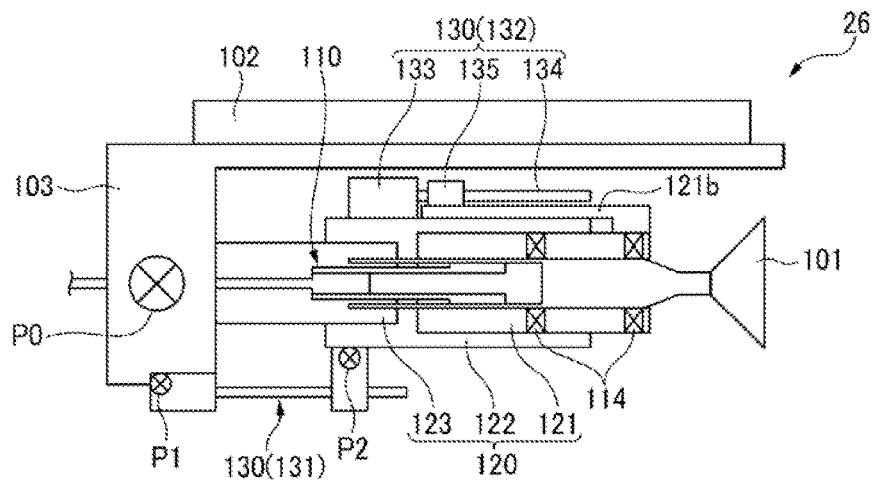
Figure 33C:
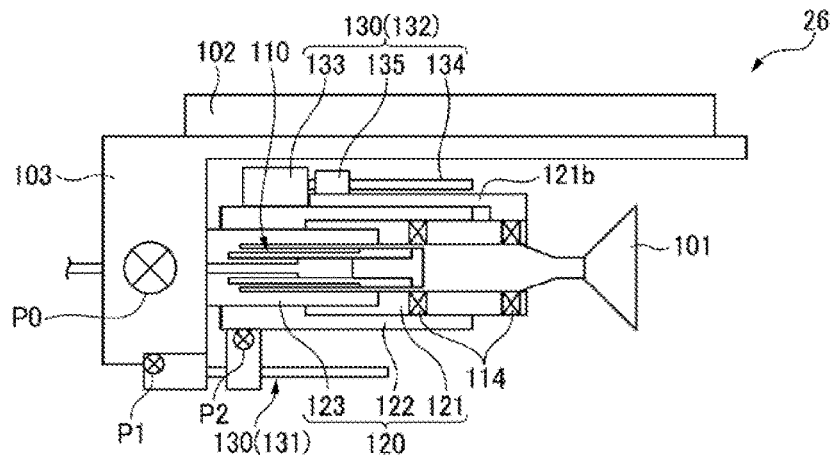
Figure 35A:
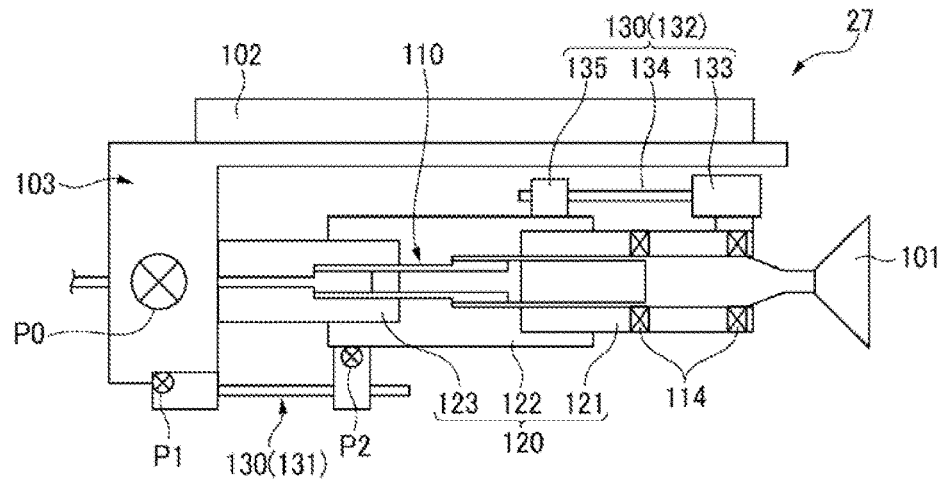
FIGS. 35A to 35C are cross-sectional views schematically showing an electrically adjustable steering of a twenty-seventh embodiment.
Figure 35B:
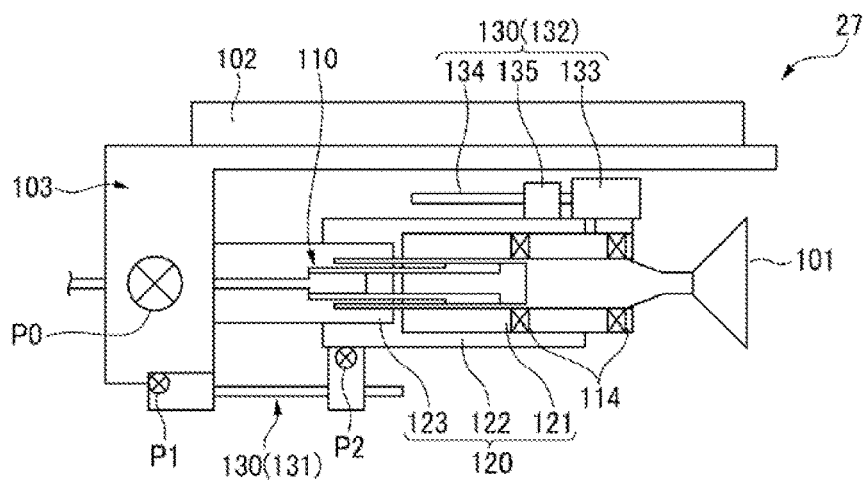
Figure 35C:
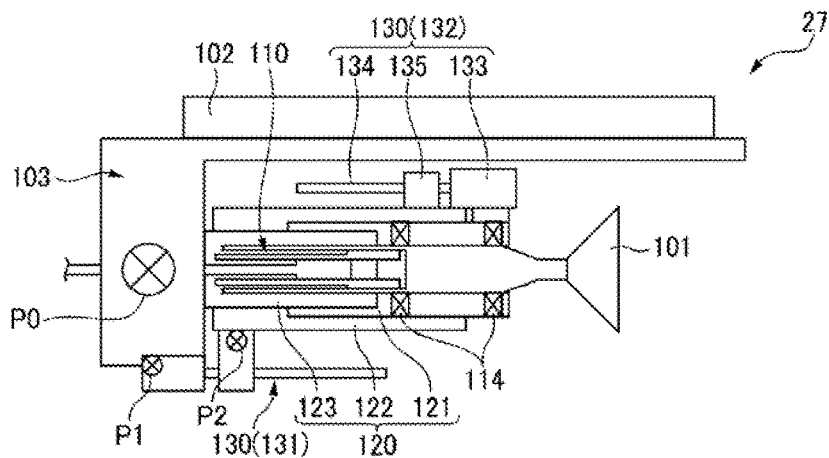
Figure 36A:
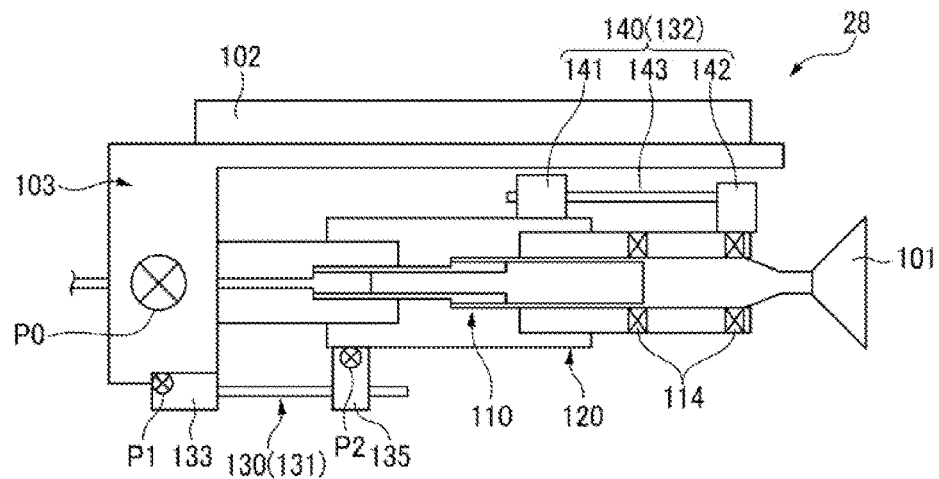
FIGS. 36A to 36C are cross-sectional views schematically showing an electrically adjustable steering of a twenty-eighth embodiment.
Figure 36B:
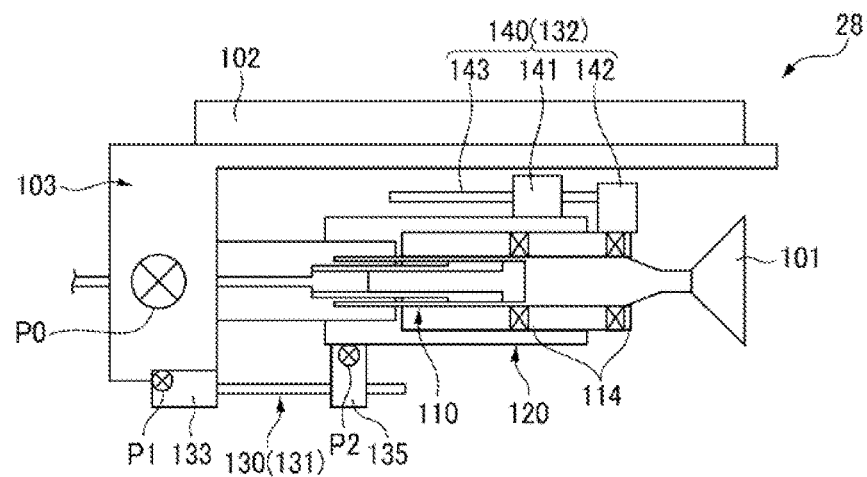
Figure 36C:
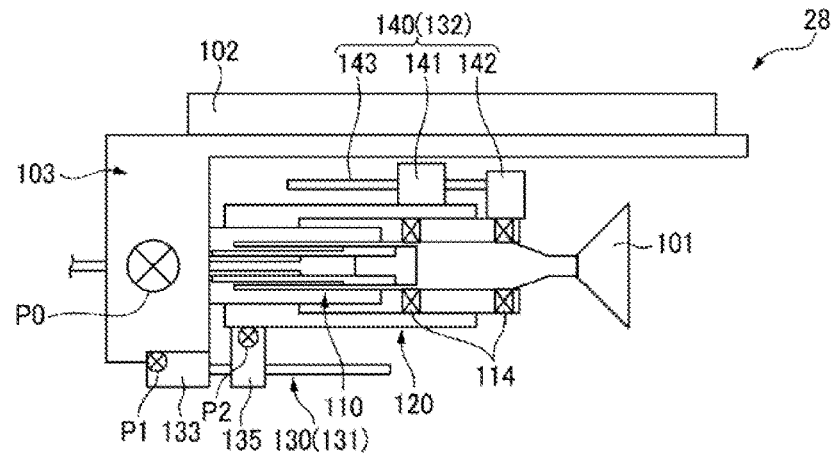

In any of an electrically adjustable steering 26 of the twenty-sixth embodiment shown in FIGS. 33A to 33C, an electrically adjustable steering 27 of the twenty-seventh embodiment shown in FIGS. 35A to 35C, and an electrically adjustable steering 28 of the twenty-eighth embodiment shown in FIGS. 36A to 36C, the first and third jacket members 121 and 123 can expand and contract on the inner side of the second jacket member 122, and the third jacket member 123 can expand 5 and contract while fitting inside (but not contacting) the inner side of the first jacket member 121.

The first telescopic actuator 131 is composed of the screw shaft rotary actuator 130, and is disposed between the top bracket 103 and the second jacket member 122 via the pivots P1 and P2. However, a configuration of the second telescopic actuator 132 is different in each embodiment.

Figure 34:
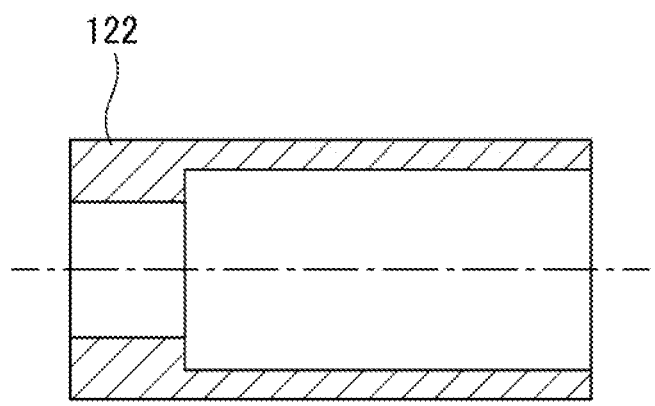
FIG. 34 is a cross-sectional view schematically showing the second jacket member.

In the electrically adjustable steering 26 of the twenty-sixth embodiment shown in FIGS. 33A to 33C, the second telescopic actuator 132 is composed of the screw shaft rotary actuator 130, and the first extension bracket 121b extended from the first jacket member 121 slides with the nut 135. In the second telescopic actuator 132, the motor 133 is fixed to the end portion of the second jacket member 122 on the vehicle front side, and the nut 135 is fixed to the end portion of the first extension bracket 121b on the vehicle front side. According to the configuration of the present embodiment, as shown in FIG. 34, it is not necessary to provide a slit on the second jacket member 122, and the rigidity of the second jacket member 122 is improved.

In the electrically adjustable steering 27 of the twenty-seventh embodiment shown in FIGS. 35A to 35C, the second telescopic actuator 132 is composed of the screw shaft rotary actuator 130 and disposed between the second jacket member 122 and the first jacket member 121. In the second telescopic actuator 132, the motor 133 is fixed to the end portion of the first jacket member 121 on the steering wheel 101 side, and the nut 135 is fixed to the end portion of the second jacket member 122 on the steering wheel side. Also in the configuration of the present embodiment, the second jacket member 122 does not need slit processing.

In the electrically adjustable steering 28 of the twenty-eighth embodiment shown in FIGS. 36A to 36C, the second telescopic actuator 132 is composed of the nut rotary actuator 140 and disposed between the second jacket member 122 and the first jacket member 121. In the second telescopic actuator 132, the motor 141 with a built-in nut is fixed to the end portion of the second jacket member 122 on the steering wheel 101 side, and the screw shaft fixed block 142 is fixed to the end portion of the first jacket member 121 on the steering wheel 101 side. Also in the configuration of the present embodiment, the second jacket member 122 does not need a slit.

Twenty-Ninth to Thirty-First Embodiments

Figure 37A:
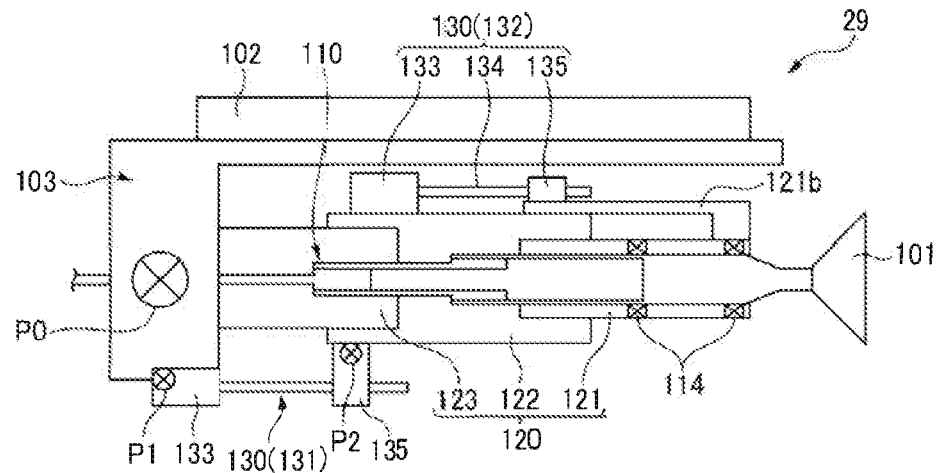
FIGS. 37A to 37C are cross-sectional views schematically showing an electrically adjustable steering of a twenty-ninth embodiment.
Figure 37B:
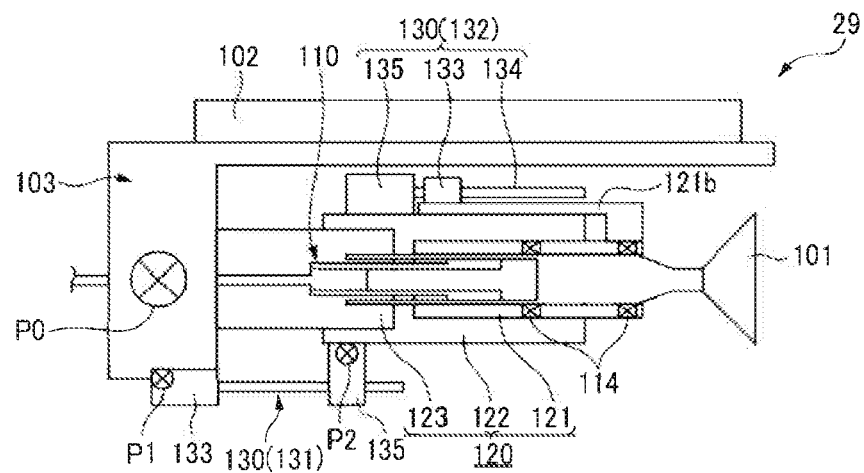
Figure 37C:
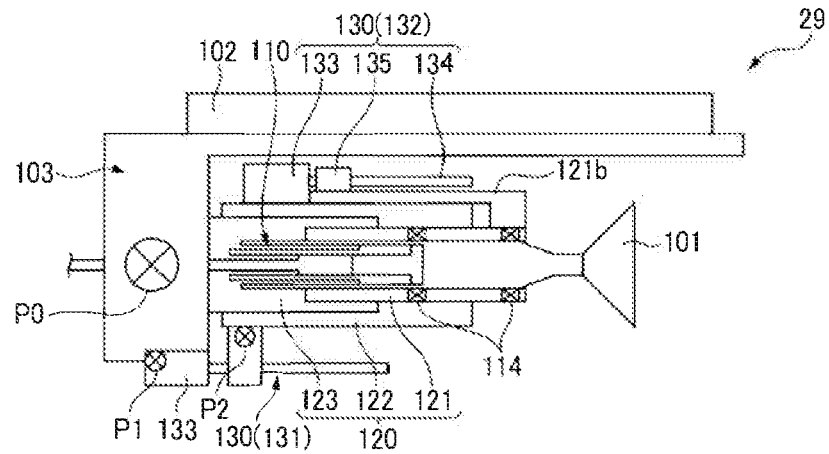
Figure 38A:
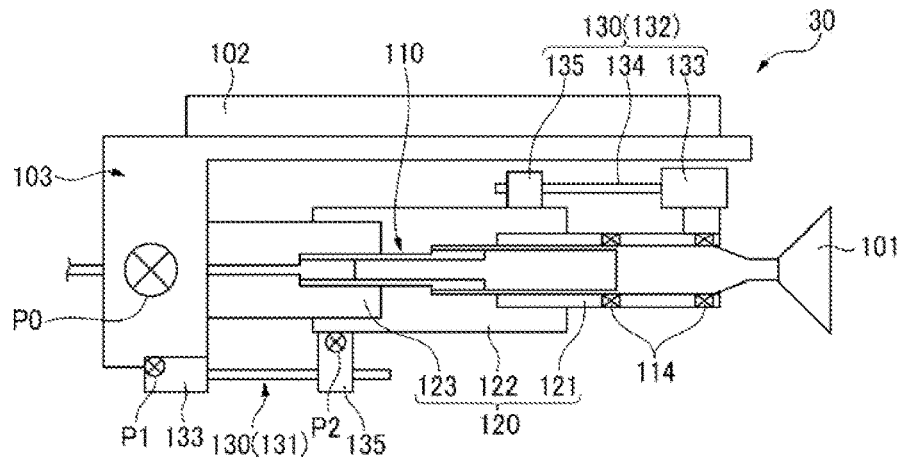
FIGS. 38A to 38C are cross-sectional views schematically showing an electrically adjustable steering of a thirtieth embodiment.
Figure 38B:
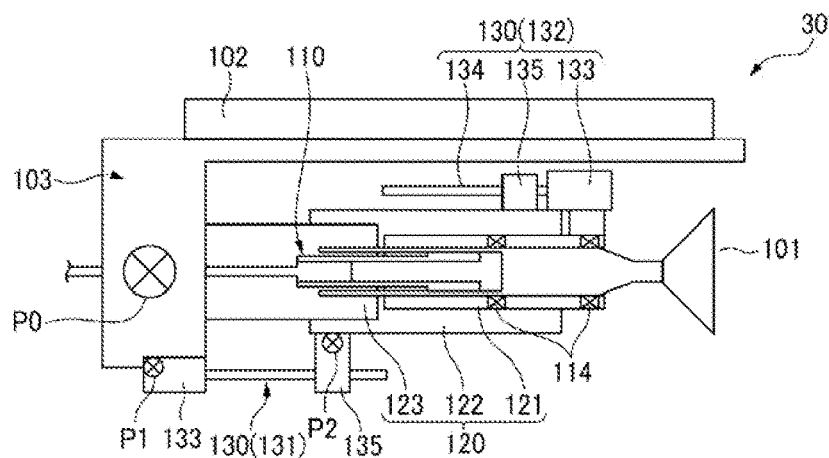
Figure 38C:
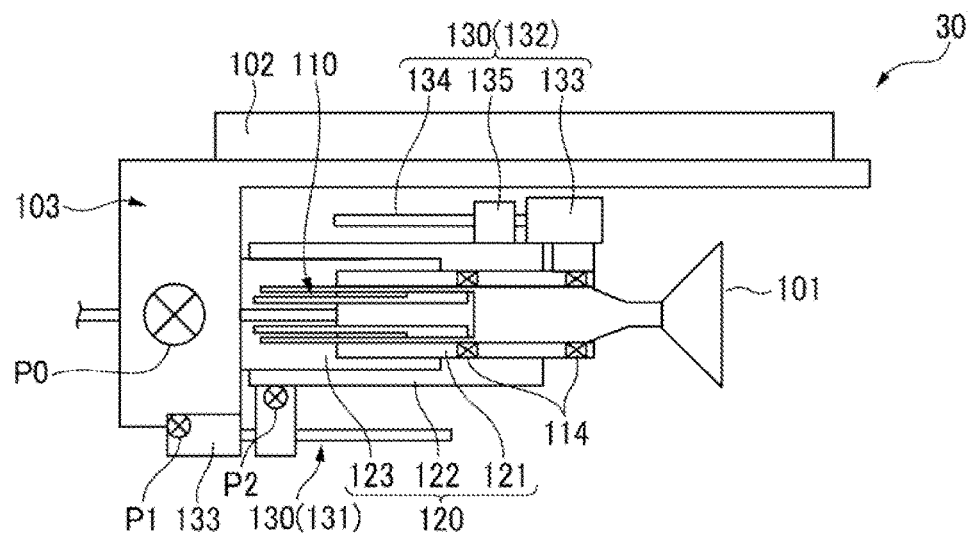
Figure 39A:
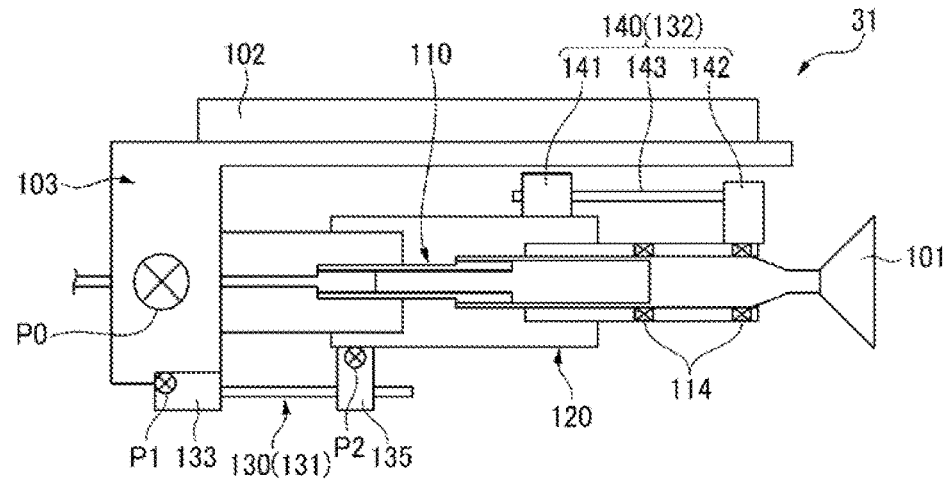
FIGS. 39A to 39C are cross-sectional views schematically showing an electrically adjustable steering of a thirty-first embodiment.
Figure 39B:
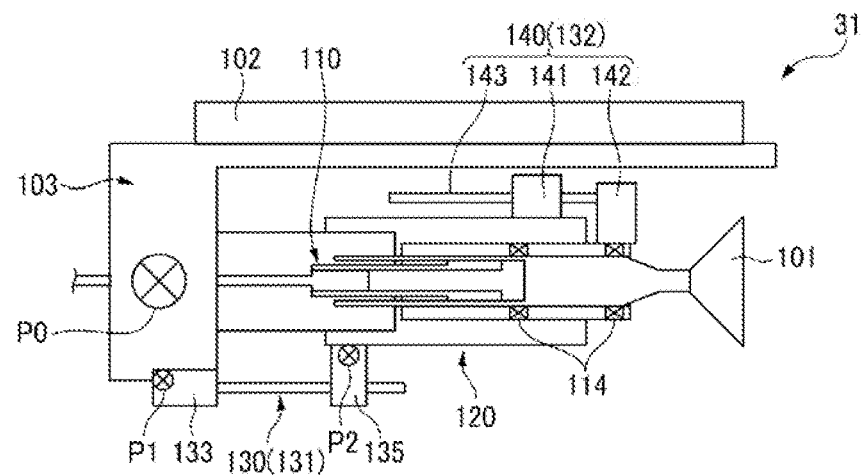
Figure 39C:
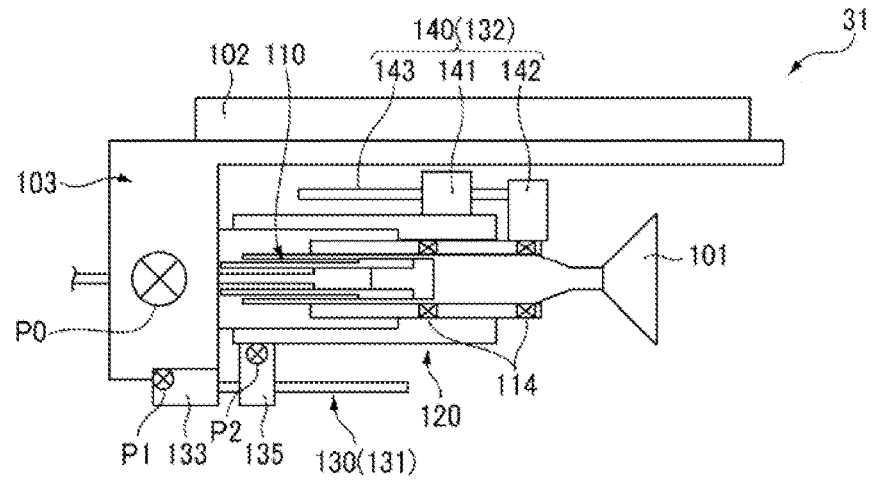

In any of an electrically adjustable steering 29 of the twenty-ninth embodiment shown in FIGS. 37A to 37C, an electrically adjustable steering 30 of the thirtieth embodiment shown in FIGS. 38A to 38C, and an electrically adjustable steering 31 of the thirty-first embodiment shown in FIGS. 39A to 39C, first jacket member 121 can expand and contract on the inner side of the second jacket member 122, and the first and third jacket members 121 and 123 can expand 5 and contract while fitting inside (but not contacting) the inner side of the first jacket member 121.

The first telescopic actuator 131 is composed of the screw shaft rotary actuator 130, and is disposed between the top bracket 103 and the second jacket member 122 via the pivots P1 and P2. However, a configuration of the second telescopic actuator 132 is different in each embodiment.

In the electrically adjustable steering 29 of the twenty-ninth embodiment shown in FIGS. 37A to 37C, the second telescopic actuator 132 is composed of the screw shaft rotary actuator 130, and the first extension bracket 121b extended from the first jacket member 121 slides with the nut 135. In the second telescopic actuator 132, the motor 133 is fixed to the end portion of the second jacket member 122 on the vehicle front side, and the nut 135 is fixed to the end portion of the first extension bracket 121b on the vehicle front side.

In the electrically adjustable steering 30 of the thirtieth embodiment shown in FIGS. 38A to 38C, the second telescopic actuator 132 is composed of the screw shaft rotary actuator 130 and disposed between the second jacket member 122 and the first jacket member 121. In the second telescopic actuator 132, the motor 133 is fixed to the end portion of the first jacket member 121 on the steering wheel 101 side, and the nut 135 is fixed to the end portion of the second jacket member 122 on the steering wheel side.

In the electrically adjustable steering 31 of the thirty-first embodiment shown in FIGS. 39A to 39C, the second telescopic actuator 132 is composed of the nut rotary actuator 140 and disposed between the second jacket member 122 and the first jacket member 121. In the second telescopic actuator 132, the motor 141 with a built-in nut is fixed to the end portion of the second jacket member 122 on the steering wheel 101 side, and the screw shaft fixed block 142 is fixed to the end portion of the first jacket member 121 on the steering wheel 101 side.

Therefore, the electrically adjustable steeringes 29, 30, and 31 of the twenty-ninth to thirty-first embodiments do not need a slit in the second jacket member 122.

Thirty-Second Embodiment

Figure 40:
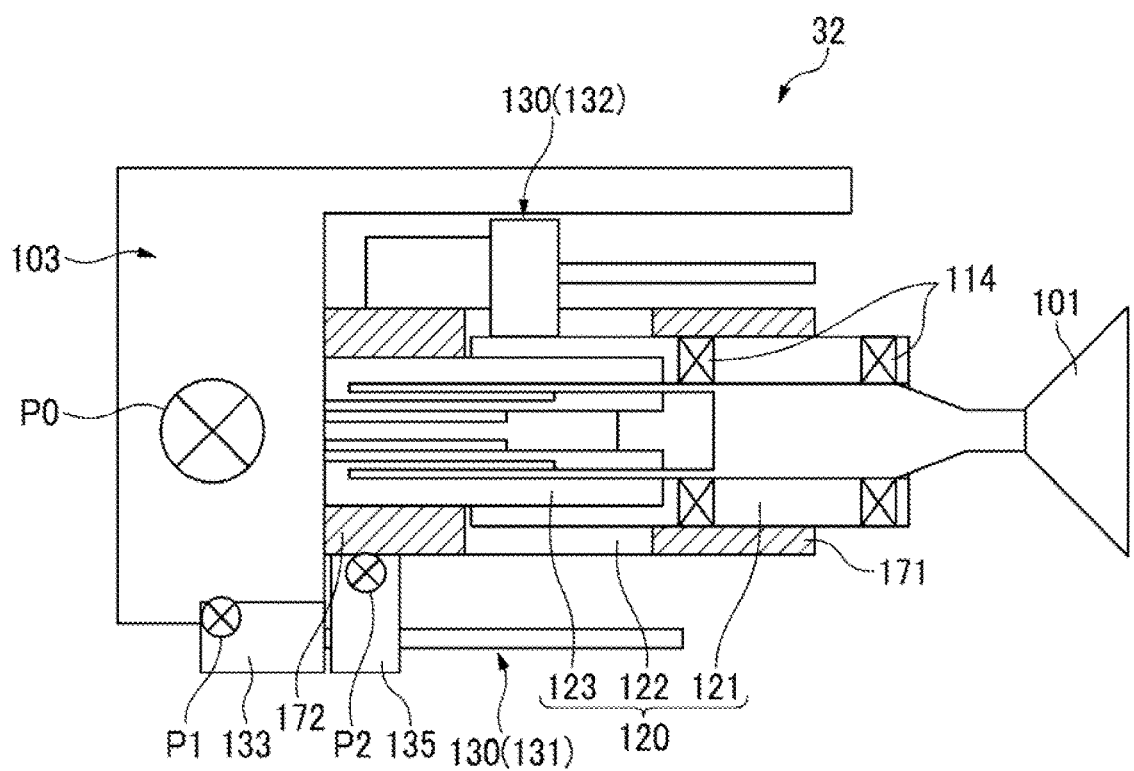
FIG. 40 is a cross-sectional view schematically showing an electrically adjustable steering of a thirty-second embodiment.

As shown in FIG. 40, in the electrically adjustable steering 32 of the thirty-second embodiment, the first jacket member 121 and the third jacket member 123 are configured to be able to expand and contract on the inner side of the second jacket member 122, and the third jacket member 123 can expand 5 and contract while fitting inside (but not contacting) the inner side of the first jacket member 121. A first sleeve 171 in sliding contact with an outer peripheral surface of the first jacket member 121 is fitted in an inner peripheral surface of the second jacket member 122 between the second jacket member 122 and the first jacket member 121. A second sleeve 172 in sliding contact with an outer peripheral surface of the third jacket member 123 is fitted in an inner peripheral surface of the second jacket member 122 between the second jacket member 122 and the third jacket member 123.

The first sleeve 171 and the second sleeve 172 are provided away from each other in the axial direction. The first sleeve 171 narrows the radial gap between the first jacket member 121 and the second jacket member 122, and the second sleeve 172 narrows a radial gap between the second jacket member 122 and the third jacket member 123. Accordingly, the first, second, and third jacket members 121, 122, and 123 can smoothly slide without backlash. A means for narrowing the radial gaps between the jacket members 121, 122, and 123 can be achieved even by, for example, pressing a plastic piece from the outside in the radial direction, in addition to using the sleeves.

Figure 41:
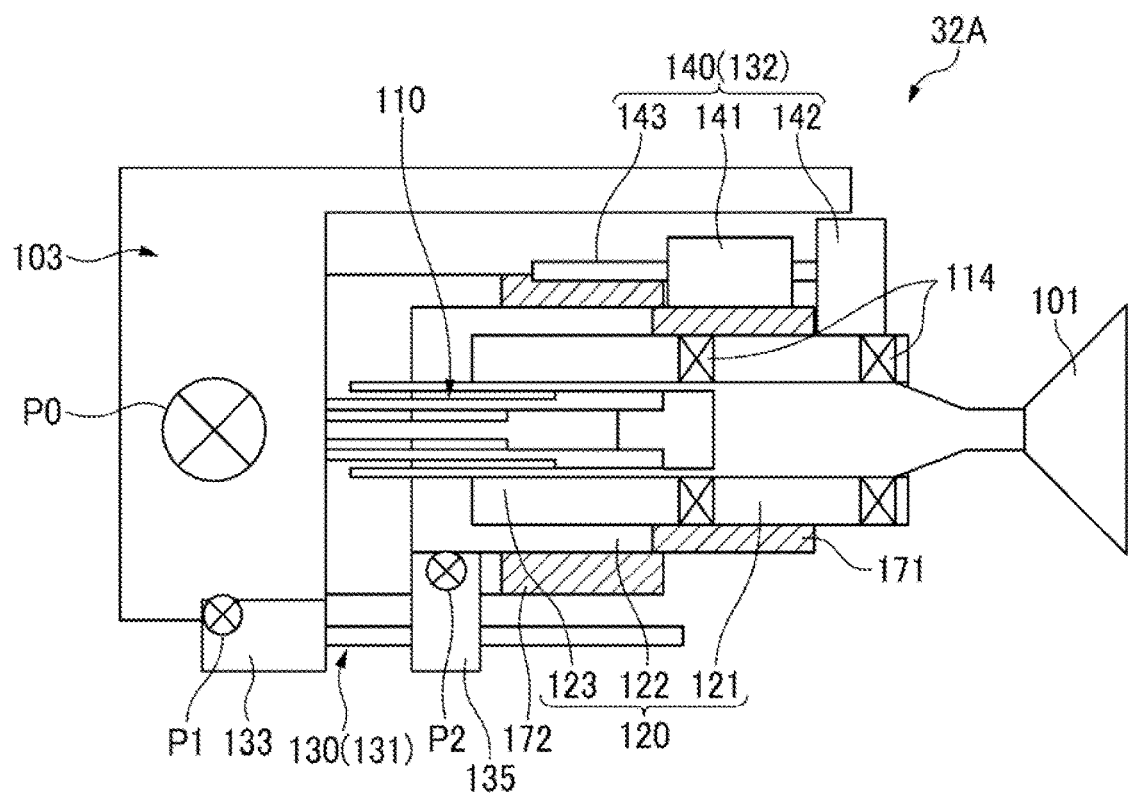
FIG. 41 is a cross-sectional view schematically showing an electrically adjustable steering of a sixth reference example.

FIG. 41 is an electrically adjustable steering 32A of a sixth reference example for comparison with the electrically adjustable steering 32. In the electrically adjustable steering 32A, the second telescopic actuator 132 composed of the nut rotary actuator 140 is disposed between the second jacket member 122 and the first jacket member 121. In the electrically adjustable steering 32A, the diameters become larger in an order of the first jacket member 121, the second jacket member 122, and the third jacket member 123. That is, the first jacket member 121 is configured to be able to expand and contract the inner side of the second jacket member 122, and the second jacket member 122 is configured to be able to expand and contract the inner side of the third jacket member 123.

The first sleeve 171 is disposed between the first jacket member 121 and the second jacket member 122, and the second sleeve 172 is disposed between the second jacket member 122 and the third jacket member 123. In the present reference example, the first sleeve 171 and the second sleeve 172 are disposed close to each other in the axial direction and partially overlap each other in the axial direction. Therefore, since the first sleeve 171 and the second sleeve 172 overlap each other in the radial direction, a design like double press fit may adversely affect the telescopic motion of the steering jacket 120.

Figure 42:
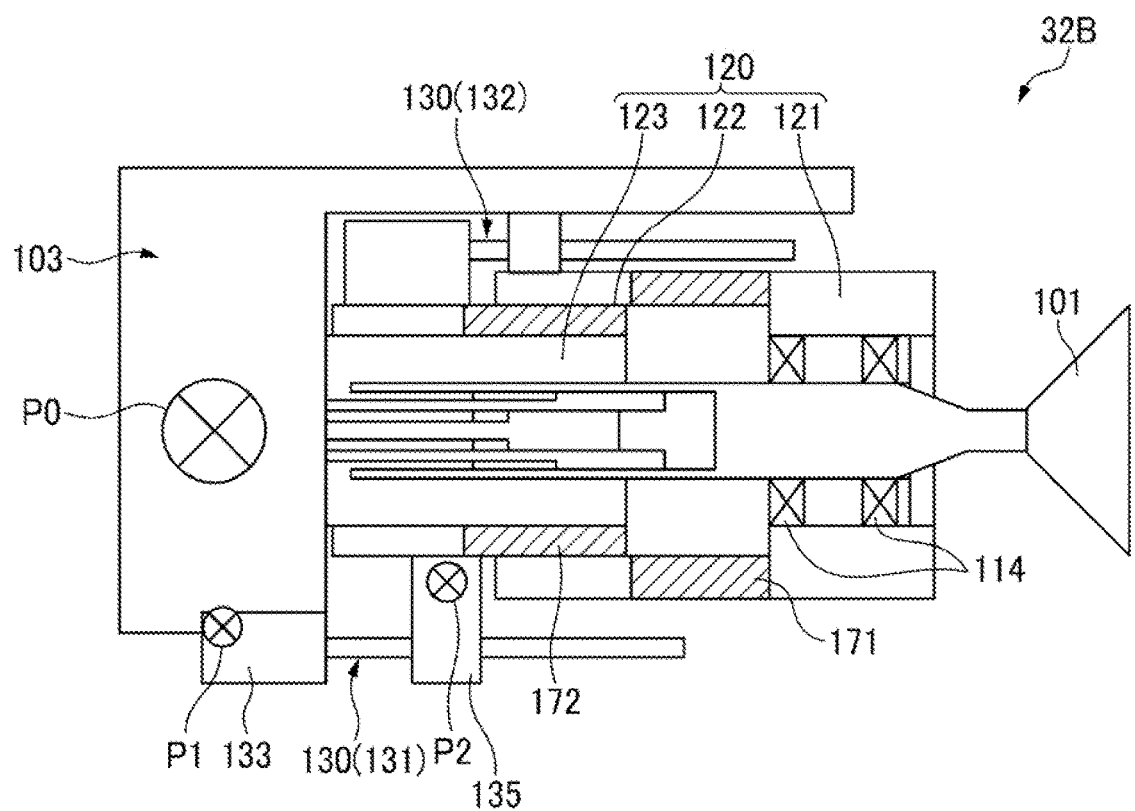
FIG. 42 is a cross-sectional view schematically showing an electrically adjustable steering of a seventh reference example.

FIG. 42 is an electrically adjustable steering 32B of a seventh reference example for comparison with the electrically adjustable steering 32. In the electrically adjustable steering 32B, the diameters become small in an order of the first jacket member 121, the second jacket member 122, and the third jacket member 123. The first sleeve 171 is disposed between the first jacket member 121 and the second jacket member 122, and the second sleeve 172 is disposed between the second jacket member 122 and the third jacket member 123. Also in this case, the first sleeve 171 and the second sleeve 172 may come close to each other and overlap in the axial direction to form a design like double press fit.

Further, as in the present embodiment, in order to remove radial backlash, in a case where the plastic sleeves 171 and 172 are disposed between the first jacket member 121 and the second jacket member 122 and between the second jacket member 122 and the third jacket member 123, the outer second jacket member 122 is preferably a material having a higher thermal expansion coefficient than each inner jacket.

Thirty-Third Embodiment

Figure 43A:
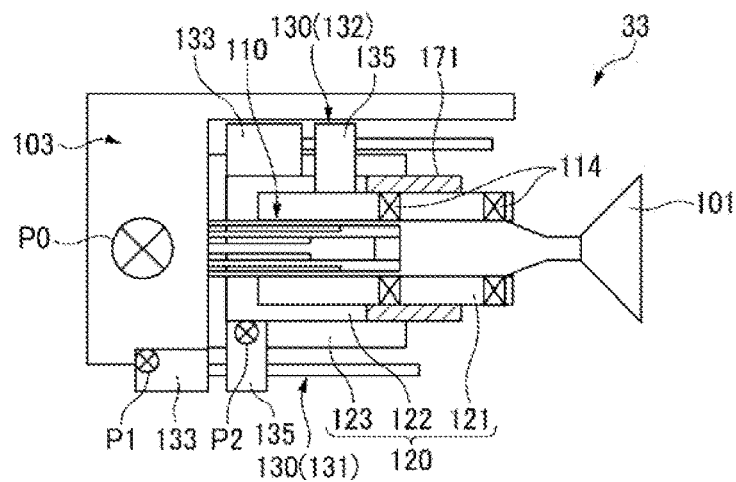
FIGS. 43A to 43C are cross-sectional views schematically showing an electrically adjustable steering of a thirty-third embodiment.
Figure 43B:
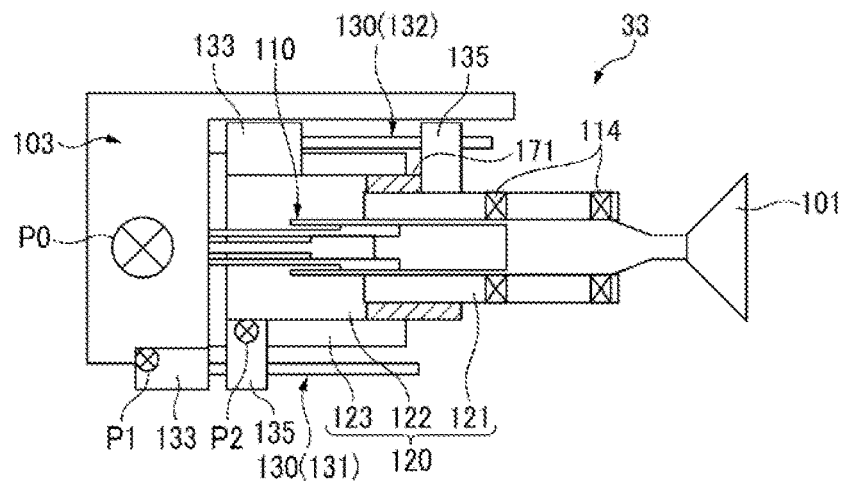
Figure 43C:
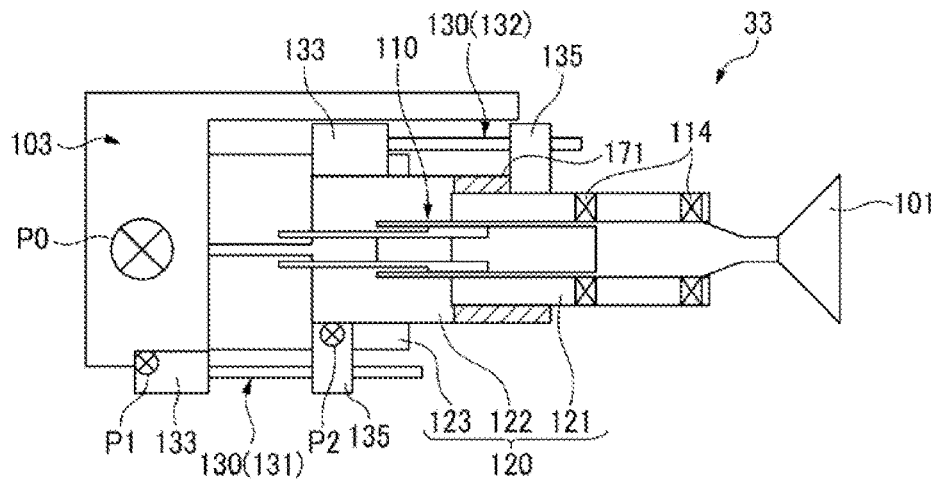

As shown in FIGS. 43A to 43C, in the electrically adjustable steering 33 of the thirty-third embodiment, the diameters become larger in an order of the first jacket member 121, the second jacket member 122, and the third jacket member 123. The first sleeve 171 is disposed between the first jacket member 121 and the second jacket member 122. Further, the first telescopic actuator 131 composed of the screw shaft rotary actuator 130 is disposed between the top bracket 103 and the end portion of the second jacket member 122 on the vehicle front side, and the second telescopic actuator 132 composed of the screw shaft rotary actuator 130 is disposed between the end portion of the second jacket member 122 on the vehicle front side and the first jacket member 121.

Figure 44A:
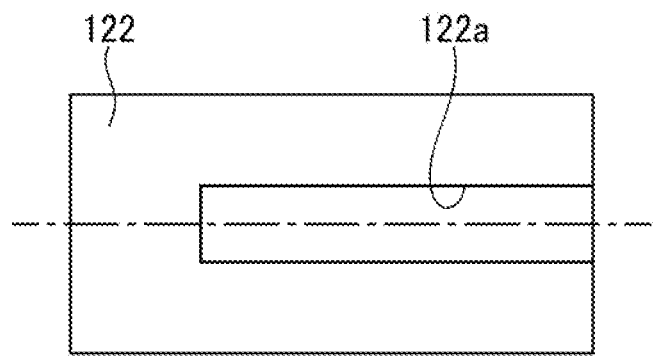
FIGS. 44A and 44B are cross-sectional views schematically showing the second jacket member.
Figure 44B:
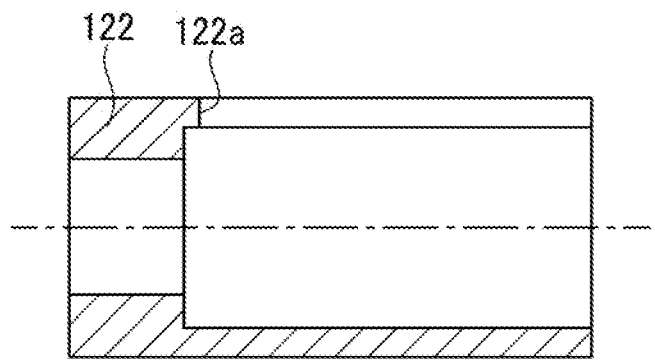

In this case, since the nut 135 fixed to the first jacket member 121 moves to the end portion of the second jacket member 122 on the steering wheel side, as shown in FIGS. 44A and 44B, the slit 122a of the second jacket member 122 opens toward the steering wheel.

Thirty-Fourth Embodiment

Figure 45:
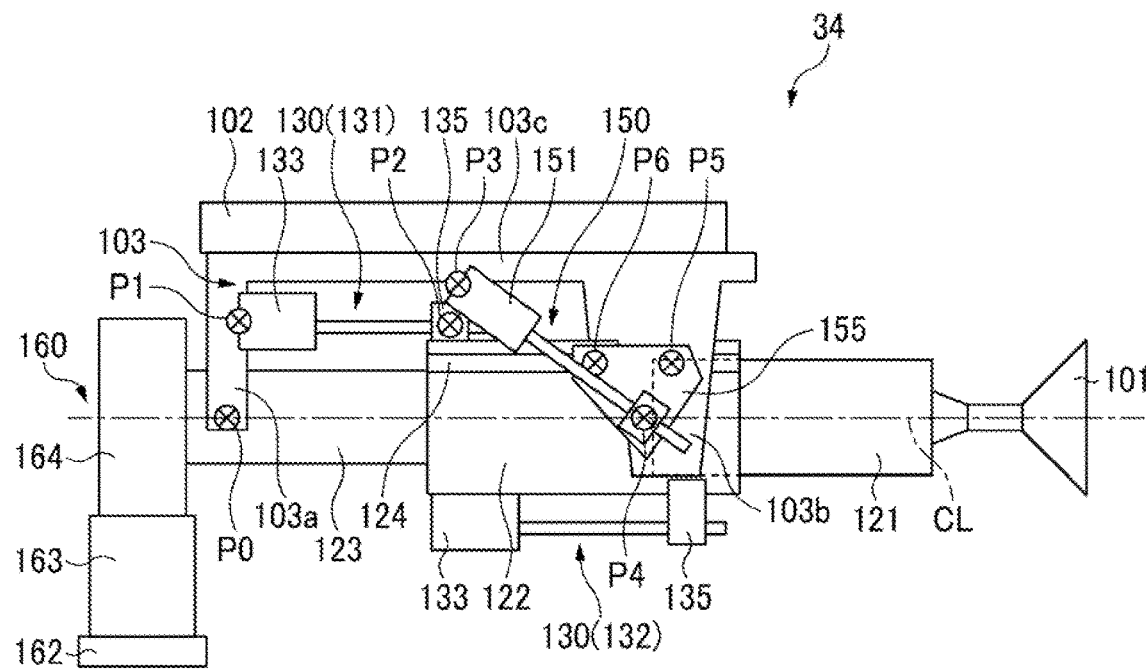
FIG. 45 is a side view schematically showing an electrically adjustable steering of a thirty-fourth embodiment.

As shown in FIG. 45, in the electrically adjustable steering 34 of the thirty-fourth embodiment, the road surface reaction force generation device 160 is fixed to the end portion of the third jacket member 123 on the vehicle front side. The third jacket member 123 is rotatably connected to the front support portion 103a of the top bracket 103 via the pivot P0 on the center line CL of the steering jacket 120 near the front of the vehicle.

The first telescopic actuator 131 composed of the screw shaft rotary actuator 130 is disposed between the front support portion 103a of the top bracket 103 and the second jacket member 122. In the first telescopic actuator 131, the motor 133 is rotatably connected to the front support portion 103a of the top bracket 103 via the pivot P1, and the nut 135 is rotatably connected to the end portion of the second jacket member on the vehicle front side via the pivot P2.

The second telescopic actuator 132 composed of the screw shaft rotary actuator 130 is disposed between the second jacket member 122 and the first jacket member 121. In the second telescopic actuator 132, the motor 133 is fixed to the end portion of the second jacket member 122 on the vehicle front side, and the nut 135 is fixed to the end portion of the first jacket member 121 on the vehicle front side.

Further, similarly to the first embodiment, the tilt actuator 150 is disposed between the top bracket 103 and the second jacket member 122 via the link member 155, and adjusts an inclination of the steering jacket 120 with the pivot P0 as a rotation center.

In such an electrically adjustable steering 34, since the pivot P0 which is the rotation center of the steering jacket 120, the pivot P3 to which the motor 151 of the tilt actuator 150 is connected, and the pivot P5 to which the link member 155 is connected are provided in the integral top bracket 103, the tilting motion of the steering jacket 120 can be accurately performed, and the design is hard to be affected on sound or motion speed by accuracy of the mount bracket 102.

Further, in the electrically adjustable steering 34 of the present embodiment, if the pivot P0 is disposed on the steering wheel 101 side with respect to the road surface reaction force generation device 160, movement of the tilt motor 151 when the steering jacket 120 is rotated by the same angle can be reduced as compared with a case where the pivot P0 is disposed on the vehicle front side of the road surface reaction force generation device 160. On the other hand, when the pivot P0 is disposed on the vehicle front side, a moving area of the steering jacket 120 at the time of tilt increases.

Figure 46A:
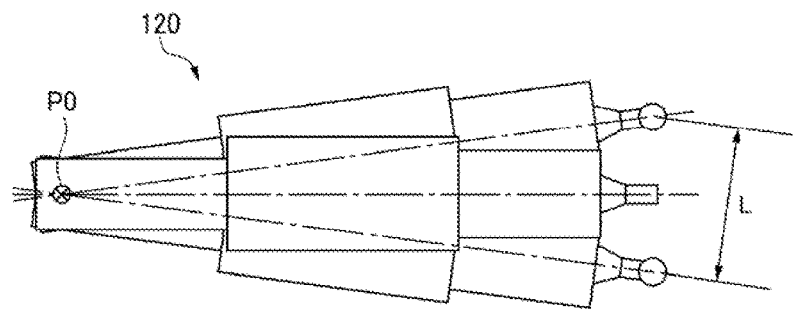
FIGS. 46A to 46C are schematic diagrams showing comparison of differences in an operation area due to a rotation center position of a steering column.
Figure 46B:
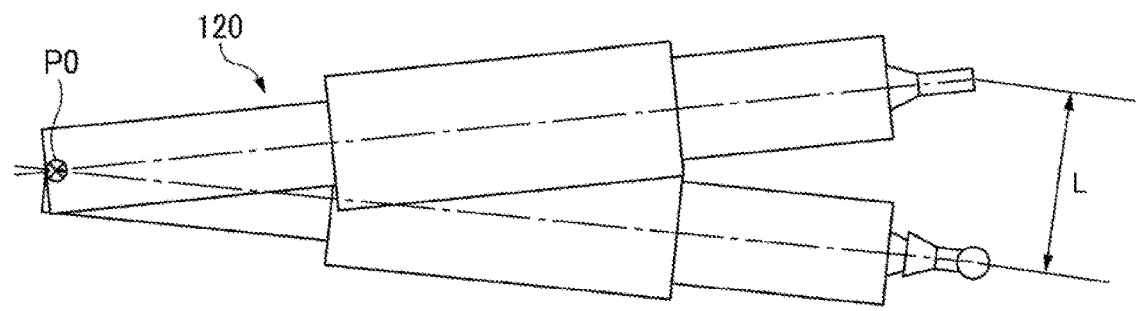
Figure 46C:
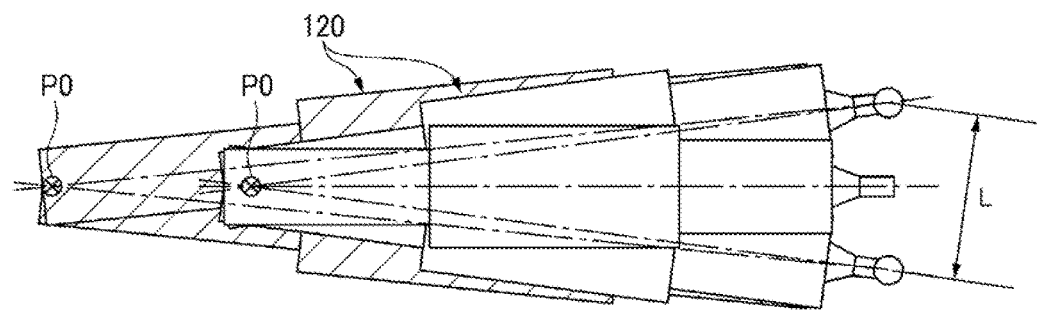

FIGS. 46A to 46C are schematic diagrams showing comparison of differences in the moving area of the steering jacket 120 due to the position of the pivot P0. As shown in FIG. 46A, if the pivot P0 is positioned on the steering wheel 101 side, the steering jacket 120 can be moved by a necessary distance L even if movement of the tilt motor 151 is small. As shown in FIG. 46B, when the pivot P0 is located on the vehicle front side, it is necessary to increase movement of the tilt motor 151 in order to move the steering jacket 120 by a necessary distance L. As shown in comparison with FIG. 46C, the moving region of the steering jacket 120 when the pivot P0 is disposed on the steering wheel 101 side is smaller than the moving region of the steering jacket 120 when the pivot P0 is disposed on the vehicle body front side, effective use of an area indicated by hatching in the drawing is possible.

Thirty-Fifth Embodiment

Figure 47:
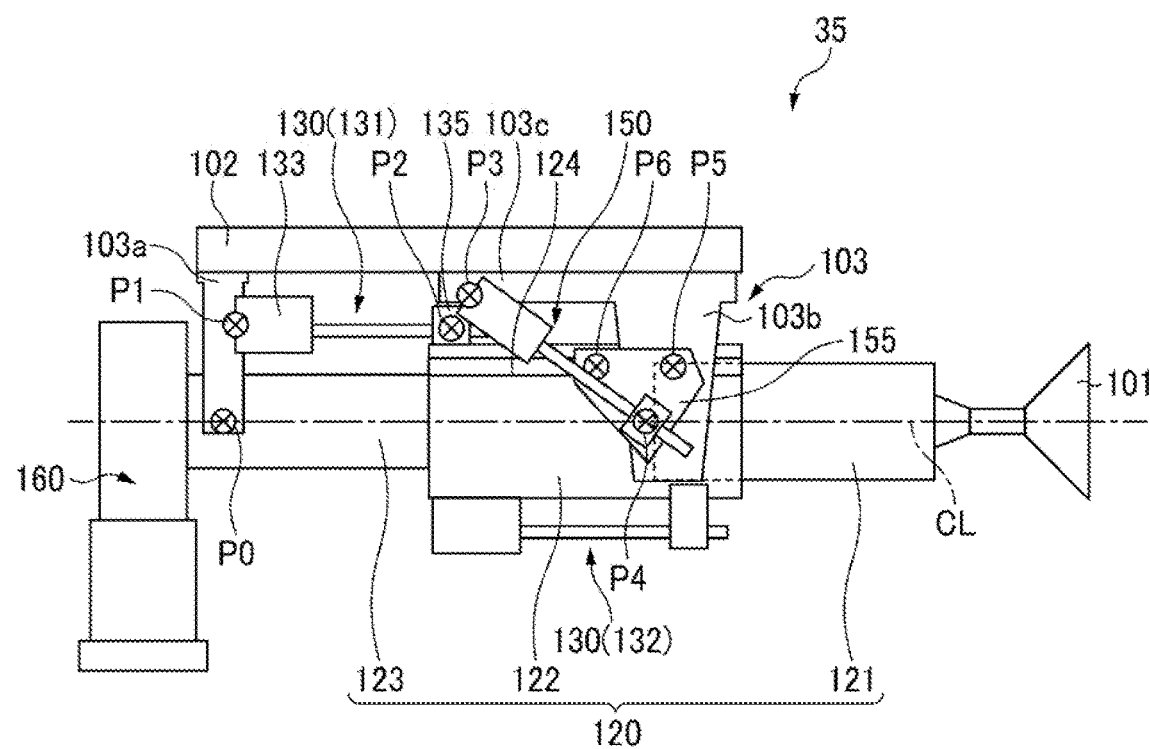
FIG. 47 is a side view schematically showing an electrically adjustable steering of a thirty-fifth embodiment.

As shown in FIG. 47, in the electrically adjustable steering 35 of the thirty-fifth embodiment, the top bracket 103 is divided into the front support portion 103a and the rear support portion 103b with respect to the electrically adjustable steering 34 shown in FIG. 45.

Therefore, the third jacket member 123 is rotatably connected to the front support portion 103a of the top bracket 103 disposed on the vehicle body front side via the pivot P0. The motor 151 of the tilt actuator 150 and the link member 155 are connected to the base portion 103c of the top bracket 103 and the rear support portion 103b, respectively.

In this way, in the present embodiment, by dividing the top bracket 103 into two, weight of the top bracket 103 can be reduced. On the other hand, in the present embodiment, the accuracy of the mount bracket 102 and mounting accuracy of the top bracket 103 are required in consideration of the effect on sound and motion speed as compared with the electrically adjustable steering 34 shown in FIG. 45 including the integral top bracket 103.

Thirty-Sixth Embodiment

Figure 48:
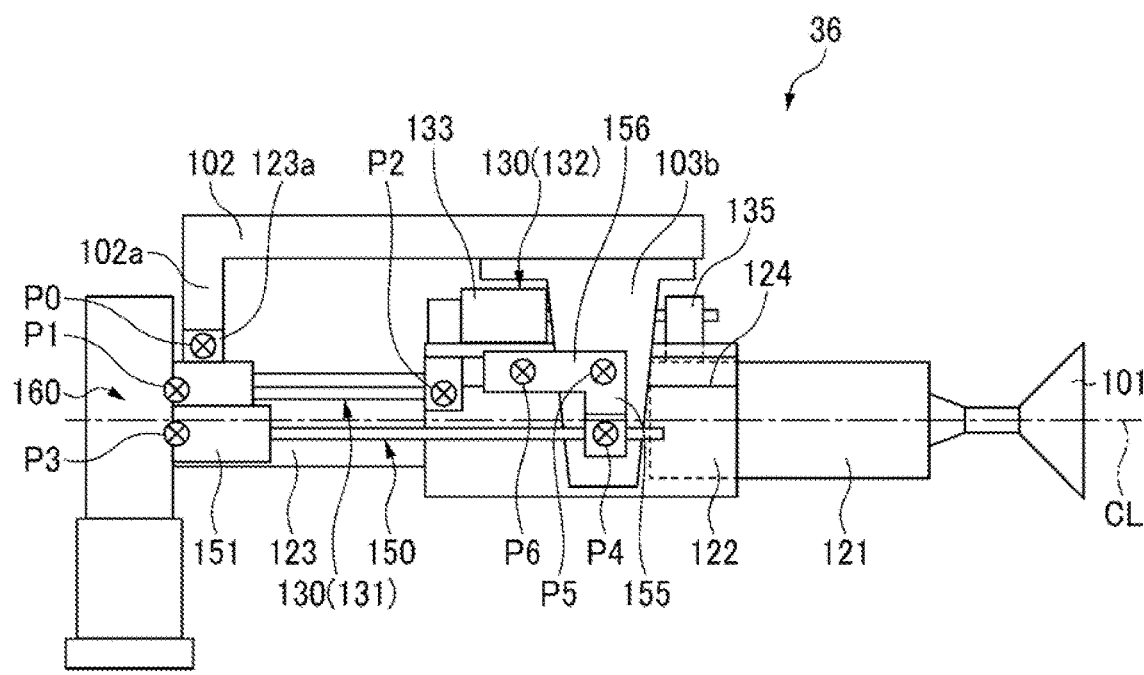
FIG. 48 is a side view schematically showing an electrically adjustable steering of a thirty-sixth embodiment.

As shown in FIG. 48, in the electrically adjustable steering 36 of the thirty-sixth embodiment, the mount bracket 102 is formed in an L-shape extending downward on the vehicle front side. A rib portion 123a projecting from the outer peripheral portion of the third jacket member 123 to a downward extension portion 102a is rotatably connected to the downward extension portion 102a via the pivot P0. The pivot P0 is disposed to be offset upward from the center line CL of the steering jacket 120.

The first telescopic actuator 131 composed of the screw shaft rotary actuator 130 is provided between the road surface reaction force generation device 160 and the second jacket member 122, and the motor 133 is rotatably connected to the road surface reaction force generation device 160 via the pivot P1, and the nut 135 is rotatably connected to the end portion of the second jacket member 122 on the vehicle front side via the pivot P2. The pivot P1 and the pivot P2 are offset upward of the center line CL of the steering jacket 120 in the steering jacket 120 in a horizontal state.

Further, the tilt motor 151 of the tilt actuator 150 is rotatably connected to the road surface reaction force generation device 160 via the pivot P3, and the nut 153 is rotatably connected to one end of the L-shaped link member 156 via the pivot P4. A central portion of the L-shaped link member 156 is rotatably connected to the rear support portion 103b of the top bracket 103 by the pivot P5, and the other end of the L-shaped link member 156 is slidably connected to the groove 124 provided in the axial direction on the second jacket member 122 via the pivot P6. The pivot P3 and the pivot P4 are offset downward of the center line CL of the steering jacket 120 in the steering jacket 120 in a horizontal state.

The second actuator 132 composed of the screw shaft rotary actuator 130 is disposed above the center line CL of the steering jacket 120 between the second jacket member 122 and the first jacket member 121.

Since the top bracket 103 does not have a front support portion, the electrically adjustable steering 36 of the present embodiment is affected by the accuracy of the mount bracket 102, but further reduction in weight is possible. In addition, since the pivot P0 is offset from the center line CL of the steering jacket 120, the mount bracket 102 can also be shortened. Further, since the pivot P1 of the motor 133 of the first telescopic actuator 131 is offset with respect to the center line CL of the steering jacket 120, the first telescopic actuator 131 can be disposed close to the pivot P0. This is because, since the steering jacket has a cylindrical shape, when the pivot P1 is on the center line CL of the steering jacket 120, the motor 133 of the actuator 131 must be disposed at a large distance outward in a width direction so that the change in telescopic length of the steering jacket is less during tilt, with reference to FIG. 21.

Thirty-Seventh Embodiment

Figure 49:
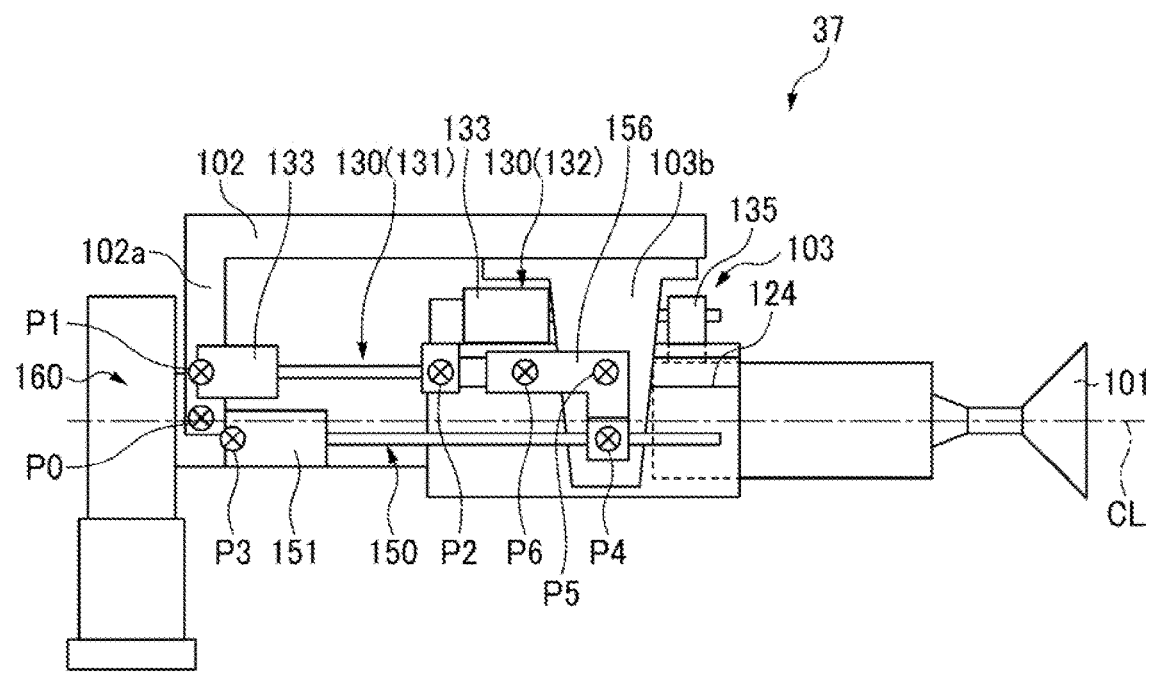
FIG. 49 is a side view schematically showing an electrically adjustable steering of a thirty-seventh embodiment.

As shown in FIG. 49, in the electrically adjustable steering 37 of the thirty-seventh embodiment, the downward extension portion 102a of the mount bracket 102 extends further downward with respect to the electrically adjustable steering 36 shown in FIG. 48. The third jacket member 123 is rotatably connected to the downward extension portion 102a of the mount bracket 102 via the pivot P0 on the center line CL of the steering jacket 120.

The motor 133 of the first telescopic actuator 131 composed of the screw shaft rotary actuator 130 and the tilt motor 151 of the tilt actuator 150 are separately rotatably connected to the mount bracket 102 via the pivot P1 and the pivot P3 at positions offset separately up and down with respect to the center line CL of the steering jacket 120.

Also in the present embodiment, since the top bracket 103 does not have a front support portion, it is necessary to consider the effect of the accuracy of the mount bracket 102, but weight reduction can be realized.

Thirty-Eighth Embodiment

Figure 50:
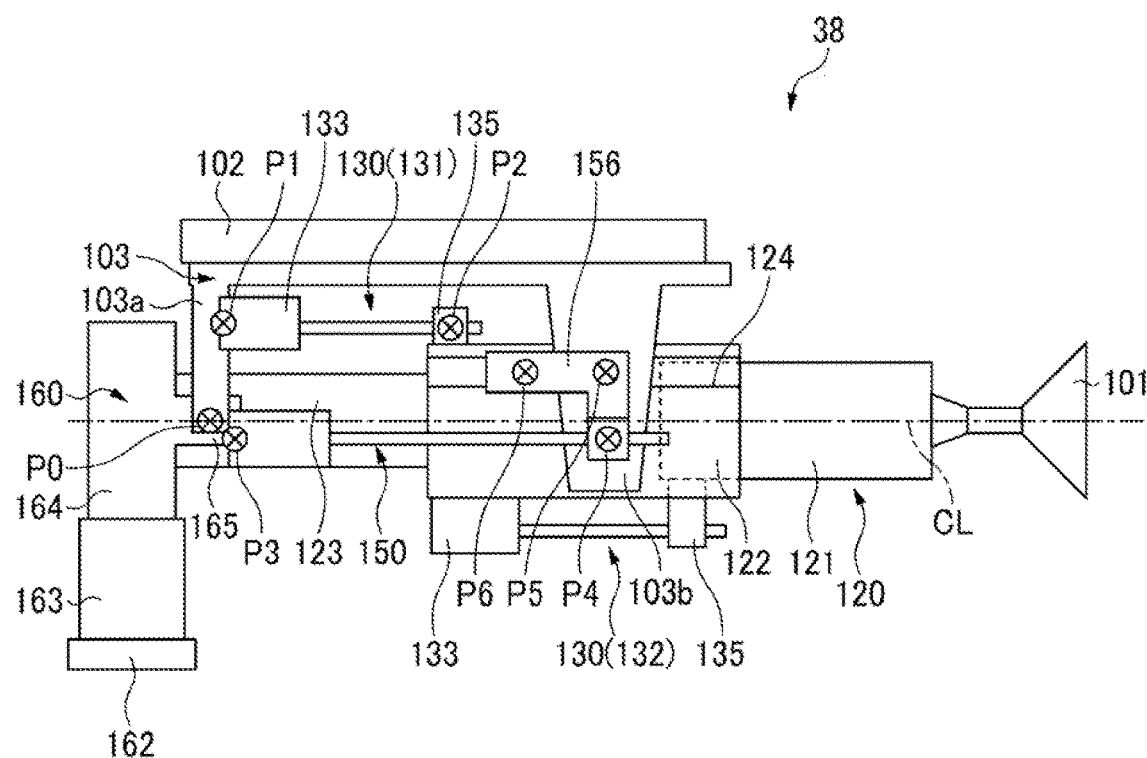
FIG. 50 is a side view schematically showing an electrically adjustable steering of a thirty-eighth embodiment.

As shown in FIG. 50, in the electrically adjustable steering 38 of the thirty-eighth embodiment, a rib portion 165 is provided on a cover 164 for a worm gear or various sensors of the road surface reaction force generation device 160 with respect to the electrically adjustable steering 34 shown in FIG. 45. The rib portion 165 of the road surface reaction force generation device 160 is rotatably connected to the front support portion 103a of the top bracket 103 via the pivot P0 which is also the rotation center for the steering jacket 120.

On the other hand, similarly to the electrically adjustable steering 37 shown in FIG. 48, the tilt actuator 150 tilts the second jacket member 122 by using the L-shaped link member 156, and the motor 151 is rotatably connected to the rib portion 165 of the road surface reaction force generation device 160 via the pivot P3.

Thirty-Ninth Embodiment

Figure 51:
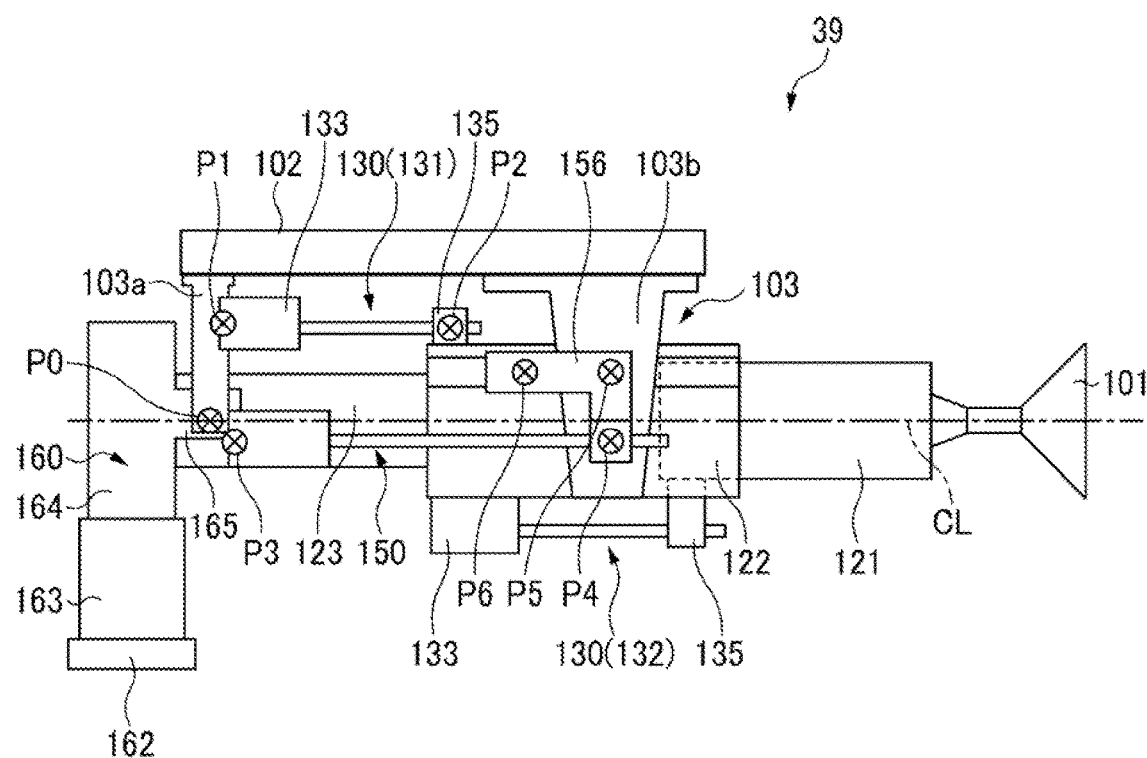
FIG. 51 is a side view schematically showing an electrically adjustable steering of a thirty-ninth embodiment.

As shown in FIG. 51, similarly to the thirty-fifth embodiment, the electrically adjustable steering 39 of the thirty-ninth embodiment is divided into the front support portion 103a and the rear support portion 103b of the top bracket 103, and other constituents are the same as those of the electrically adjustable steering 38 of the thirty-eighth embodiment.

Therefore, also in the present embodiment, it is possible to reduce the weight of the top bracket 103 by dividing the top bracket 103 into two.

Fortieth Embodiment

Figure 52:
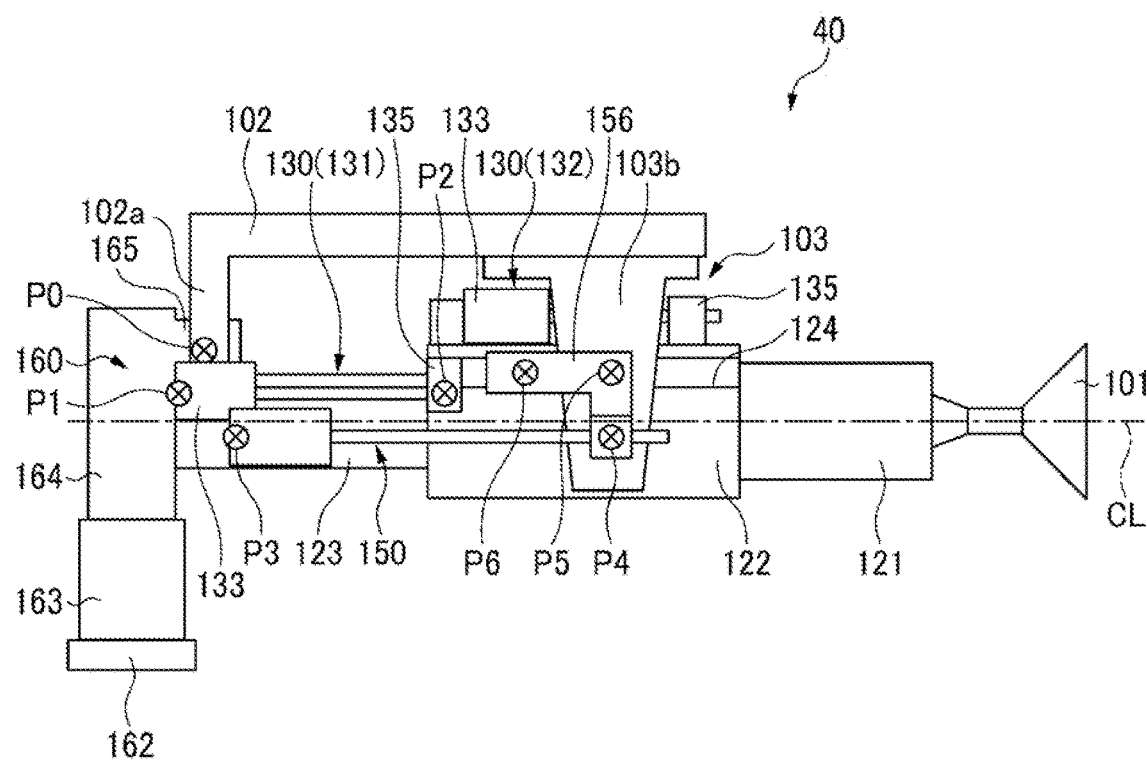
FIG. 52 is a side view schematically showing an electrically adjustable steering of a fortieth embodiment.

As shown in FIG. 52, in the electrically adjustable steering 40 according to the fortieth embodiment, although the top bracket 103 has the front support portion 103a with respect to the electrically adjustable steering 38 shown in FIG. 50, the mount bracket 102 has the downward extension portion 102*a* similarly to the electrically adjustable steering 36 shown in FIG. 48.

The rib portion 165 of the road surface reaction force generation device 160 is rotatably connected to the downward extension portion 102*a* of the mount bracket 102 via the pivot P0 offset from the center line CL of the steering jacket 120.

The first telescopic actuator 131 composed of the screw shaft rotary actuator 130 is disposed between the cover 164 of the road surface reaction force generation device 160 and the second jacket member 122.

Further, in the tilt actuator 150, the motor 151 is rotatably connected to the third jacket member 123 via the pivot P3.

Therefore, also in the present embodiment, since the top bracket 103 does not have a front support portion, the electrically adjustable steering 40 is affected by the accuracy of the mount bracket 102, but further reduction in weight is possible.

In addition, in the case where the third jacket member 123 is made of steel, if the cover 164 of the worm gear or various sensors of the road surface reaction force generation device 160 is made of aluminum, a wall thickness of a part where the pivot P0 is provided can be ensured, and strength can be improved.

Forty-First Embodiment

Figure 53:
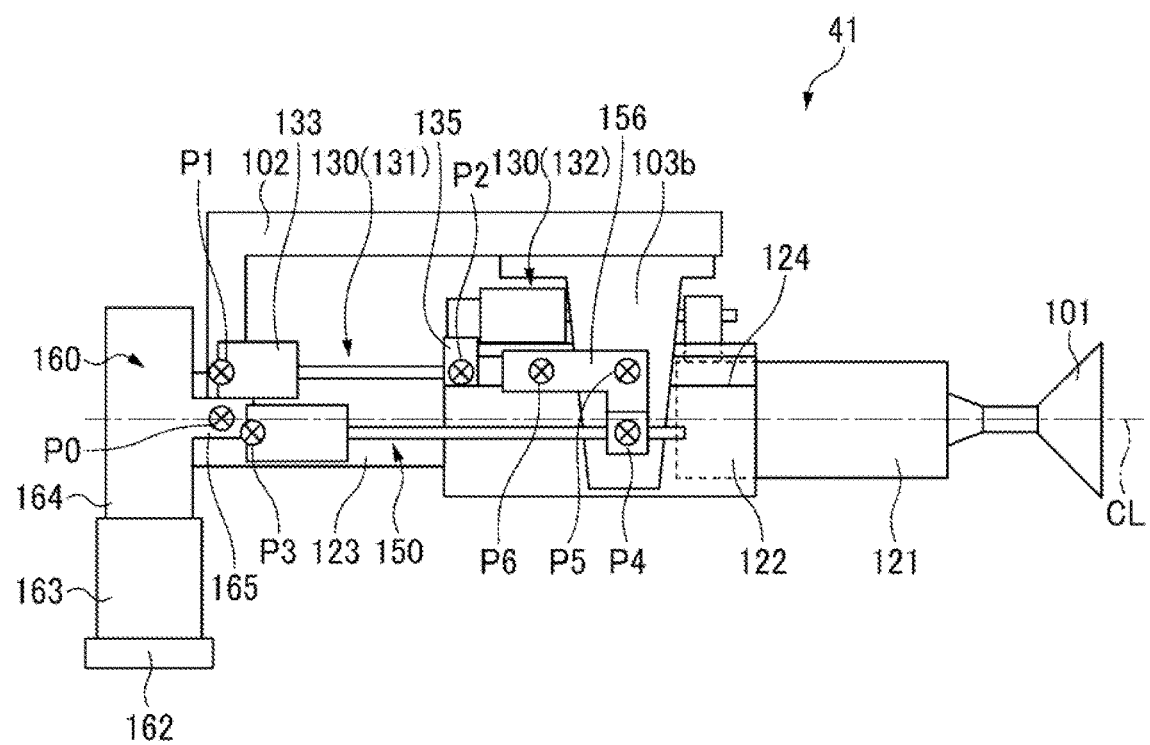
FIG. 53 is a side view schematically showing an electrically adjustable steering of a forty-first embodiment.

As shown in FIG. 53, in the electrically adjustable steering 41 of the forty-first embodiment, the downward extension portion 102*a* of the mount bracket 102 extends to the center line CL of the steering jacket 120 with respect to the electrically adjustable steering 40 shown in FIG. 52. The rib portion 165 of the road surface reaction force generation device 160 is rotatably connected to the downward extension portion 102*a* of the mount bracket 102 via the pivot P0 on the center line CL of the steering jacket 120.

The motor 133 of the first telescopic actuator 131 is rotatably connected to the downward extension portion 102*a* of the mount bracket 102 via the pivot P1.

Further, the tilt motor 151 of the tilt actuator 150 is rotatably connected to the rib portion 165 of the road surface reaction force generation device 160 at a position offset downward of the center line CL of the steering jacket 120 via the pivot P3.

Therefore, also in the present embodiment, since the top bracket 103 does not have a front support portion, the electrically adjustable steering 40 is affected by the accuracy of the mount bracket 102, but further reduction in weight is possible.

In addition, in the case where the third jacket member 123 is made of steel, if the cover 164 of the worm gear or various sensors of the road surface reaction force generation device 160 is made of aluminum, a wall thickness of a part where the pivot P0 or the pivot P3 is provided can be ensured, and strength can be improved.

Forty-Second Embodiment

Figure 54:
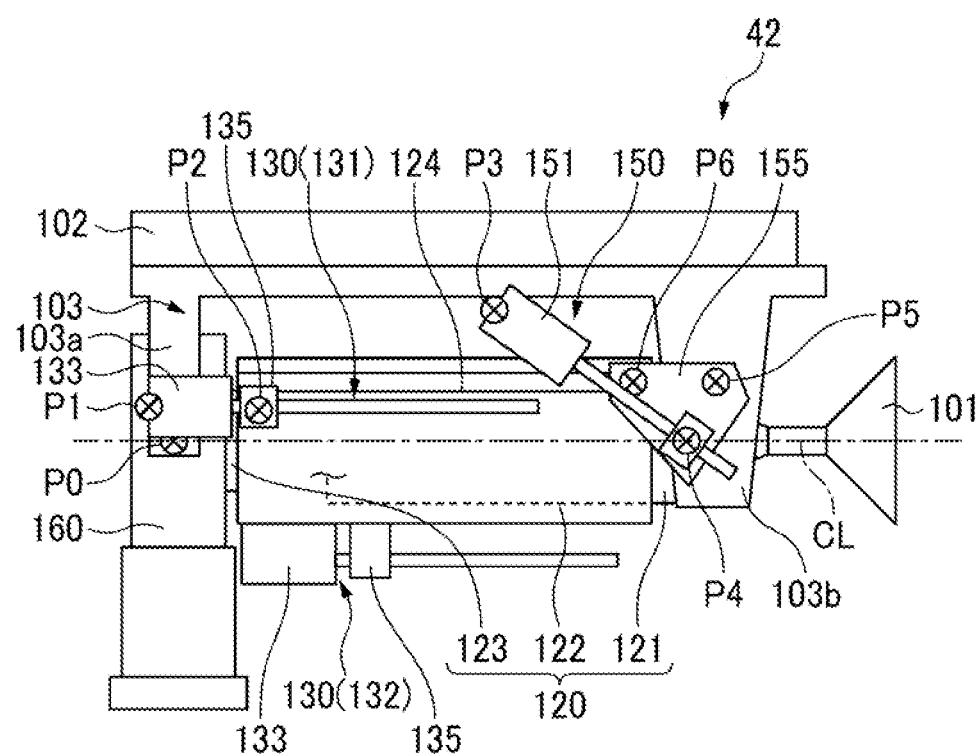
FIG. 54 is a side view schematically showing an electrically adjustable steering of a forty-second embodiment.

As shown in FIG. 54, in the electrically adjustable steering 42 of the forty-second embodiment, the road surface reaction force generation device 160 is rotatably connected to the top bracket 103 via the pivot P0 on the center line CL of the steering jacket 120 with respect to the electrically adjustable steering 34 shown in FIG. 45.

The motor 133 of the first telescopic actuator 131 composed of the screw shaft rotary actuator 130 is rotatably connected to the front support portion 103*a* of the top bracket 103 via the pivot P1.

In this case, a force input from the steering wheel 101 and acting on the steering jacket 120 is supported by the pivot P0 and the pivot P6 of the link member 155, but as compared with the case where the pivot P0 is disposed on the third jacket member 123 as shown in the electrically adjustable steering 43 shown in FIG. 45, a distance between support points of the pivot P0 and the pivot P6 can be increased, and the rigidity is improved.

Figure 55:
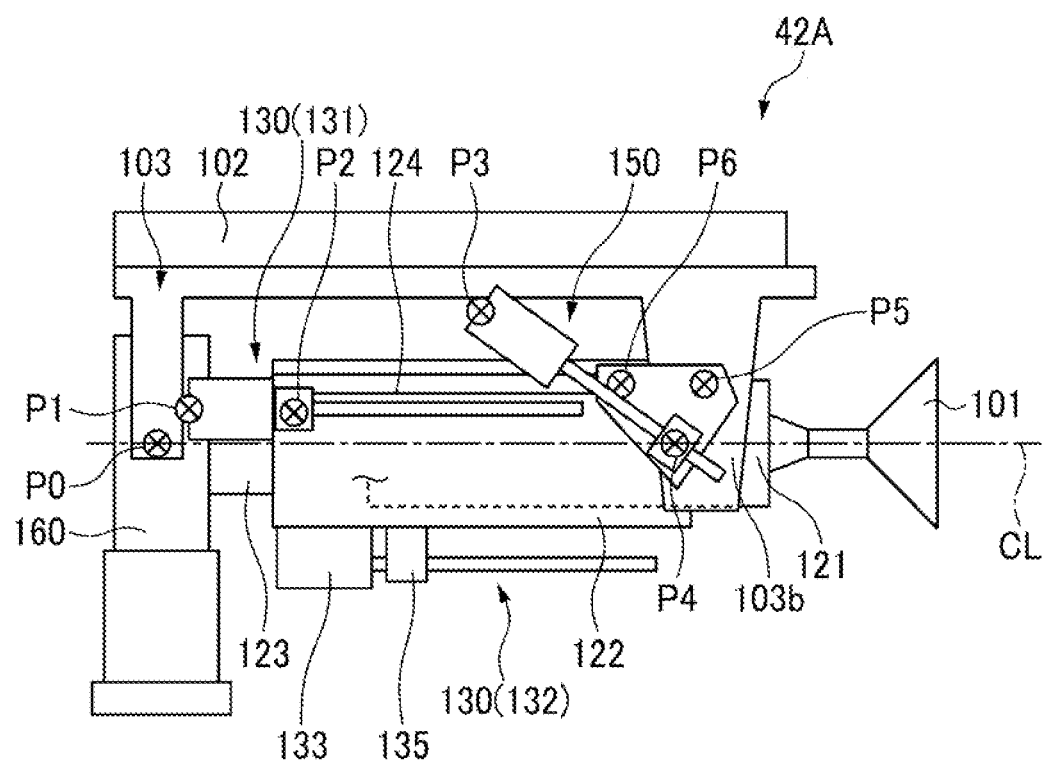
FIG. 55 is a side view schematically showing an electrically adjustable steering of an eighth reference example.

FIG. 55 is an electrically adjustable steering 42A of an eighth reference example for comparison with the electrically adjustable steering 42 shown in FIG. 54, and the motor 133 of the first telescopic actuator 131 is supported by the pivot P1 in the road surface reaction force generation device 160. In this case, when the second jacket member 122 moves in a direction close to the motor 133 of the first telescopic actuator 131, the stroke of the second jacket member 122 shortens in order to prevent the motor 133 from interfering with the second jacket member 122. On the other hand, in the electrically adjustable steering 42, since the motor 133 is supported by the front support portion 103*a* of the top bracket 103, interference between the motor 133 and the second jacket member 122 is prevented, and the stroke of the second jacket member 122 can be lengthened.

Forty-Third Embodiment

Figure 56:
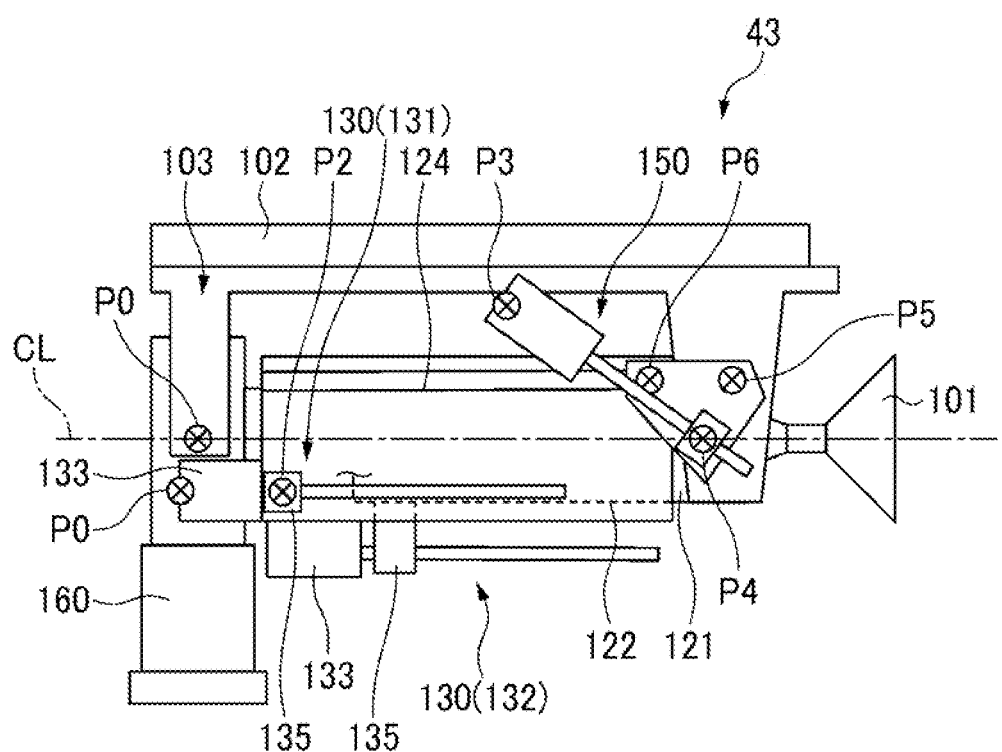
FIG. 56 is a side view schematically showing an electrically adjustable steering of a forty-third embodiment.

As shown in FIG. 56, in the electrically adjustable steering 43 of the forty-third embodiment, the motor 133 of the first telescopic actuator 131 is rotatably connected to the vehicle front side of the road surface reaction force generation device 160 via the pivot P0, and is supported by being offset downward from the center line CL of the steering jacket 120 with respect to the electrically adjustable steering 42 shown in FIG. 54. Also in this case, interference between the motor 133 and the second jacket member 122 is prevented, and the stroke of the second jacket member 122 can be lengthened. Accordingly, mounting rigidity of the first telescopic actuator 131 is improved.

In the case where the third jacket member 123 is made of steel, a bracket for mounting the motor 133 of the first telescopic actuator 131 would be required, but since the cover 164 of the worm gear or various sensors of the road surface reaction force generation device 160 is formed by die casting or plastic molding, a degree of freedom in design of a mounting portion of the motor 133 can be increased.

Forty-Fourth Embodiment

Figure 57:
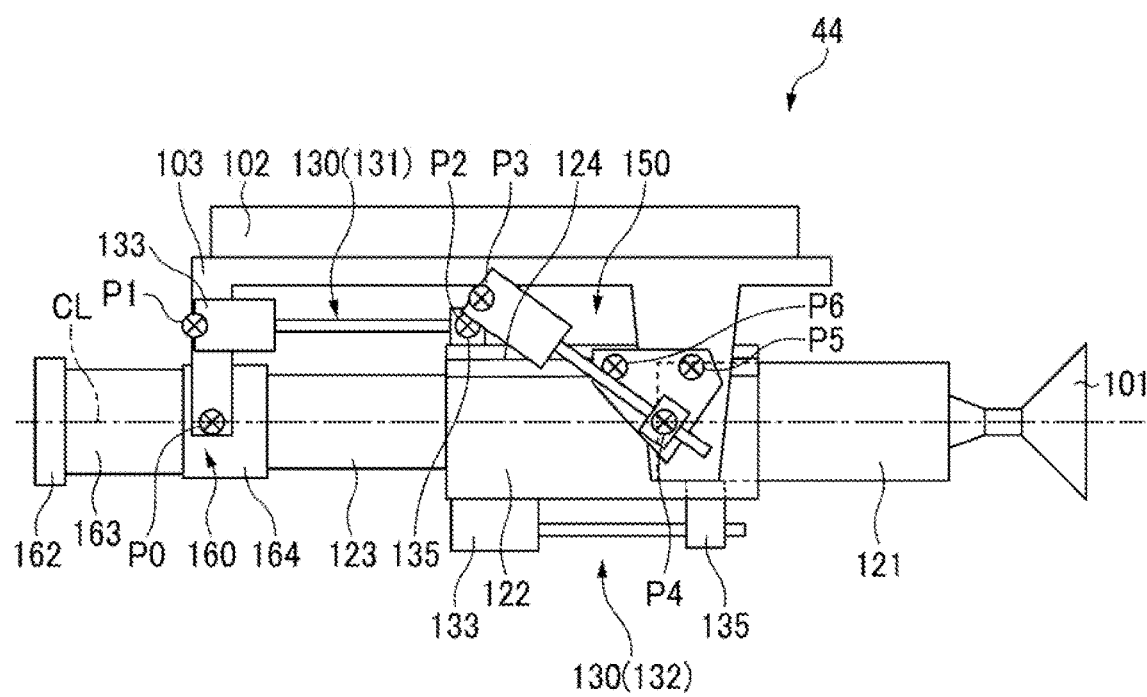
FIG. 57 is a side view schematically showing an electrically adjustable steering of a forty-fourth embodiment.

As shown in FIG. 57, in the electrically adjustable steering 44 of the forty-fourth embodiment, the ECU 162, the drive motor 163, and the cover 164 for a worm gear and various sensors of the road surface reaction force generation device 160 are disposed side by side in order along the center line CL of the steering jacket 120, and is fixed to the vehicle front side of the third jacket member 123. The road surface reaction force generation device 160 is rotatably connected to the front support portion 103*a* of the top bracket 103 via the pivot P0 disposed on the center line CL of the steering jacket 120. Further, the motor 133 of the first telescopic actuator 131 is also rotatably supported by the front support portion 103*a* of the top bracket 103 via the pivot P1.

Other constituents are the same as those of the electrically adjustable steering 42 shown in FIG. 54.

According to the configuration, since the integral top bracket 103 is included, the motion of the steering jacket 120 is hard to be affected by the accuracy of the mount bracket 102 on the sound or motion speed.

Forty-Fifth Embodiment

Figure 58:
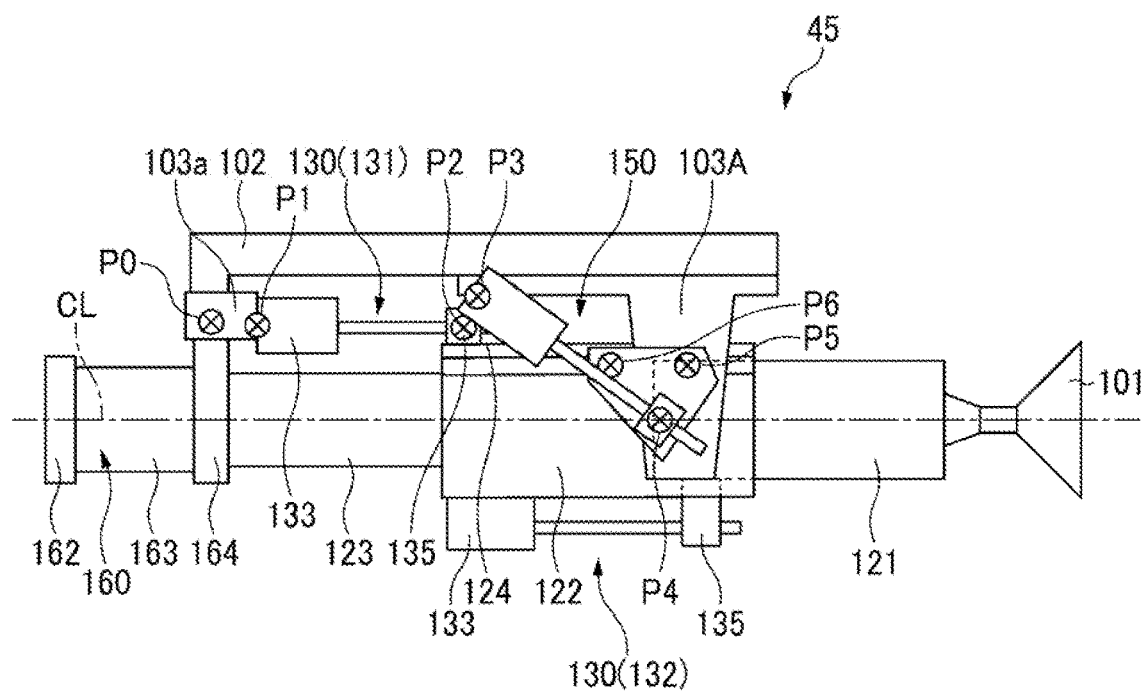
FIG. 58 is a side view schematically showing an electrically adjustable steering of a forty-fifth embodiment.

As shown in FIG. 58, in the electrically adjustable steering 45 of the forty-fifth embodiment, the top bracket 103 is divided into the front support portion 103*a* and the rear support portion 103*b* with respect to the electrically adjustable steering 44 shown in FIG. 57. The cover 164 of the road surface reaction force generation device 160 is rotatably supported by the front support portion 103*a* via the pivot P0 offset upward of the center line CL of the steering jacket 120. The motor 133 of the first telescopic actuator 131 composed of the screw shaft rotary actuator 130 is also rotatably connected to the front support portion 103*a* via the pivot P1, and the nut 135 is rotatably connected to the end portion of the second jacket member 122 on the vehicle front side via the pivot P2.

Also in the present embodiment, the weight can be reduced by dividing the top bracket 103 into two.

Forty-Sixth Embodiment

Figure 59:
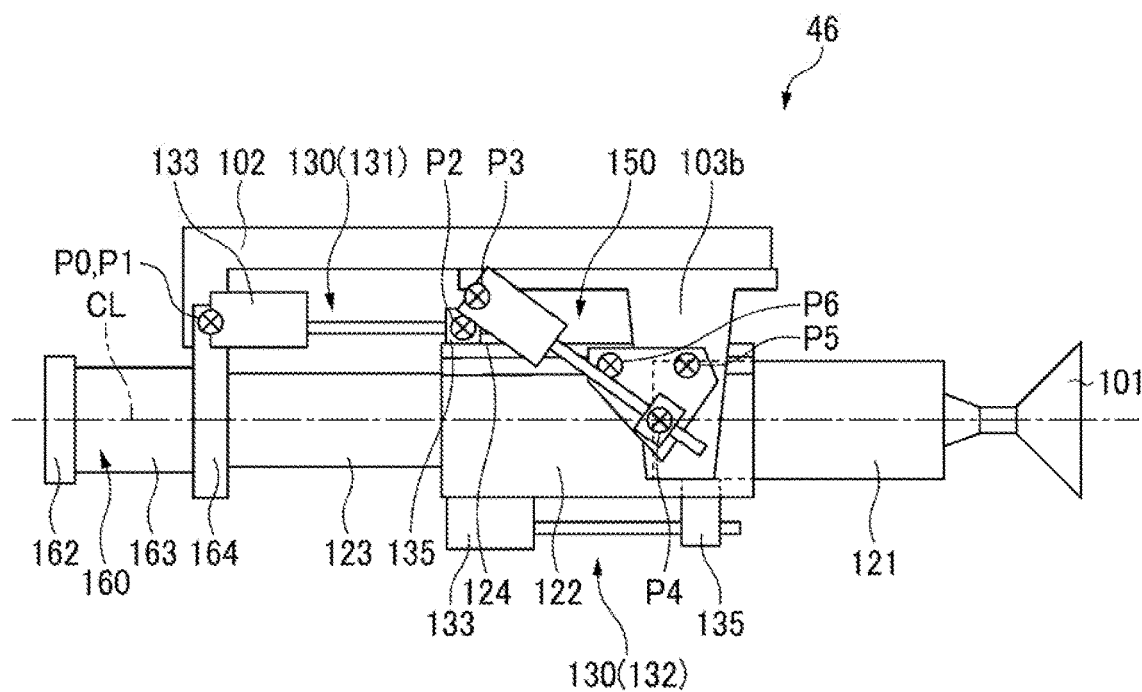
FIG. 59 is a side view schematically showing an electrically adjustable steering of a forty-sixth embodiment.

As shown in FIG. 59, in the electrically adjustable steering 46 of the forty-sixth embodiment, the cover 164 of the road surface reaction force generation device 160 is rotatably connected to the downward extension portion 102*a* of the mount bracket 102 via the pivot P0 with respect to the electrically adjustable steering 45 shown in FIG. 58.

The motor 133 of the first telescopic actuator 131 is also mounted on the cover 164 of the road surface reaction force generation device 160 by the pivot P1 at the same position as the pivot P0 in a side view.

In the present embodiment, since the top bracket 103 does not have a front support portion, the electrically adjustable steering 46 is affected by the accuracy of the mount bracket 102, but further reduction in weight is possible.

Forty-Seventh Embodiment

Figure 60:
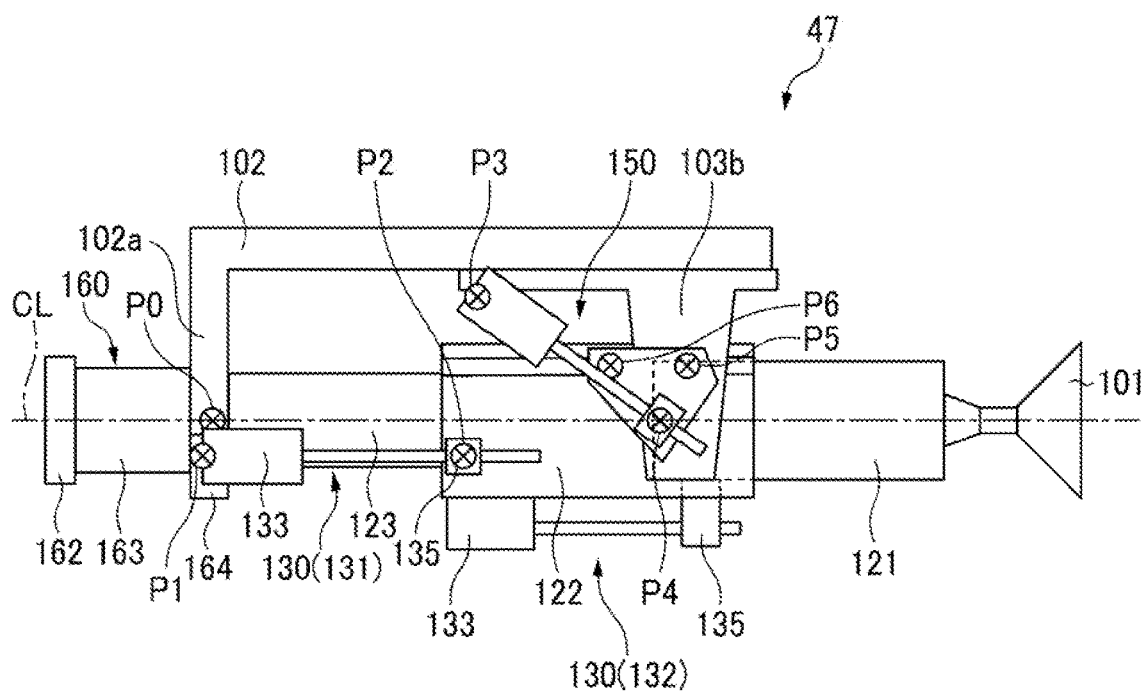
FIG. 60 is a side view schematically showing an electrically adjustable steering of a forty-seventh embodiment.

As shown in FIG. 60, in the electrically adjustable steering 47 of the forty-seventh embodiment, the downward extension portion 102*a* of the mount bracket 102 extends further downward with respect to the electrically adjustable steering 46 shown in FIG. 59, and the cover 164 of the road surface reaction force generation device 160 is rotatably connected to the downward extension portion 102*a* via the pivot P0 on the center line CL of the steering jacket 120.

The motor 133 of the first telescopic actuator 131 composed of the screw shaft rotary actuator 130 is rotatably connected to the cover 164 of the road surface reaction force generation device 160 via the pivot P1 offset downward of the center line CL of the steering jacket 120.

Also in the present embodiment, since the top bracket 103 does not have a front support portion, the electrically adjustable steering 47 is affected by the accuracy of the mount bracket 102, but further reduction in weight is possible.

Forty-Eighth Embodiment

Figure 61:
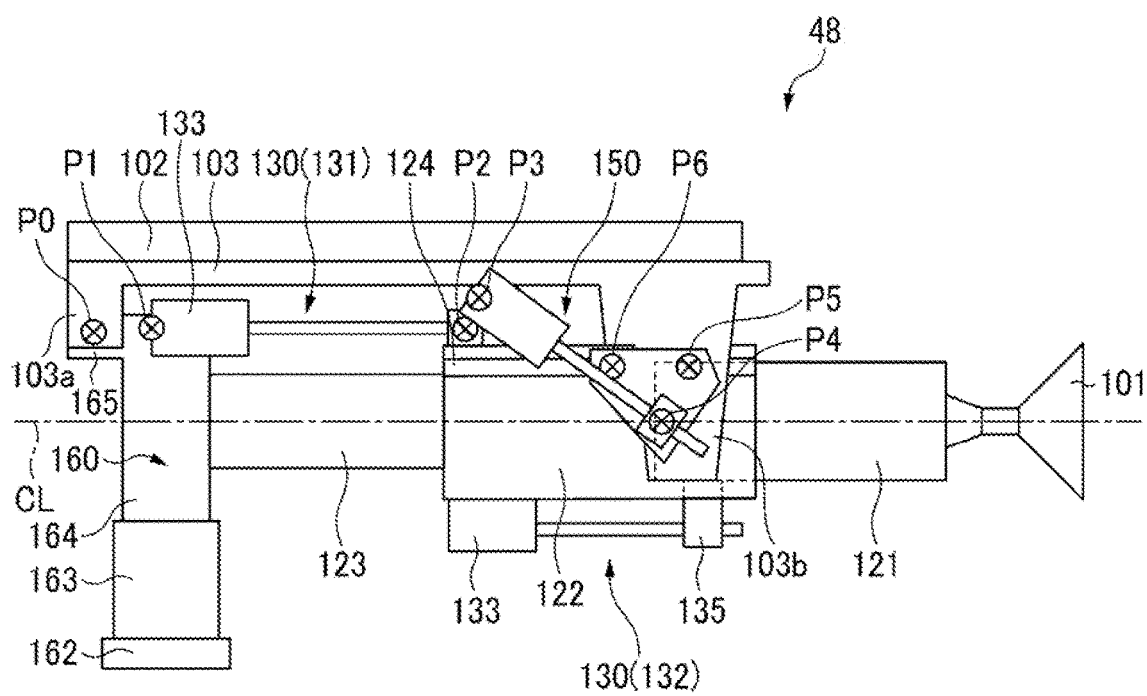
FIG. 61 is a side view schematically showing an electrically adjustable steering of a forty-eighth embodiment.

As shown in FIG. 61, in the electrically adjustable steering 48 of the forty-eighth embodiment, the rib portion 165 of the cover 164 of the road surface reaction force generation device 160 extends to the vehicle front side of the electrically adjustable steering 34 shown in FIG. 45. The rib portion 165 is rotatably connected to the front support portion 103*a* of the top bracket 103 via the pivot P0.

The motor 133 of the first telescopic actuator 131 is also rotatably connected to the cover 164 of the road surface reaction force generation device 160 via the pivot P1.

Therefore, while the steering jacket 120 tilts with the pivot P0 as the rotation center, the rigidity of the electrically adjustable steering 48 can be designed high by setting the position of the pivot P0 as the vehicle front side of the road surface reaction force device 160.

Also in the present embodiment, since the integral top bracket 103 is included, the motion of the steering jacket 120 is hard to be affected by the accuracy of the mount bracket 102 on the sound or motion speed.

Forty-Ninth Embodiment

Figure 62:
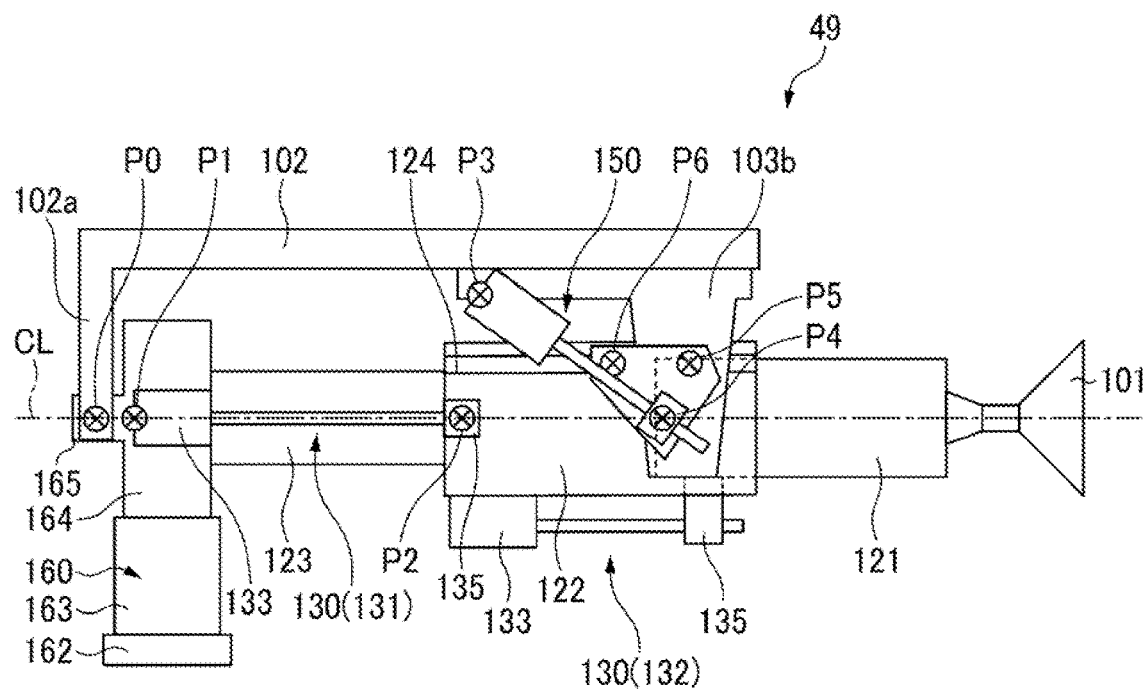
FIG. 62 is a side view schematically showing an electrically adjustable steering of a forty-ninth embodiment.

As shown in FIG. 62, in the electrically adjustable steering 49 of the forty-ninth embodiment, the downward extension portion 102*a* of the mount bracket 102 extends downward to the center line CL of the steering jacket 120 with respect to the electrically adjustable steering 48 shown in FIG. 61, and the rib portion 165 of the cover 164 of the road surface reaction force generation device 160 is rotatably connected to the downward extension portion 102*a* of the mount bracket 102 via the pivot P0 on the center line CL of the steering jacket 120.

The motor 133 of the first telescopic actuator 131 composed of the screw shaft rotary actuator 130 is rotatably connected to the cover 164 of the road surface reaction force generation device 160 via the pivot P1 on the center line CL of the steering jacket 120.

Also in the present embodiment, since the top bracket 103 does not have a front support portion, it is necessary to consider the effect of the accuracy of the mount bracket 102, but further reduction in weight is possible.

Fiftieth Embodiment

Figure 63:
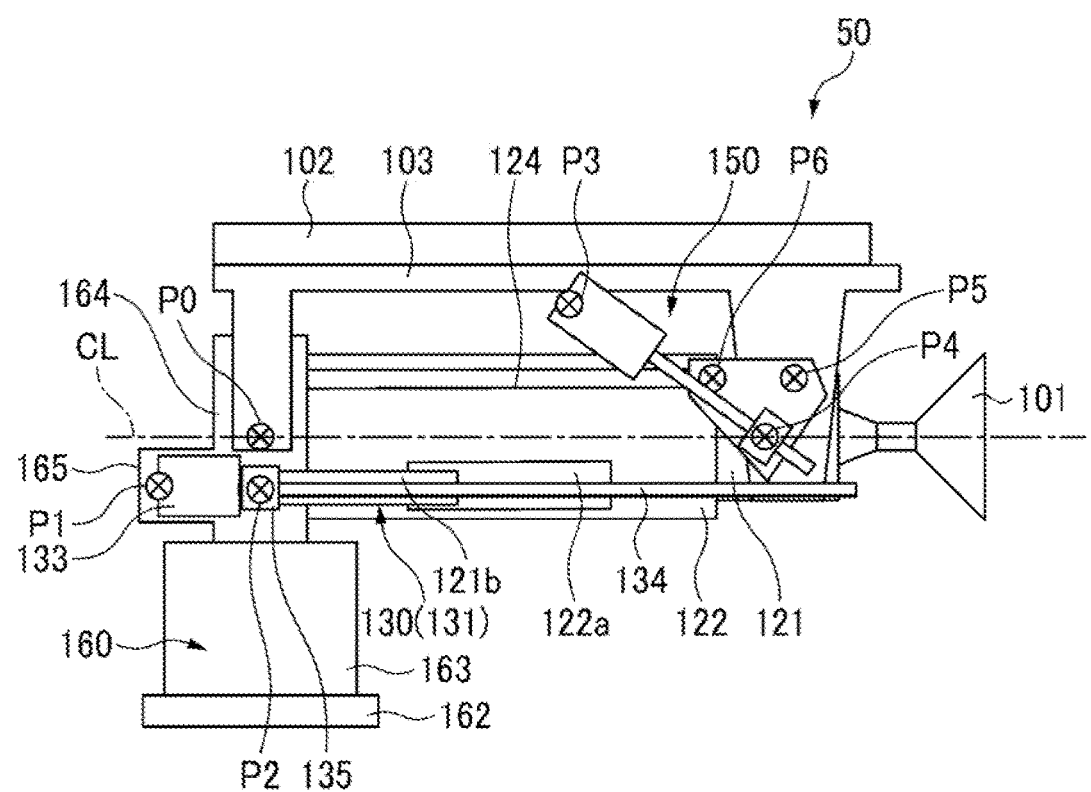
FIG. 63 is a side view schematically showing an electrically adjustable steering of a fiftieth embodiment.

As shown in FIG. 63, in the electrically adjustable steering 50 of the fiftieth embodiment, similarly to the electrically adjustable steering 42 shown in FIG. 54, the cover 164 of the road surface reaction force generation device 160 is rotatably connected to the front support portion 103*a* of the top bracket 103 via the pivot P1 on the center line CL of the steering jacket 120.

Further, the rib portion 165 extending to the vehicle front side of the cover 164 of the road surface reaction force generation device 160 is provided. Further, the first jacket member 121 has the first extension bracket 121*b* extending from the end portion of the vehicle body front side. The first extension bracket 121*b* projects in the radial direction from the slit 122*a* provided on the second jacket member 122 and extends to the vehicle body front side.

The motor 133 of the first telescopic actuator 131 composed of the screw shaft rotary actuator 130 is rotatably connected to the rib portion 165 of the road surface reaction force generation device 160 via the pivot P1 offset downward from the center line CL of the steering jacket 120. Further, the nut 135 of the first telescopic actuator 131 is rotatably connected to the front end of the first extension bracket 121*b* in front of the slit 122*a* via the pivot P2. Accordingly, the stroke of the steering jacket 120 can be lengthened by one first telescopic actuator 131.

In order to improve the rigidity of the second jacket member 122, the slit 122a is preferably as small as possible while avoiding an overlapping part of the first jacket member 121 and the third jacket member 123 at the time of expansion.

Figure 64:
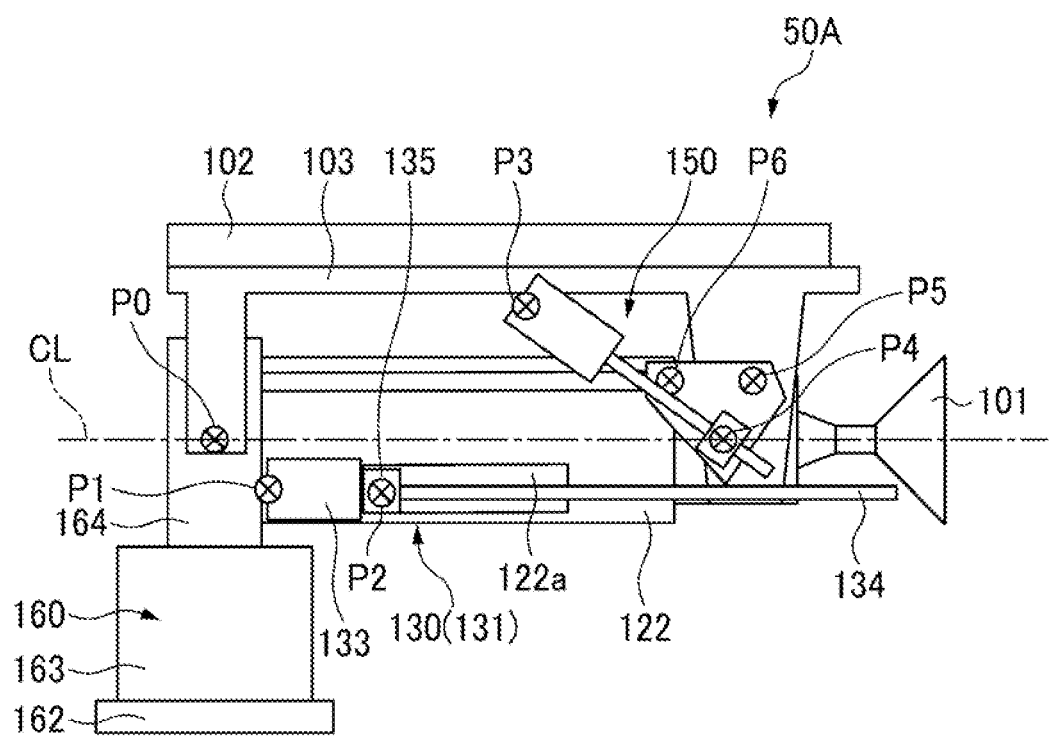
FIG. 64 is a side view schematically showing an electrically adjustable steering of a ninth reference example.

In the electrically adjustable steering 50A of a ninth reference example shown in FIG. 64, the cover 164 of the road surface reaction force generation device 160 does not include the rib portion, and the first jacket member 121 does not include the first extension bracket 121b with respect to the electrically adjustable steering 50 shown in FIG. 63.

According to the configuration, when the steering jacket 120 shortens, a tip of the screw shaft 134 may interfere with the steering wheel 101. On the other hand, in the electrically adjustable steering 50 shown in FIG. 63 having the rib portion 165 and the first extension bracket 121b, there is less possibility that the tip of the screw shaft 134 interferes with the steering wheel 101.

Fifty-First Embodiment

Figure 65:
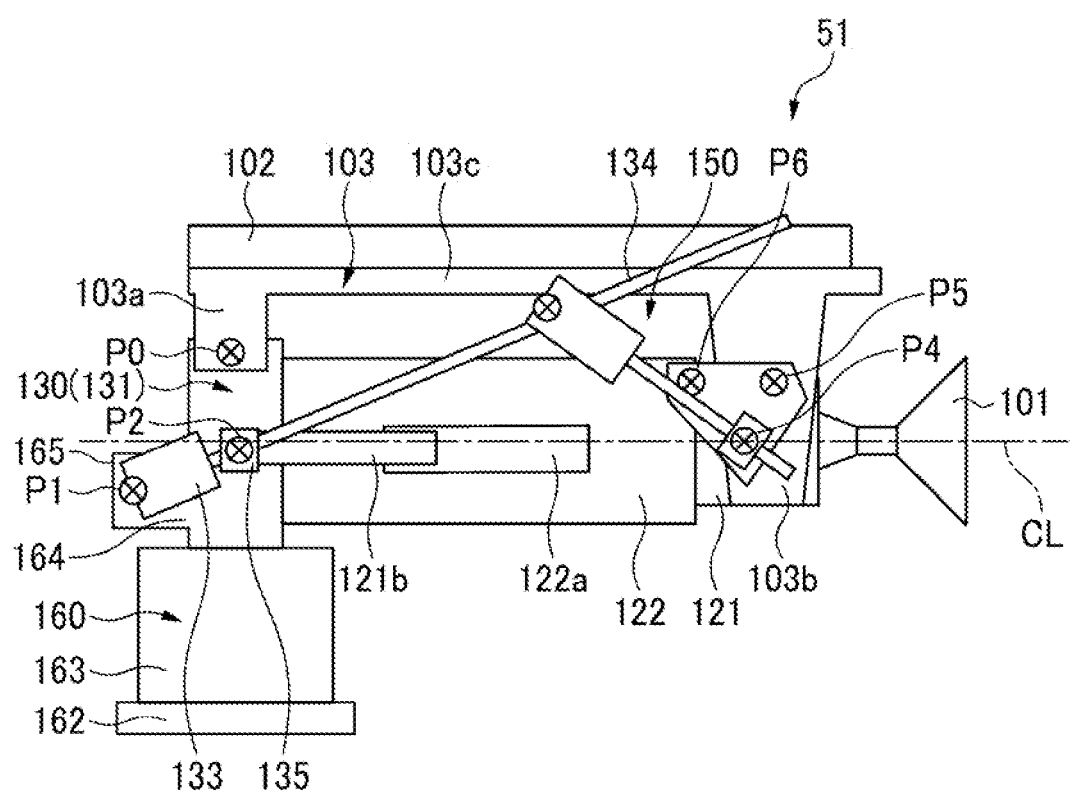
FIG. 65 is a side view schematically showing an electrically adjustable steering of a fifty-first embodiment.

As shown in FIG. 65, in the electrically adjustable steering 51 of the fifty-first embodiment, the first extension bracket 121b extending from the slit 122a of the second jacket member 122 to the vehicle body front side is formed along the center line CL of the steering jacket 120 in a side view with respect to the electrically adjustable steering 50 shown in FIG. 64. Therefore, the nut 135 of the first telescopic actuator 131 mounted on the end portion of the first extension bracket 121b on the vehicle body front side via the pivot P2 moves along the center line CL of the steering jacket 120 in a side view. On the other hand, the pivot P1 to which the motor 133 of the first telescopic actuator 131 is connected is located below the first extension bracket 121b. Therefore, the screw shaft 134 of the first telescopic actuator 131 is inclined to the center line CL of the steering jacket 120.

Accordingly, even if the steering jacket 120 expands and contracts, interference between the tip of the screw shaft 134 and the steering wheel 101 is prevented.

In the present embodiment, the cover 164 of the road surface reaction force generation device 160 is rotatably connected to the front support portion 103a of the top bracket 103 via the pivot P0 offset upward from the center line CL of the steering jacket 120.

Fifty-Second Embodiment

Figure 66:
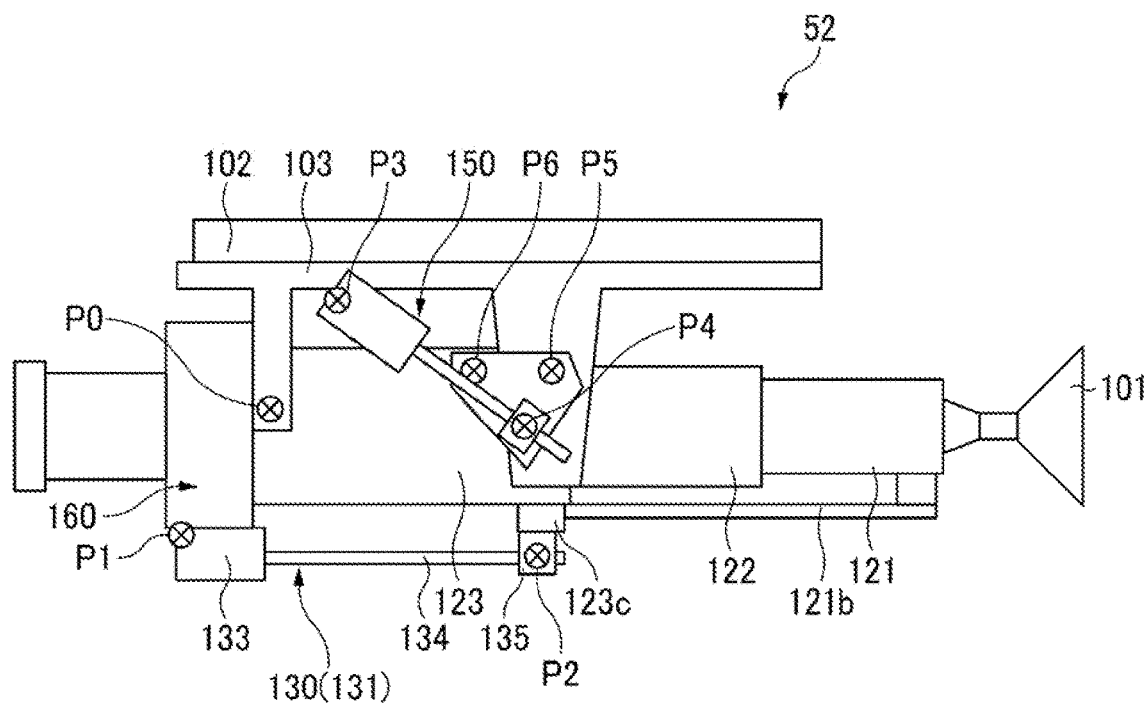
FIG. 66 is a side view schematically showing an electrically adjustable steering of a fifty-second embodiment.

As shown in FIG. 66, in the electrically adjustable steering 52 of the fifty-second embodiment, the first jacket member 121 includes the first extension bracket 121b, and the first extension bracket 121b is slidably supported by the extension bracket support portion 123c provided on the third jacket member 123 (see FIG. 12B). The motor 133 of the first telescopic actuator 131 is mounted on the cover 164 of the road surface reaction force generation device 160 via the pivot P1. Further, the nut 135 of the first telescopic actuator 131 is mounted on the end portion of the first extension bracket 121b on the vehicle body front side via the pivot P2.

Fifty-Third Embodiment

Figure 67:
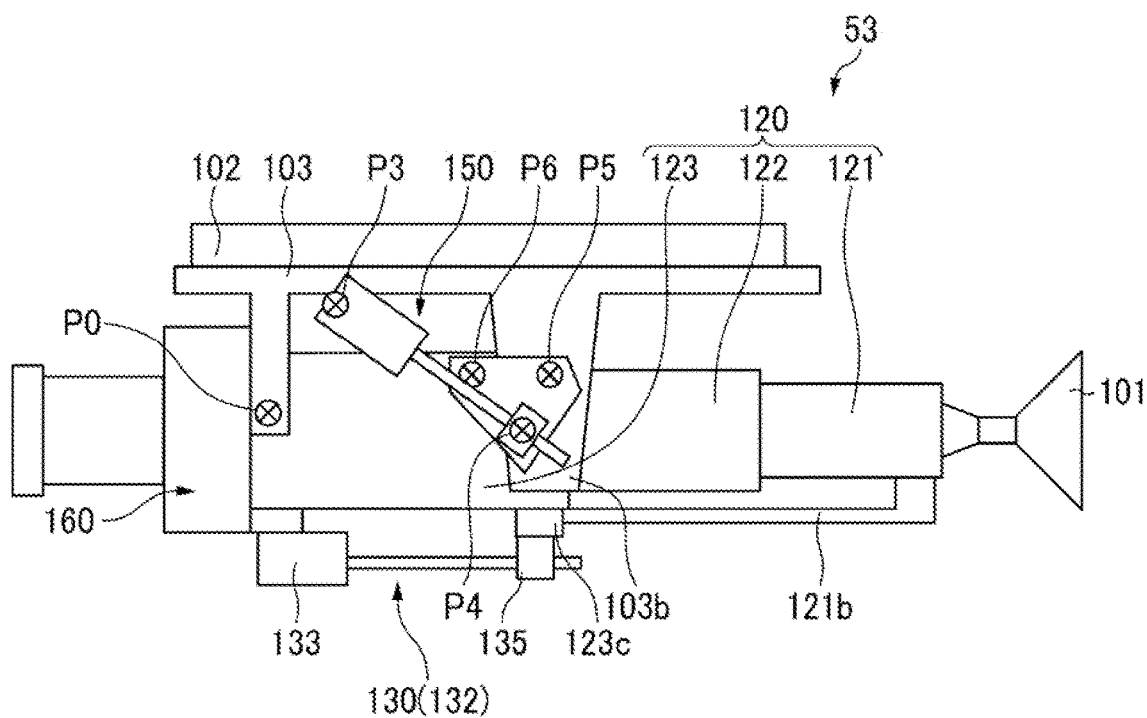
FIG. 67 is a side view schematically showing an electrically adjustable steering of a fifty-third embodiment.

As shown in FIG. 67, in the electrically adjustable steering 52 of the tenth reference example, the first telescopic actuator 131 composed of the screw shaft rotary actuator 130 is disposed between the third jacket member 123 and the first extension bracket 121b provided on the first jacket member 121 with respect to the electrically adjustable steering 52 shown in FIG. 66. That is, the motor 133 is fixed to an end portion of the third jacket member 123, and the nut 135 is fixed to the end portion of the first extension bracket 121b on the vehicle body front side. The motor 133 is preferably disposed at a position close to the pivot point P0 of the steering jacket 120. Other constituents are the same as those of the electrically adjustable steering 52 shown in FIG. 66.

In this way, by using the first extension bracket 121b, the heavy motor 133 is disposed at the end portion of the steering jacket 120 on the vehicle body front side to increase the natural frequency of the steering jacket 120.

The present invention is not limited to the embodiments and the reference examples described above, and modifications, improvements, combinations, and the like can be made as appropriate.

As described above, the present description discloses the following matters.

(1) An electrically adjustable steering including:
a top bracket mounted on a mount bracket on a vehicle body side;
a steering shaft to which a steering wheel is connected;
a steering jacket that is held by the top bracket and rotatably supports the steering shaft on an inner side; and
a first telescopic actuator that is disposed between the top bracket or a mount bracket on the vehicle body side and the steering jacket, and adjusts lengths of the steering shaft and the steering jacket by using a motor, in which
the steering jacket includes first to third jacket members in order from the steering wheel side, and the first and second jacket members and the second and third jacket members overlap each other separately so that the steering jacket can expand and contract in an axial direction, and
the motor of the first telescopic actuator is fixed to the top bracket or the mount bracket on the vehicle body side.

According to this configuration, there is less possibility of giving discomfort due to resonance of the steering apparatus to a driver, and a telescopic adjustable length can be increased.

(2) The electrically adjustable steering according to (1), in which the first telescopic actuator is disposed between the top bracket or the mount bracket on the vehicle body side and the first jacket member.

(3) The electrically adjustable steering according to (1), in which the first telescopic actuator is disposed between the top bracket or the mount bracket on the vehicle body side and the second jacket member, and
a second telescopic actuator is provided between the second jacket member and the first jacket member.

According to this configuration, an expansion and contraction order of the steering jacket can be set optionally.

(4) The electrically adjustable steering according to (1), further including a tilt actuator that performs a tilting motion of inclining the steering jacket with respect to the top bracket, in which
the tilting motion by the tilt actuator is performed simultaneously with axial displacement of the steering jacket by the first telescopic actuator.

According to this configuration, the tilting motion of the steering jacket can be performed, and a change in the length of the steering jacket accompanying the tilt can be corrected.

(5) The electrically adjustable steering according to (1), in which the steering shaft includes first and second shaft members in order from the steering wheel side, and the first and second shaft members overlap each other so that the steering shaft can expand and contract in the axial direction.

According to this configuration, the steering shaft can be composed of two shaft members of the first and second shaft members.

(6) The electrically adjustable steering according to (1) or (2), in which the steering shaft includes first to third shaft members in order from the steering wheel side, and the first and second shaft members, and the second and third shaft members overlap each other separately so that the steering shaft can expand and contract in the axial direction.

According to this configuration, since the steering shaft is composed of three shaft members, a telescopic length can be increased by using a short shaft member.

(7) The electrically adjustable steering according to (5) or (6), in which the first shaft member is rotatably supported in the first jacket member by a pair of bearings.

According to this configuration, the first shaft member can be supported with high rigidity.

(8) The electrically adjustable steering according to (2), in which the first and third jacket members are configured to be able to expand and contract on the inner side of the second jacket member, and the third jacket member is configured to be able to expand and contract while fitting inside (but not contacting) the inner side of the first jacket member.

According to this configuration, a length when the steering jacket shortens can be shortened, and the telescopic adjustable length can be increased.

(9) The electrically adjustable steering according to (2), in which the first and third jacket members 121 and 123 is configured to be able to expand and contract on the inner side of the second jacket member, and the first jacket member is configured to be able to expand and contract while fitting inside (but not contacting) the inner side of the third jacket member.

According to this configuration, a length when the steering jacket shortens can be shortened, and the telescopic adjustable length can be increased.

(10) The electrically adjustable steering according to (3), in which the second telescopic actuator includes a motor disposed on the second jacket member and a driven portion fixed to the first jacket member, and the second jacket member includes a slit that projects the driven portion radially outward.

According to this configuration, the steering jacket can be expanded and contracted by the slit without interference between the driven portion and the second jacket member.

(11) The electrically adjustable steering according to (1), in which at least one of the first jacket member and the second jacket member includes an extension bracket provided on an outer peripheral side of the jacket member and extending forward of the vehicle body, and one end of the first telescopic actuator is disposed on the extension bracket.

(12) An electrically adjustable steering including:
a top bracket mounted on a mount bracket on a vehicle body side;
a steering shaft to which a steering wheel is connected;
a steering jacket that is held by the top bracket and rotatably supports the steering shaft on an inner side;
a road surface reaction force generation device that transmits a road surface reaction force generated between a road surface and a wheel to the steering wheel; and
a first telescopic actuator that is disposed between the road surface reaction force generation device and the steering jacket, and adjusts lengths of the steering shaft and the steering jacket by using a motor, in which the steering jacket includes first to third jacket members in order from the steering wheel side, and the first and second jacket members and the second and third jacket members overlap each other separately so that the steering jacket can expand and contract in an axial direction, and a motor of the first telescopic actuator is fixed to the road surface reaction force generation device.

According to this configuration, there is less possibility that discomfort due to resonance of the steering apparatus is given to a driver.

What is claimed is:
1. An electrically adjustable steering comprising:
a top bracket mounted on a mount bracket on a vehicle body side;
a steering shaft to which a steering wheel is connected;
a steering jacket configured to be held by the top bracket and rotatably supports the steering shaft on an inner side;
a first telescopic actuator configured to be disposed between the top bracket or a mount bracket on the vehicle body side and the steering jacket, and adjusts lengths of the steering shaft and the steering jacket by using a motor; and
a tilt actuator configured to perform a tilting motion of inclining the steering jacket with respect to the top bracket, wherein
the steering jacket includes first to third jacket members in order from the steering wheel side, and the first and second jacket members and the second and third jacket members overlap each other separately so that the steering jacket can expand and contract in an axial direction,
the third jacket member is rotatably connected to the top bracket by a first pivot which is a center point at which the steering jacket rotates at the time of the tilting motion, and
the motor of the first telescopic actuator is fixed to the top bracket or the mount bracket on the vehicle body side via a second pivot which is connected to the top bracket.

2. The electrically adjustable steering according to claim 1, wherein the first telescopic actuator is disposed between the top bracket or the mount bracket on the vehicle body side and the first jacket member.

3. The electrically adjustable steering according to claim 1, wherein the first telescopic actuator is disposed between the top bracket or the mount bracket on the vehicle body side and the second jacket member, and
a second telescopic actuator is provided between the second jacket member and the first jacket member.

4. The electrically adjustable steering according to claim 1, wherein
the tilting motion by the tilt actuator is performed simultaneously with axial displacement of the steering jacket by the first telescopic actuator.

5. The electrically adjustable steering according to claim 1, wherein the steering shaft includes first and second shaft members in order from the steering wheel side, and the first and second shaft members overlap each other so that the steering shaft can expand and contract in the axial direction.

6. The electrically adjustable steering according to claim 1, wherein the steering shaft includes first to third shaft members in order from the steering wheel side, and the first and second shaft members, and the second and third shaft members overlap each other separately so that the steering shaft can expand and contract in the axial direction.

7. The electrically adjustable steering according to claim 5, wherein the first shaft member is rotatably supported in the first jacket member by a pair of bearings.

8. The electrically adjustable steering according to claim 2, wherein the first and third jacket members are configured to be able to expand and contract on the inner side of the second jacket member, and the third jacket member is configured to be able to expand and contract while fitting inside the inner side of the first jacket member.

9. The electrically adjustable steering according to claim 2, wherein the first and third jacket members are configured to be able to expand and contract on the inner side of the second jacket member, and the first jacket member is configured to be able to expand and contract while fitting inside the inner side of the third jacket member.

10. The electrically adjustable steering according to claim 3, wherein the second telescopic actuator includes a motor disposed on the second jacket member and a driven portion fixed to the first jacket member, and the second jacket member includes a slit configured to project the driven portion radially outward.

11. The electrically adjustable steering according to claim 1, wherein at least one of the first jacket member and the second jacket member includes an extension bracket provided on an outer peripheral side of the jacket member and extending forward of the vehicle body, and one end of the first telescopic actuator is disposed on the extension bracket.

12. An electrically adjustable steering comprising:
a top bracket mounted on a mount bracket on a vehicle body side;
a steering shaft to which a steering wheel is connected;
a steering jacket configured to be held by the top bracket and rotatably supports the steering shaft on an inner side;
a road surface reaction force generation device configured to transmit a road surface reaction force generated between a road surface and a road wheel to the steering wheel; and
a first telescopic actuator configured to be disposed between the road surface reaction force generation device and the steering jacket, and adjusts lengths of the steering shaft and the steering jacket by using a motor; and
a tilt actuator configured to perform a tilting motion of inclining the steering jacket with respect to the top bracket, wherein
the steering jacket includes at least first to third jacket members in order from the steering wheel side, and the first and second jacket members and the second and third jacket members overlap each other separately so that the steering jacket can expand and contract in an axial direction,
the third jacket member is rotatably connected to the top bracket by a first pivot which is a center point at which the steering jacket rotates at the time of the tilting motion, and
the motor of the first telescopic actuator is fixed to the road surface reaction force generation device via a second pivot which is connected to the top bracket.

* * * * *